Feb. 23, 1971 W. G. KLETTKE 3,564,806
SYRINGE ASSEMBLING METHOD AND MACHINE
Filed Sept. 16, 1968 26 Sheets-Sheet 2

INVENTOR.
WALTER G. KLETTKE
BY
Woodhams, Blanchard and Flynn
ATTORNEYS

INVENTOR.
WALTER G. KLETTKE
BY
Woodhams, Blanchard & Flynn
ATTORNEYS

Feb. 23, 1971 W. G. KLETTKE 3,564,806
SYRINGE ASSEMBLING METHOD AND MACHINE
Filed Sept. 16, 1968 26 Sheets-Sheet 4
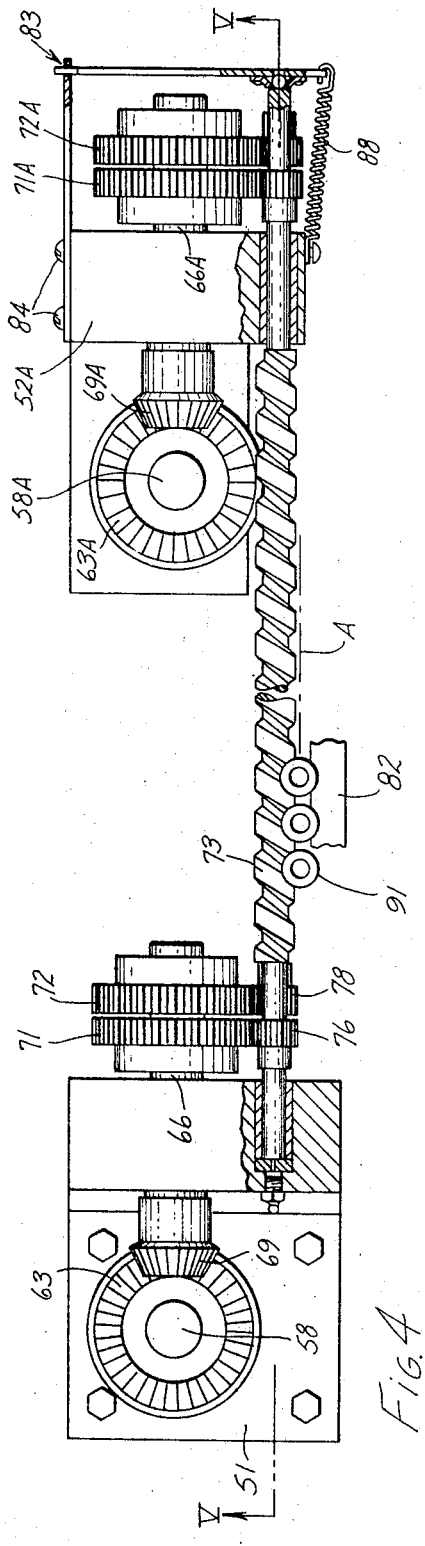
Fig. 4
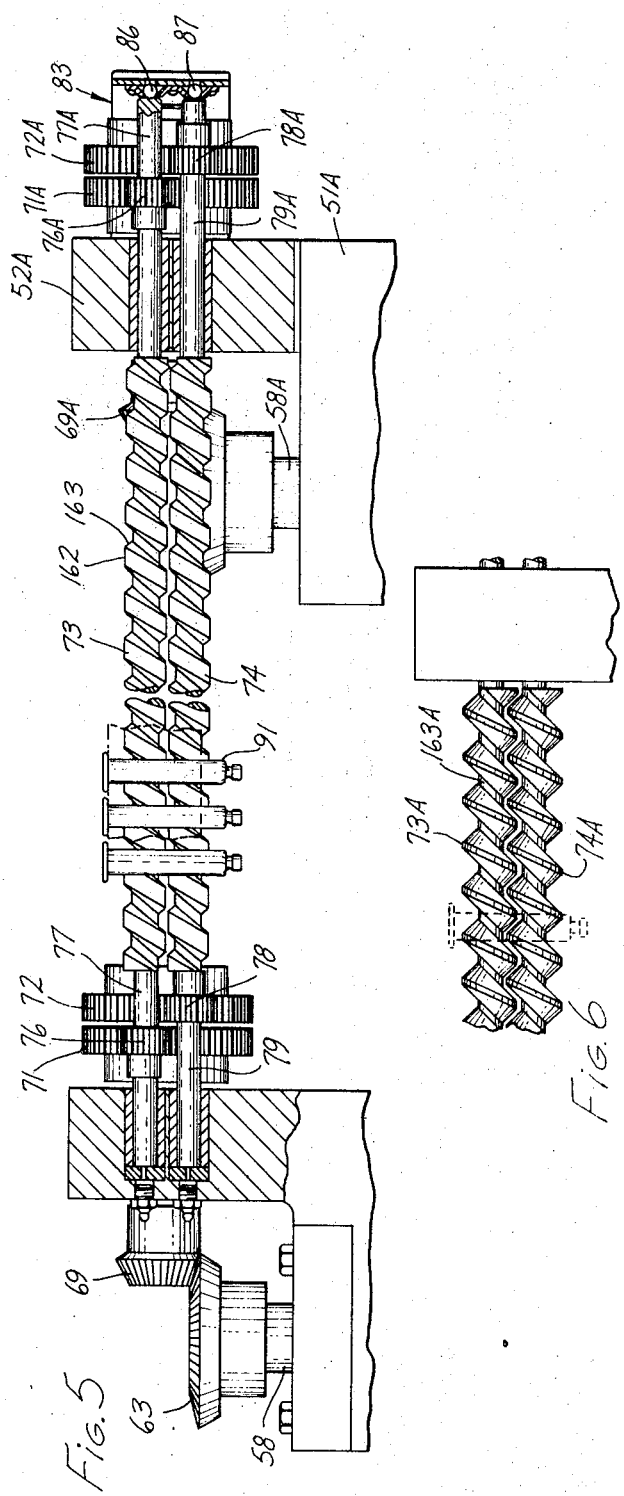
Fig. 5
Fig. 6
INVENTOR.
WALTER G. KLETTKE
BY
Woodhams, Blanchard & Flynn
ATTORNEYS Feb. 23, 1971   W. G. KLETTKE   3,564,806
SYRINGE ASSEMBLING METHOD AND MACHINE
Filed Sept. 16, 1968   26 Sheets-Sheet 5
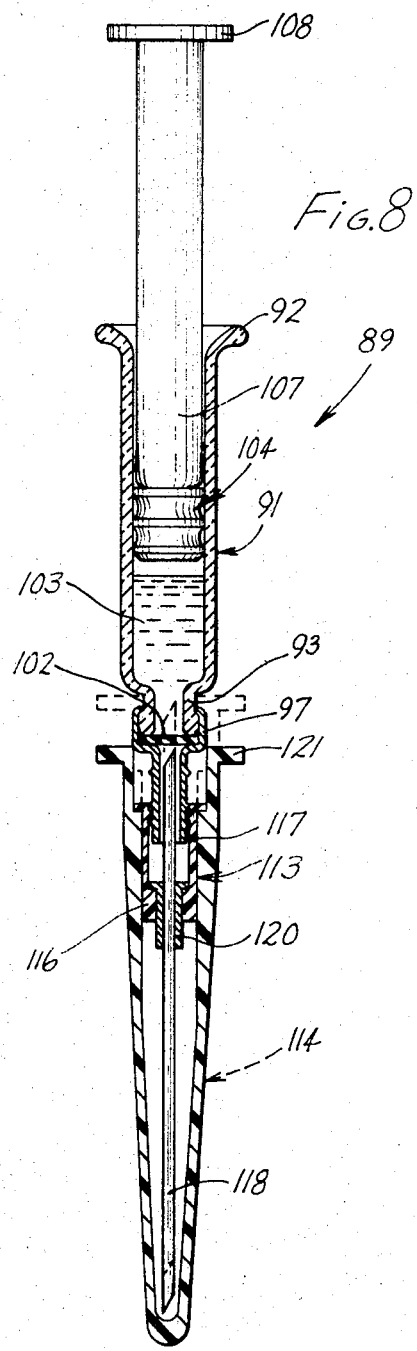
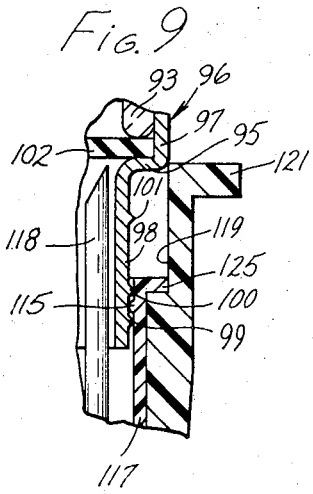
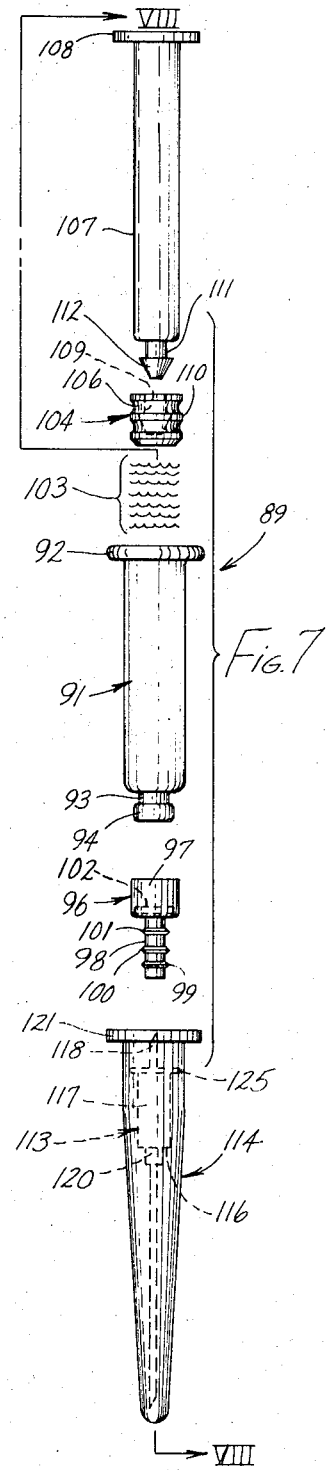
INVENTOR.
WALTER G. KLETTKE
BY
Woodhams, Blanchard & Flynn
ATTORNEYS INVENTOR.
WALTER G. KLETTKE
BY
Woodhams, Blanchard & Flynn
ATTORNEYS Feb. 23, 1971  W. G. KLETTKE  3,564,806

SYRINGE ASSEMBLING METHOD AND MACHINE

Filed Sept. 16, 1968  26 Sheets-Sheet 7

INVENTOR.
WALTER G. KLETTKE
BY
Woodhams, Blanchard & Flynn
ATTORNEYS

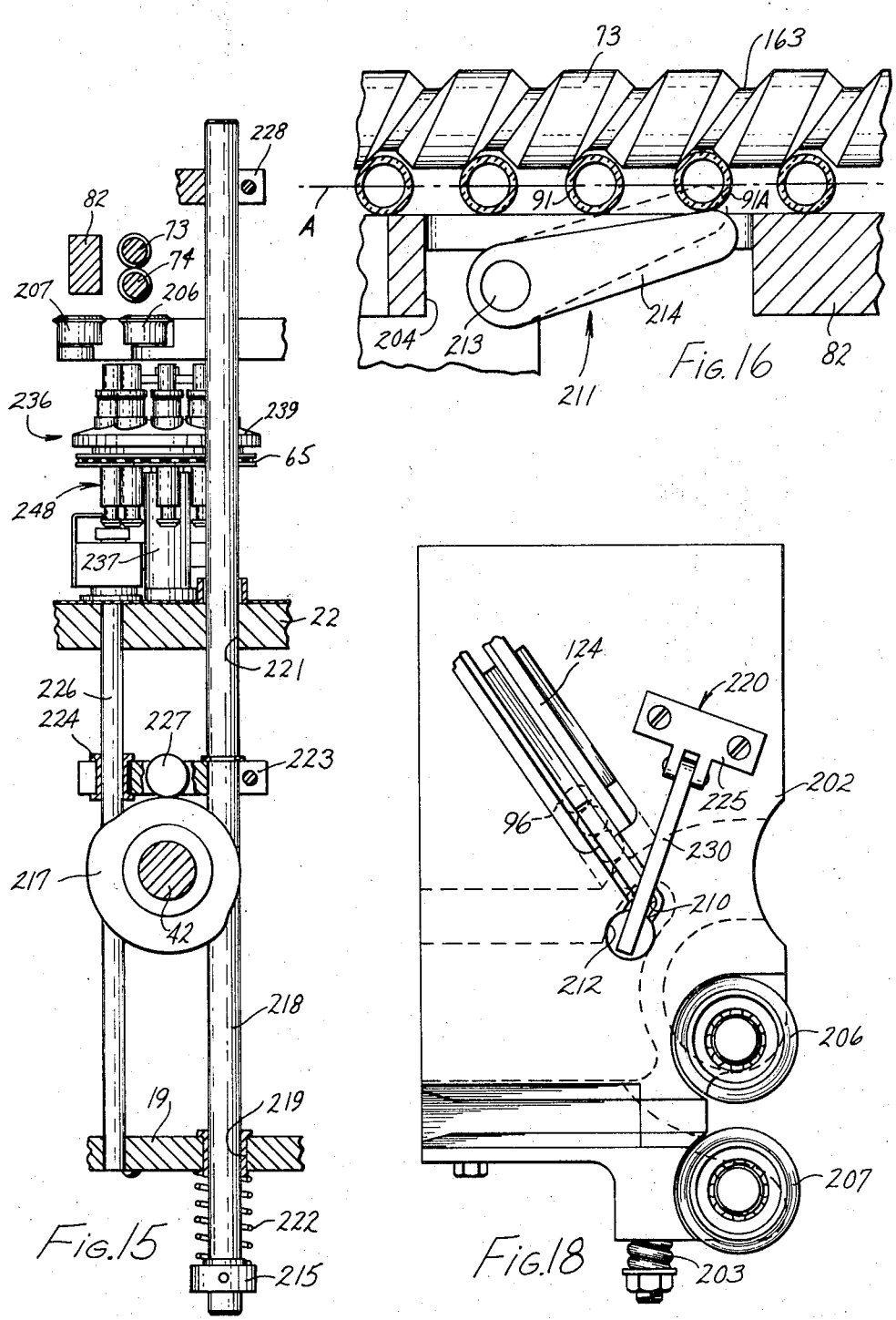

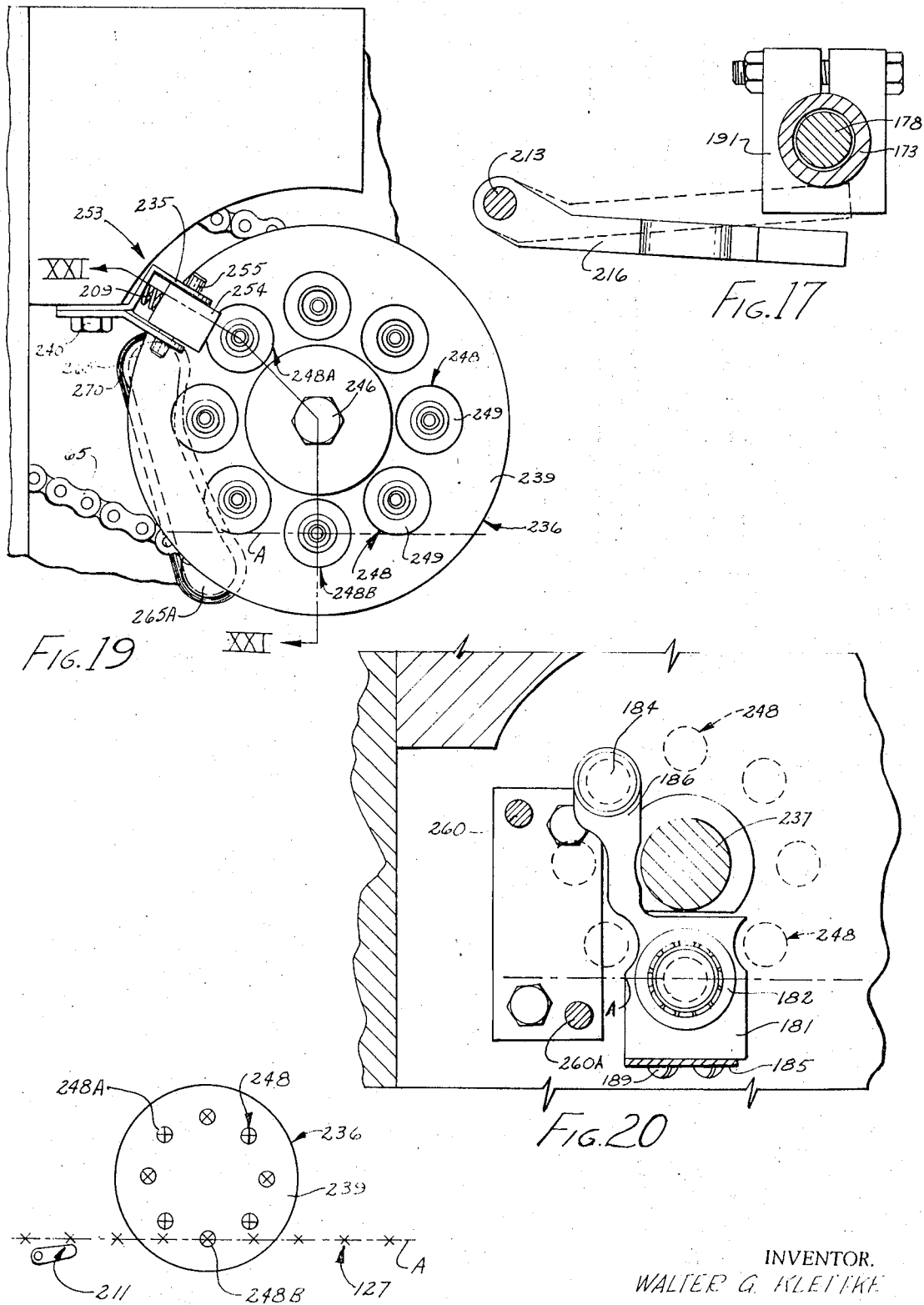

Feb. 23, 1971 W. G. KLETTKE 3,564,806
SYRINGE ASSEMBLING METHOD AND MACHINE
Filed Sept. 16, 1968 26 Sheets-Sheet 11
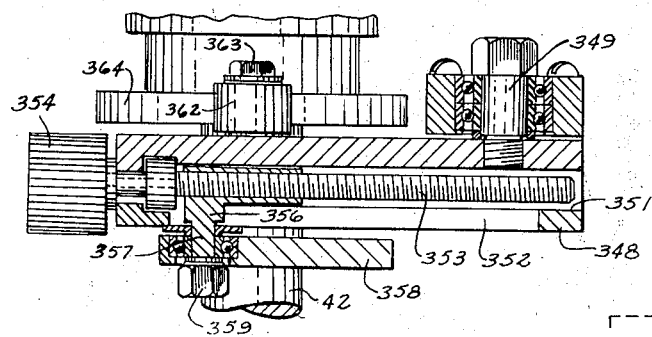
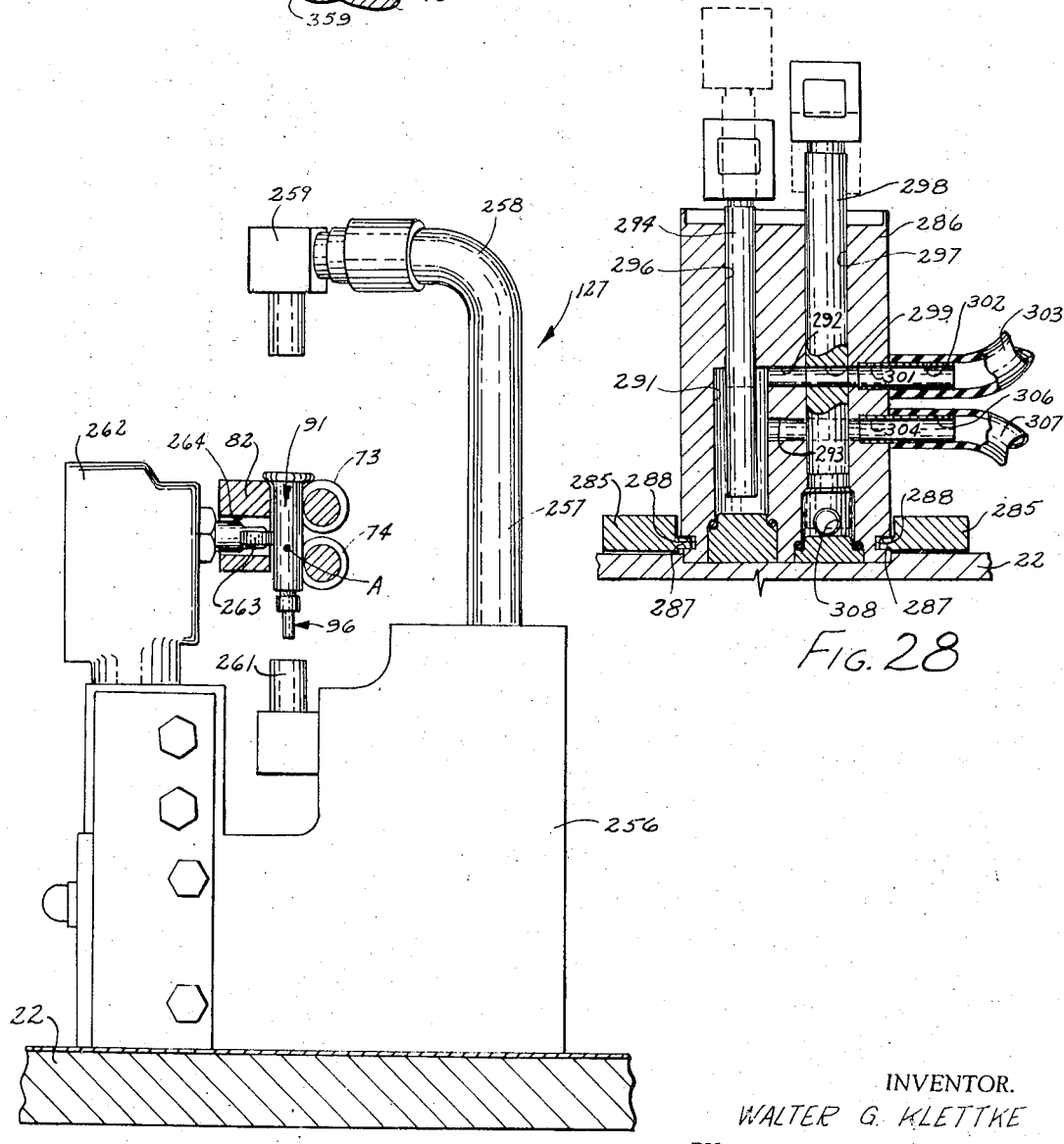
INVENTOR.
WALTER G. KLETTKE
BY
Woodhams, Blanchard & Flynn
ATTORNEYS

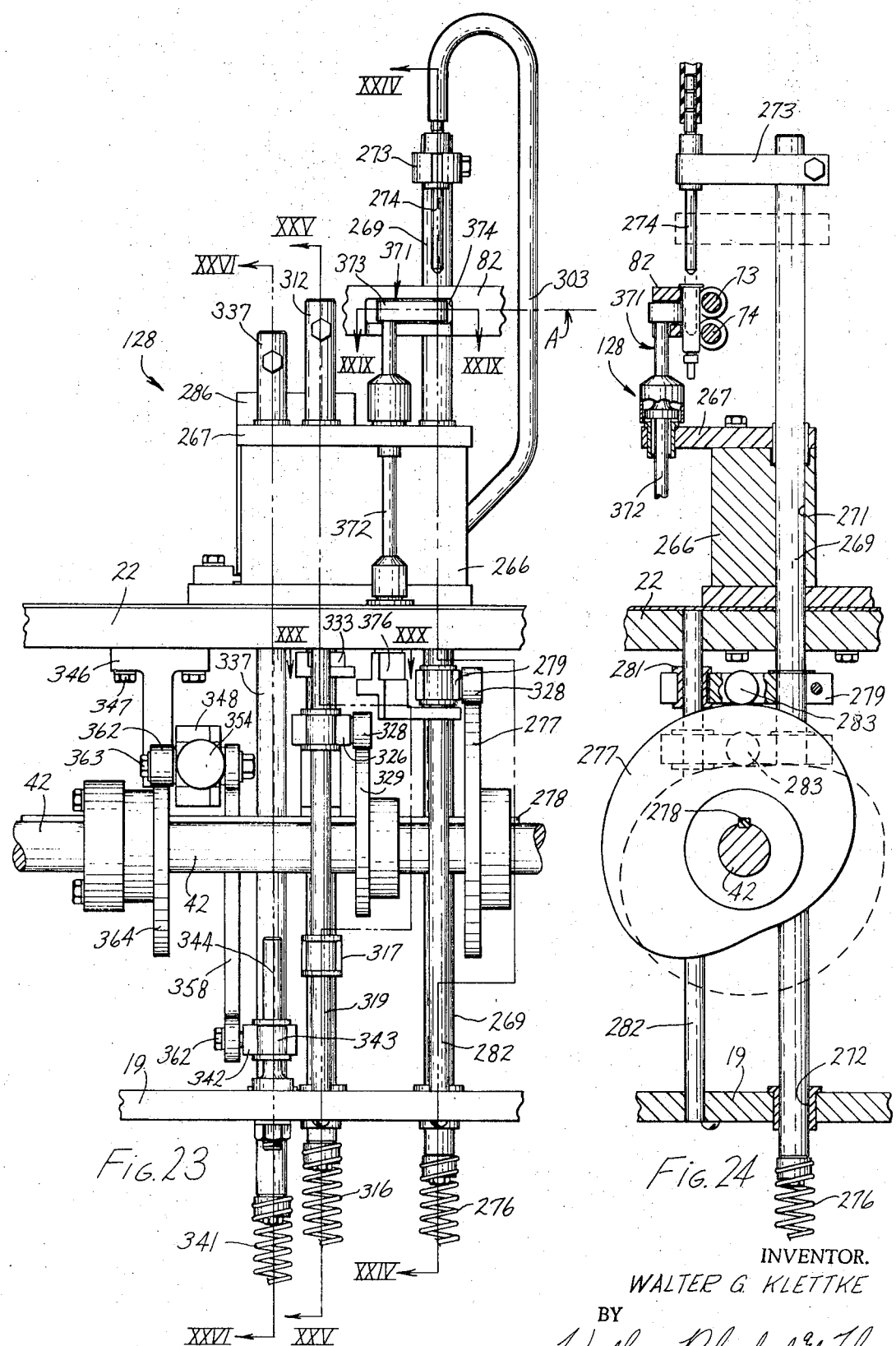

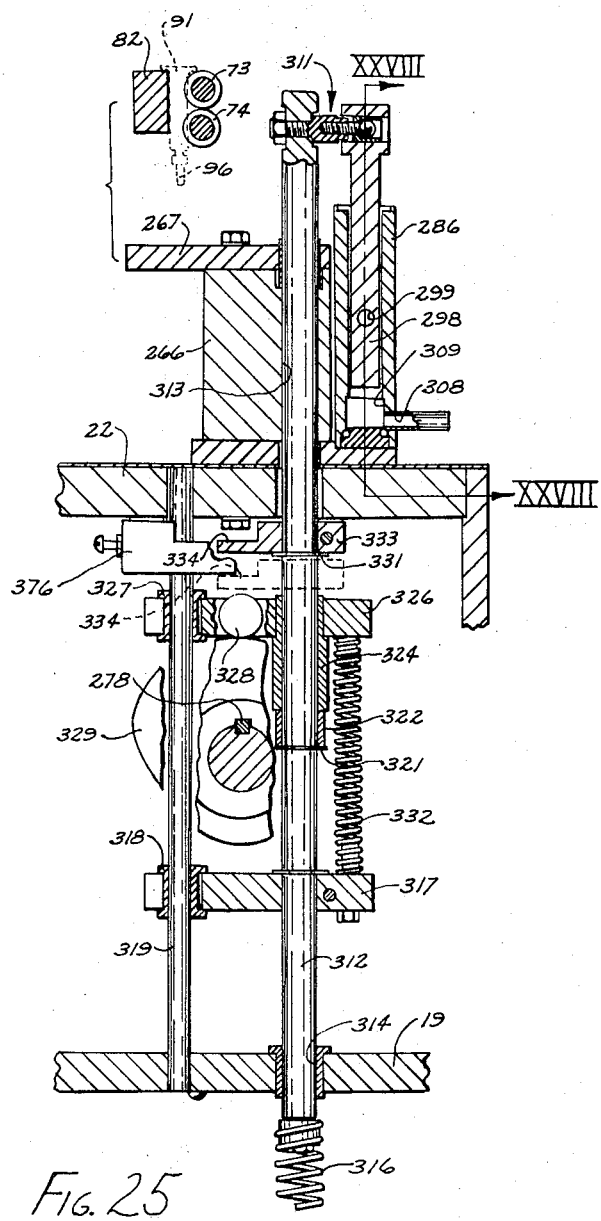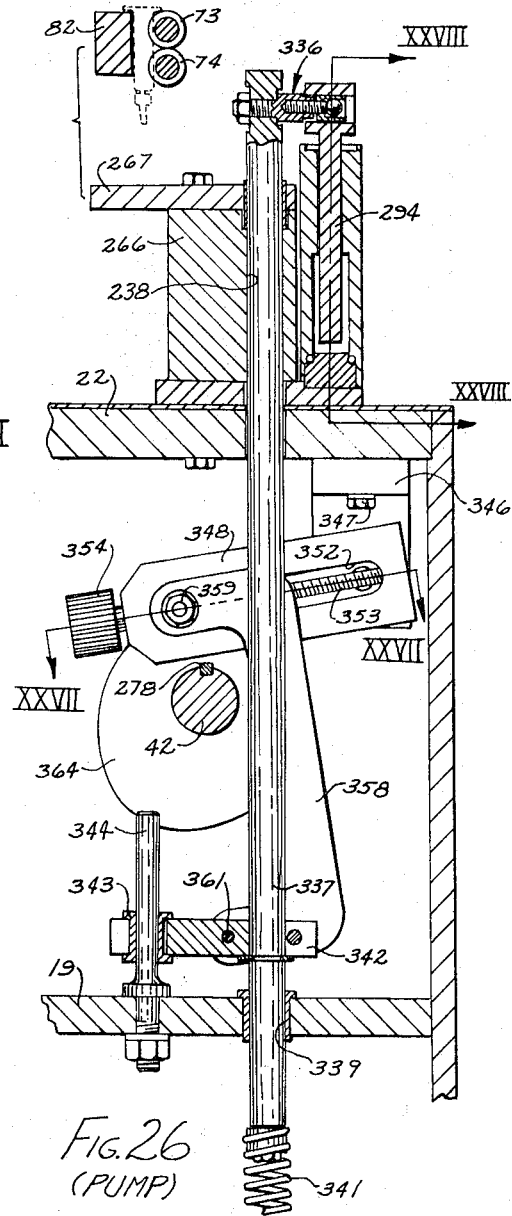

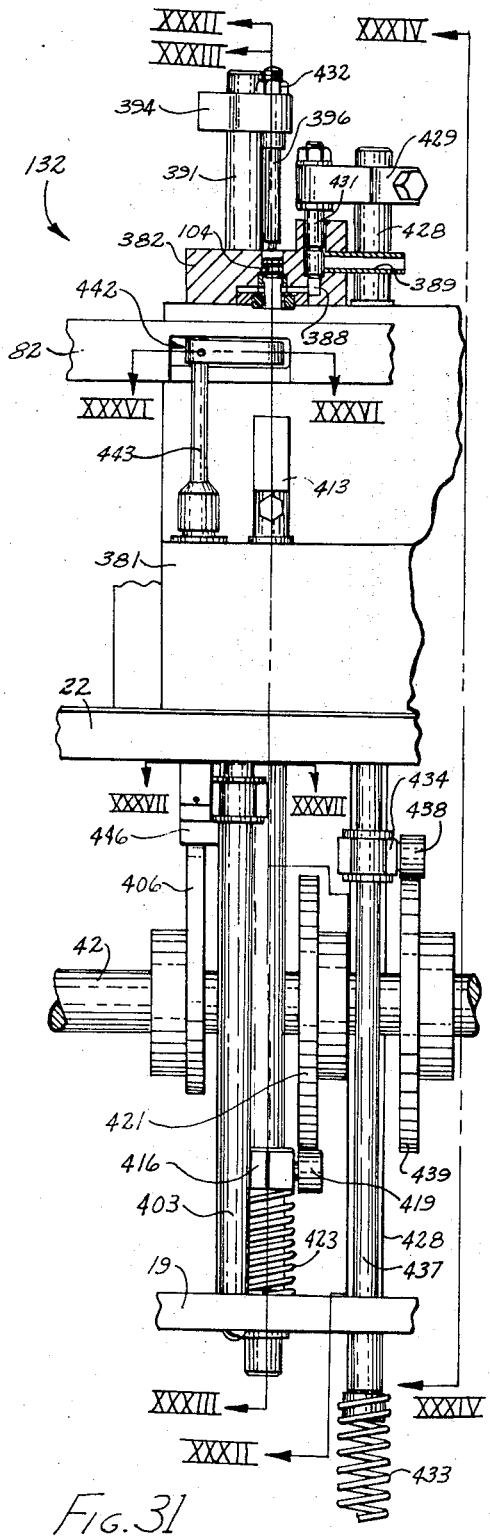
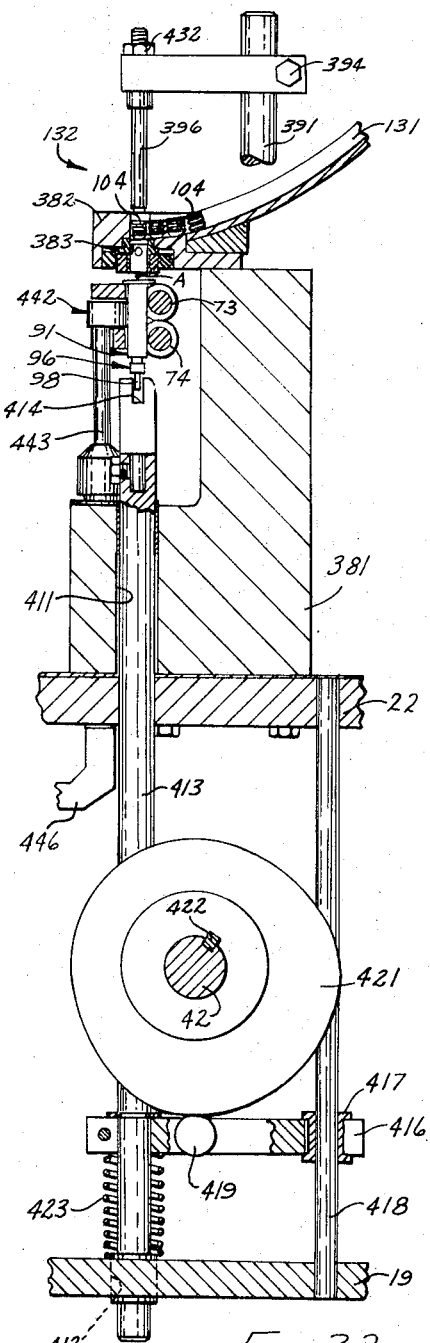
Fig. 31
Fig. 32

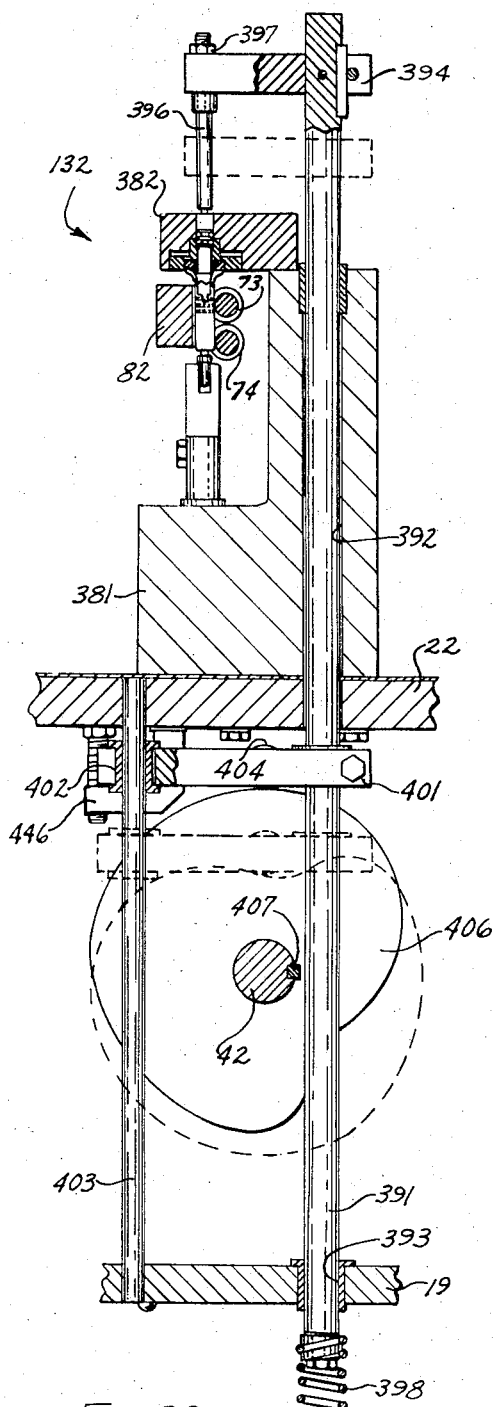
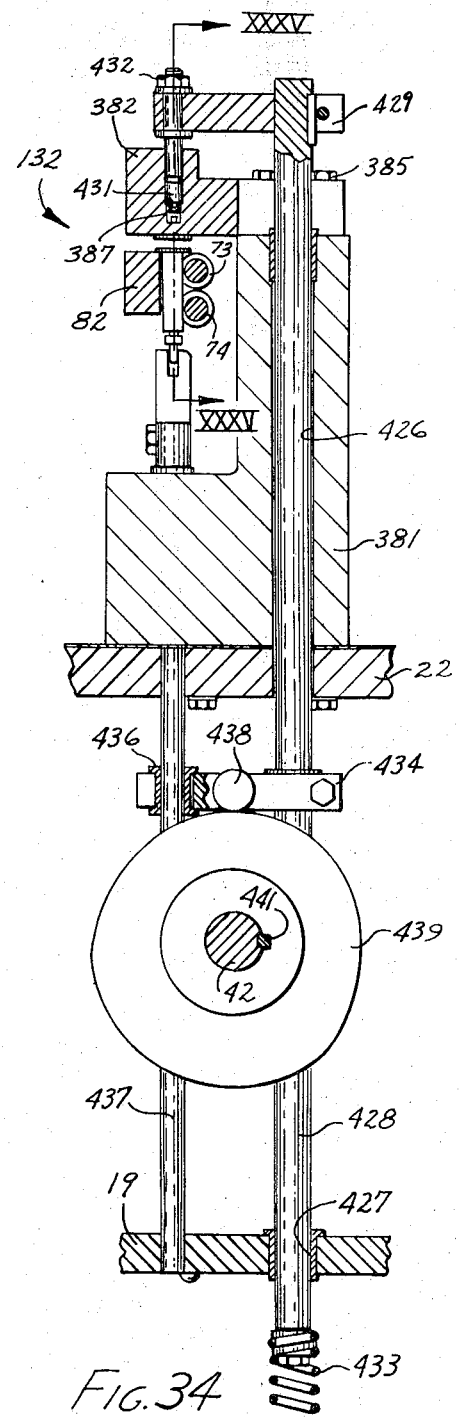
FIG. 33
FIG. 34
INVENTOR.
WALTER G. KLETTKE
BY
Woodhams, Blanchard & Flynn
ATTORNEYS INVENTOR.
WALTER G. KLETTKE
BY
Woodhams, Blanchard & Flynn
ATTORNEYS

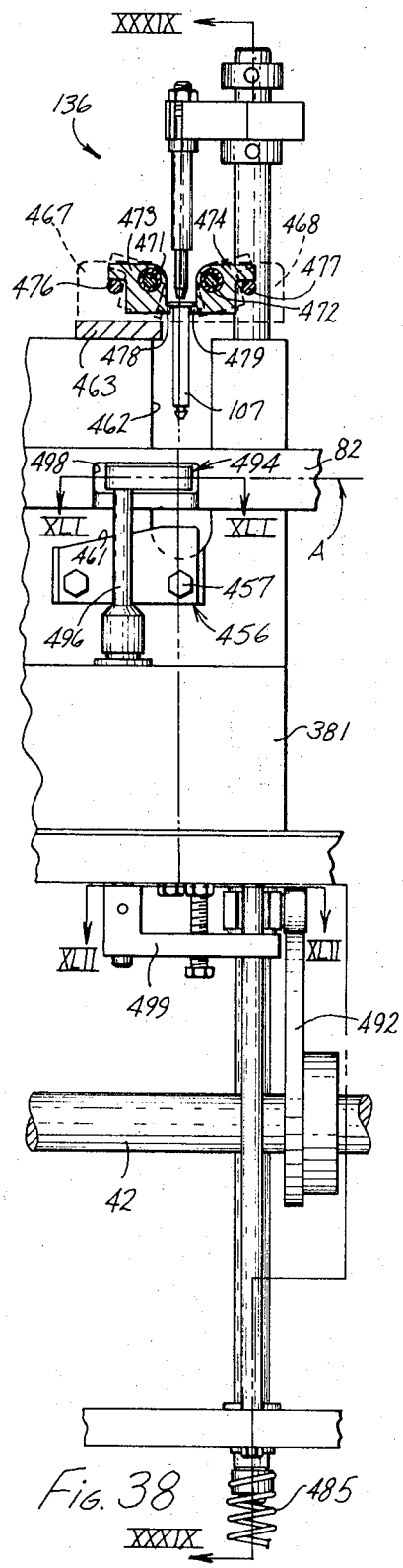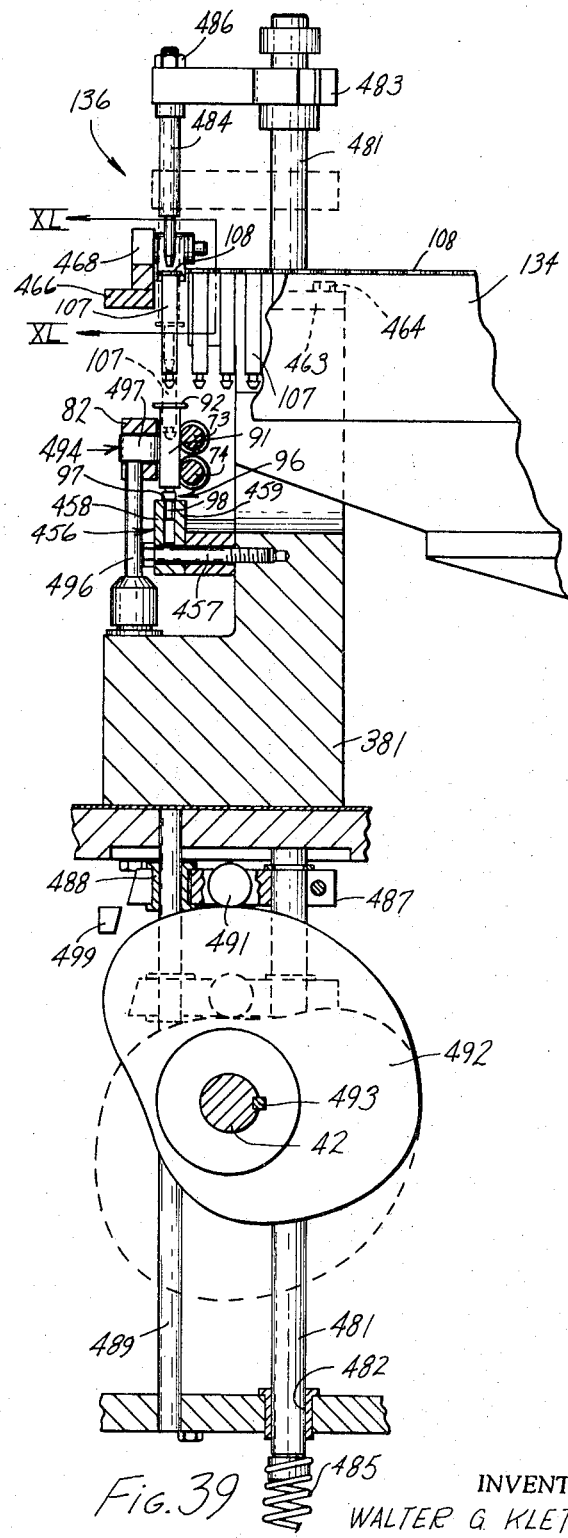

Feb. 23, 1971 W. G. KLETTKE 3,564,806
SYRINGE ASSEMBLING METHOD AND MACHINE
Filed Sept. 16, 1968 26 Sheets-Sheet 19
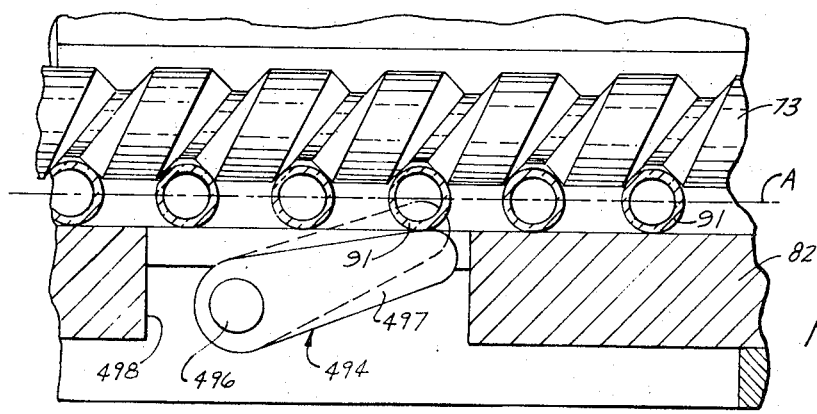
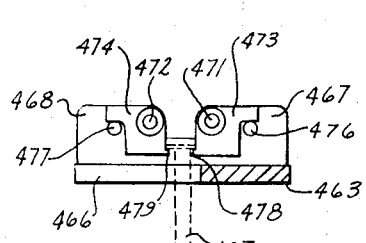
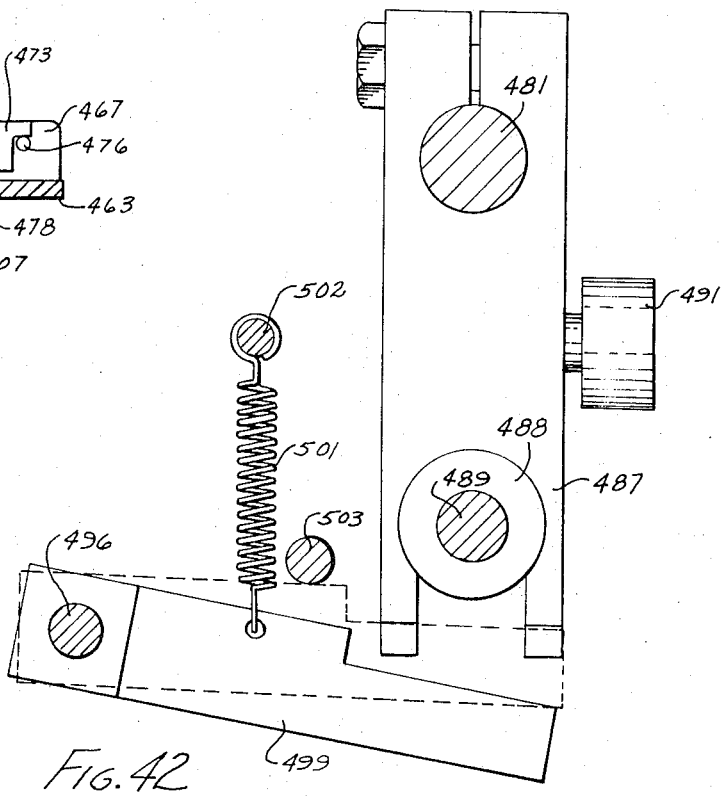
INVENTOR.
WALTER G. KLETTKE
BY
Woodhams, Blanchard & Flynn
ATTORNEYS

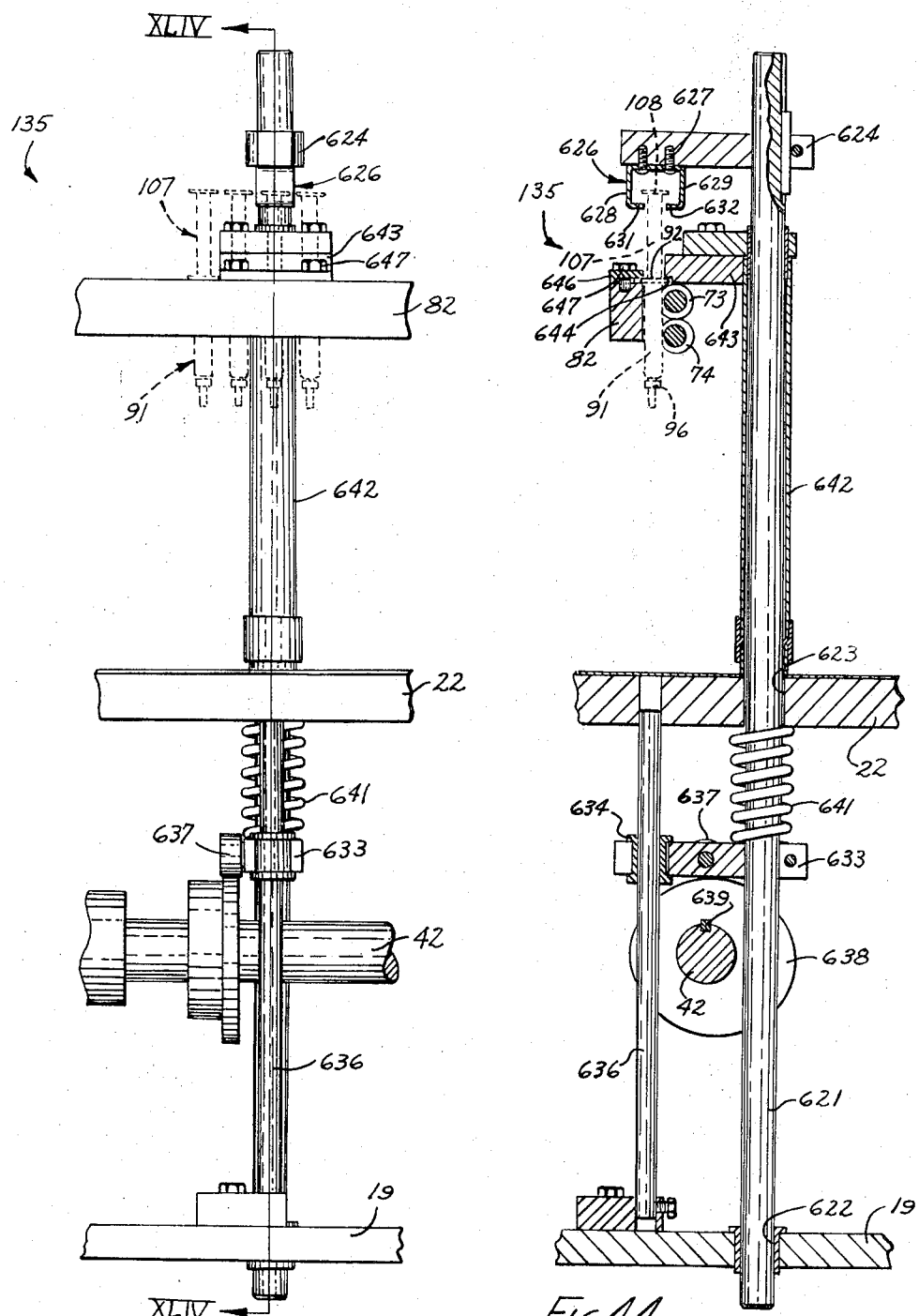

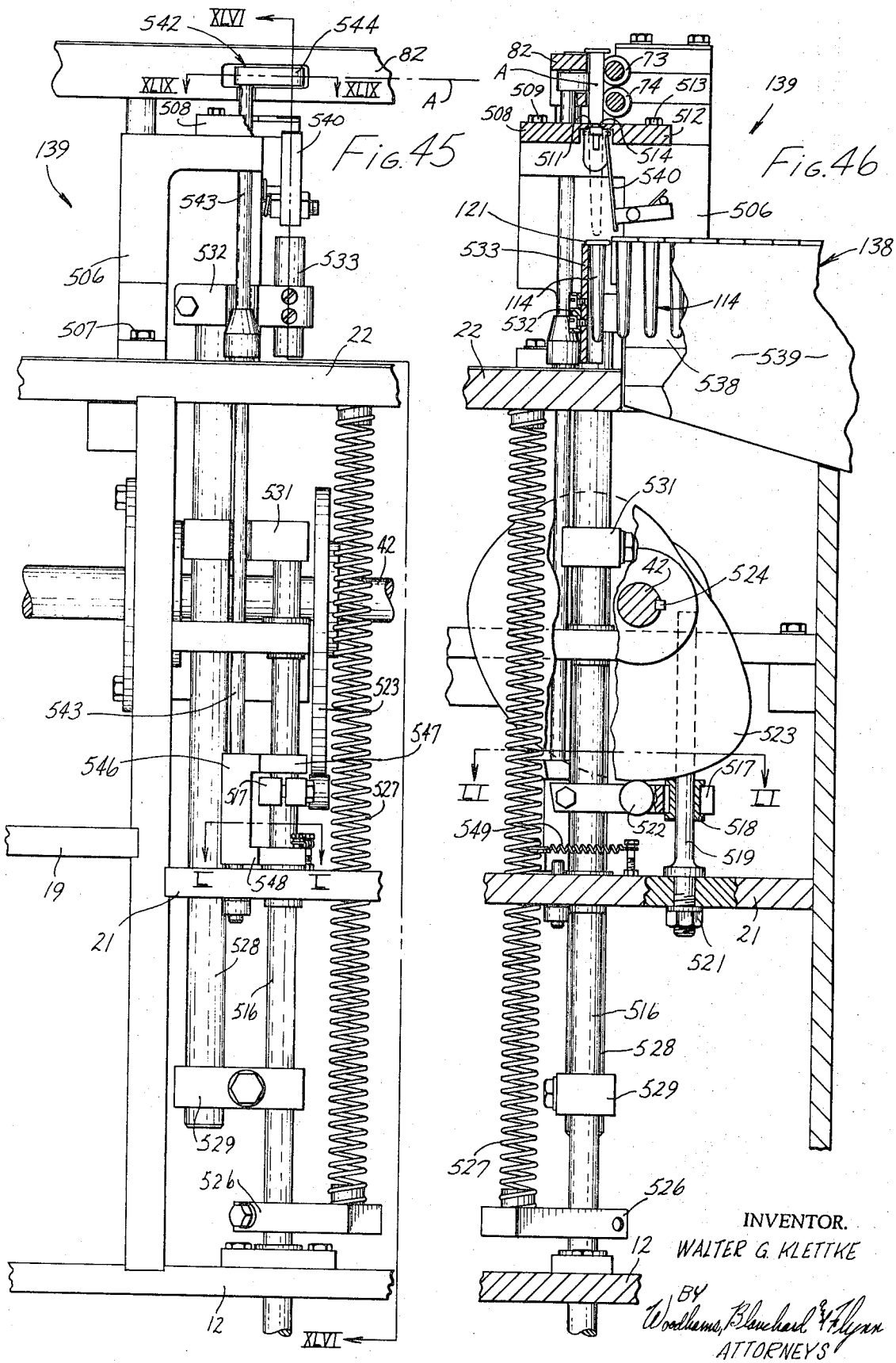

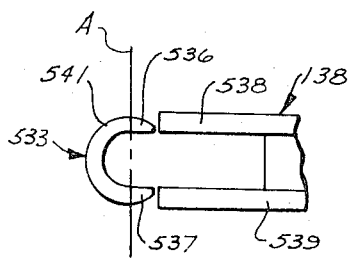
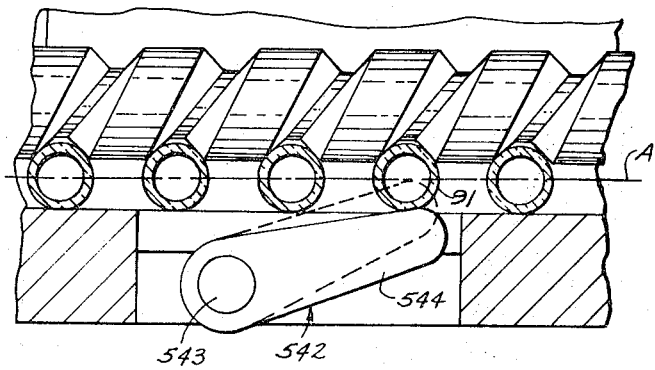
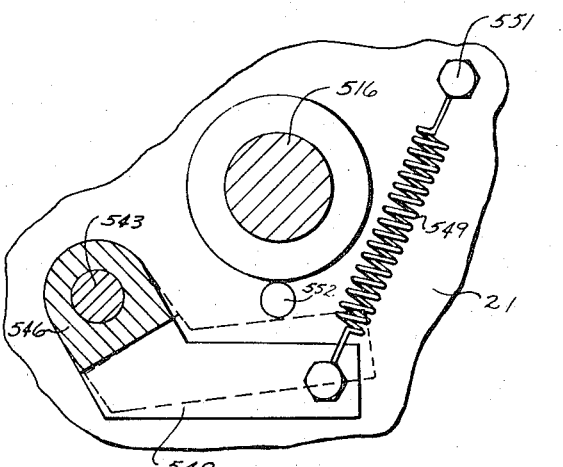
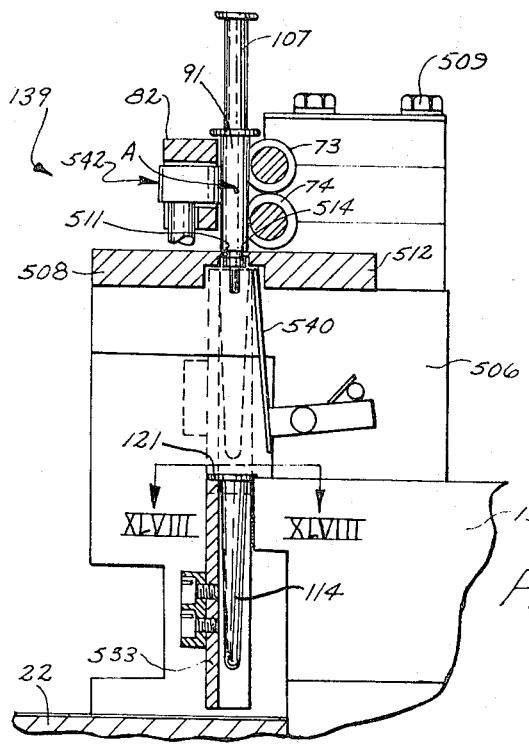

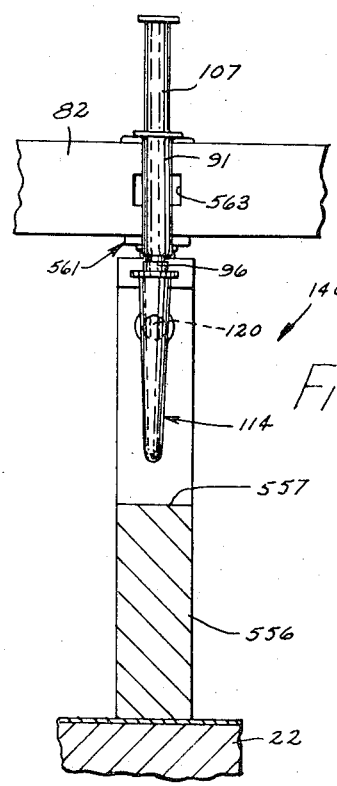
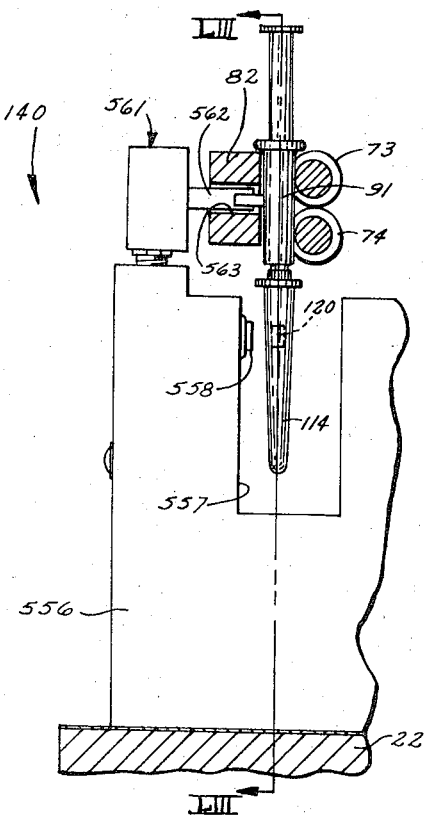
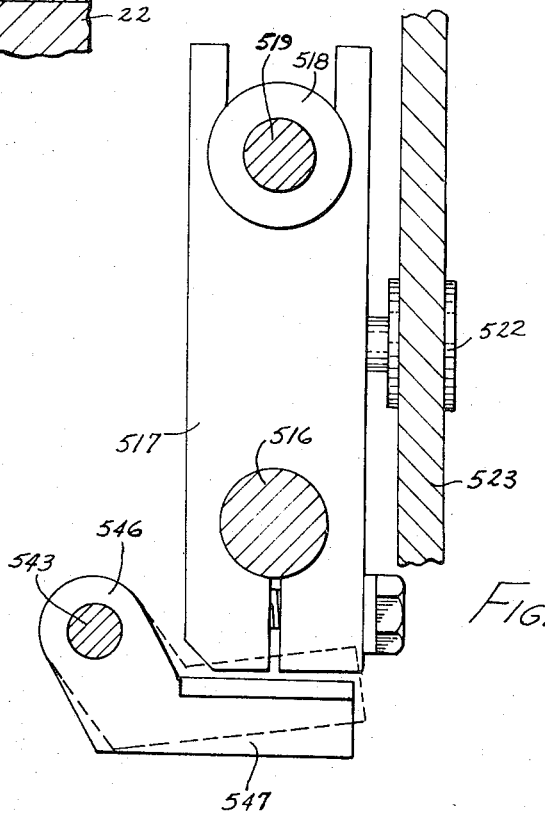

Feb. 23, 1971  W. G. KLETTKE  3,564,806
SYRINGE ASSEMBLING METHOD AND MACHINE
Filed Sept. 16, 1968  26 Sheets-Sheet 26

INVENTOR.
WALTER G. KLETTKE
BY
Woodhams, Blanchard & Flynn
ATTORNEYS

United States Patent Office 3,564,806
Patented Feb. 23, 1971

3,564,806
SYRINGE ASSEMBLING METHOD AND MACHINE
Walter G. Klettke, Cooper, Mich., assignor to The Upjohn Company, Kalamazoo, Mich., a corporation of Delaware
Filed Sept. 16, 1968, Ser. No. 759,875
Int. Cl. B65b 3/10, 31/00
U.S. Cl. 53—22   24 Claims

ABSTRACT OF THE DISCLOSURE

An apparatus for automatically assembling the various components of a syringe comprising a barrel, a plunger, a stopper, a hub, a needle and a needle cover. Automatic check means are provided at various points along the assembly line of the apparatus to verify that the assembly of each syringe has progressed satisfactorily. The syringe is filled with a fluid during the assembly operation.

FIELD OF THE INVENTION

This invention relates to an apparatus for assembling the components of and filling syringes and, more particularly, relates to an apparatus wherein the assembly operation is conducted automatically.

BACKGROUND OF THE INVENTION

While the need for relatively inexpensive disposable syringes has been readily recognized, it has been impossible to satisfy this need inasmuch as it has been too costly to assemble such syringes by hand and under sterile conditions; yet a machine for the automatic assembly and filling of disposable syringes heretofore has not been available.

It is an object of the present invention to provide an automatic apparatus capable of assembling and filling syringes at a relatively low cost and wherein barrel breakage or damage is avoided.

It is a further object of the present invention to provide an assembling apparatus, as aforesaid, which is easily cleaned, thereby reducing the downtime of the machine, which is self-checking, and is quickly restored to a condition of operability when a fault has been corrected.

Other objects and purposes of this invention will become apparent to persons acquainted with apparatus of this general type upon reading the following specification and inspecting the accompanying drawings.

BRIEF DESCRIPTION OF THE DRAWINGS

FIG. 4 is an enlarged, broken and partially sectional view of the drive mechanism and the drive screws from on top thereof.

FIG. 5 is a broken sectional view taken along the line V—V in FIG. 4.

FIG. 6 illustrates a modified form of the drive screws.

FIG. 7 is an exploded view illustrating the components of a syringe to be assembled by the machine.

FIG. 8 is a sectional view taken along the line VIII—VIII in FIG. 7.

FIG. 9 is an enlarged fragment of FIG. 8.

FIG. 15 is a broken sectional view substantially as taken along the line XV—XV in FIG. 13.

FIG. 16 is a sectional view taken along the line XVI—XVI in FIG. 13.

FIG. 17 is a sectional view taken along the line XVII—XVII in FIG. 13.

FIG. 18 is a sectional view taken along the line XVIII—XVIII in FIG. 13.

FIG. 19 is a sectional view taken along the line XIX—XIX in FIG. 13.

FIG. 19A is a schematic illustration of the hub assembly station.

FIG. 20 is a sectional view taken along the line XX—XX in FIG. 14.

FIG. 22 is a sectional view substantially as taken along the line XXII—XXII in FIG. 2.

FIG. 23 is a fragmentary front view of the filling mechanism as seen from the line XXIII—XXIII in FIG. 2.

FIG. 24 is a sectional view taken along the line XXIV—XXIV in FIG. 23.

FIG. 25 is a sectional view taken along the line XXV—XXV in FIG. 23.

FIG. 26 is a sectional view taken along the line XXVI—XXVI in FIG. 23.

FIG. 27 is a sectional view taken along the line XXVII—XXVII in FIG. 26.

FIG. 28 is a sectional view taken along the line XXVIII—XXVIII in FIGS. 25 and 26.

FIG. 31 is a broken and fragmentary front view of the stopper-applying mechanism as seen from the line XXXI—XXXI in FIG. 2.

FIG. 32 is a sectional view taken along the line XXXII—XXXII in FIG. 31.

FIG. 33 is a sectional view taken along the line XXXIII—XXXIII in FIG. 31.

FIG. 34 is a sectional view taken along the line XXXIV—XXXIV in FIG. 31.

FIG. 38 is a broken and fragmentary front view of the plunger-applying mechanism as seen from the line XXXVIII—XXXVIII in FIG. 2.

FIG. 39 is a sectional view taken along the line XXXIX—XXXIX in FIG. 38.

FIG. 40 is a sectional view taken along the line XL—XL in FIG. 39.

FIG. 41 is a sectional view taken along the line XLI—XLI in FIG. 38.

FIG. 42 is a sectional view taken along the line XLII—XLII in FIG. 38.

FIG. 43 is a fragmentary front view of the plunger-lifting mechanism as seen from the line XLIII—XLIII in FIG. 2.

FIG. 44 is a sectional view taken along the line XLIV—XLIV in FIG. 43.

FIG. 45 is a fragmentary front view of the needle-applying mechanism as seen from the line XLV—XLV in FIG. 2.

FIG. 46 is a sectional view taken along the line XLVI—XLVI in FIG. 45.

FIG. 47 is an enlarged fragment of the structure illustrated in FIG. 46.

FIG. 48 is a sectional view taken along the line XLVIII—XLVIII in FIG. 47.

FIG. 49 is a sectional view taken along the line XLIX—XLIX in FIG. 45.

FIG. 50 is a sectional view taken along the line L—L in FIG. 45.

FIG. 51 is a sectional view taken along the line LI—LI in FIG. 46.

FIG. 52 is a sectional view taken along the line LII—LII in FIG. 2.

FIG. 53 is a sectional view taken along the line LIII—LIII in FIG. 52.

Figure 1:
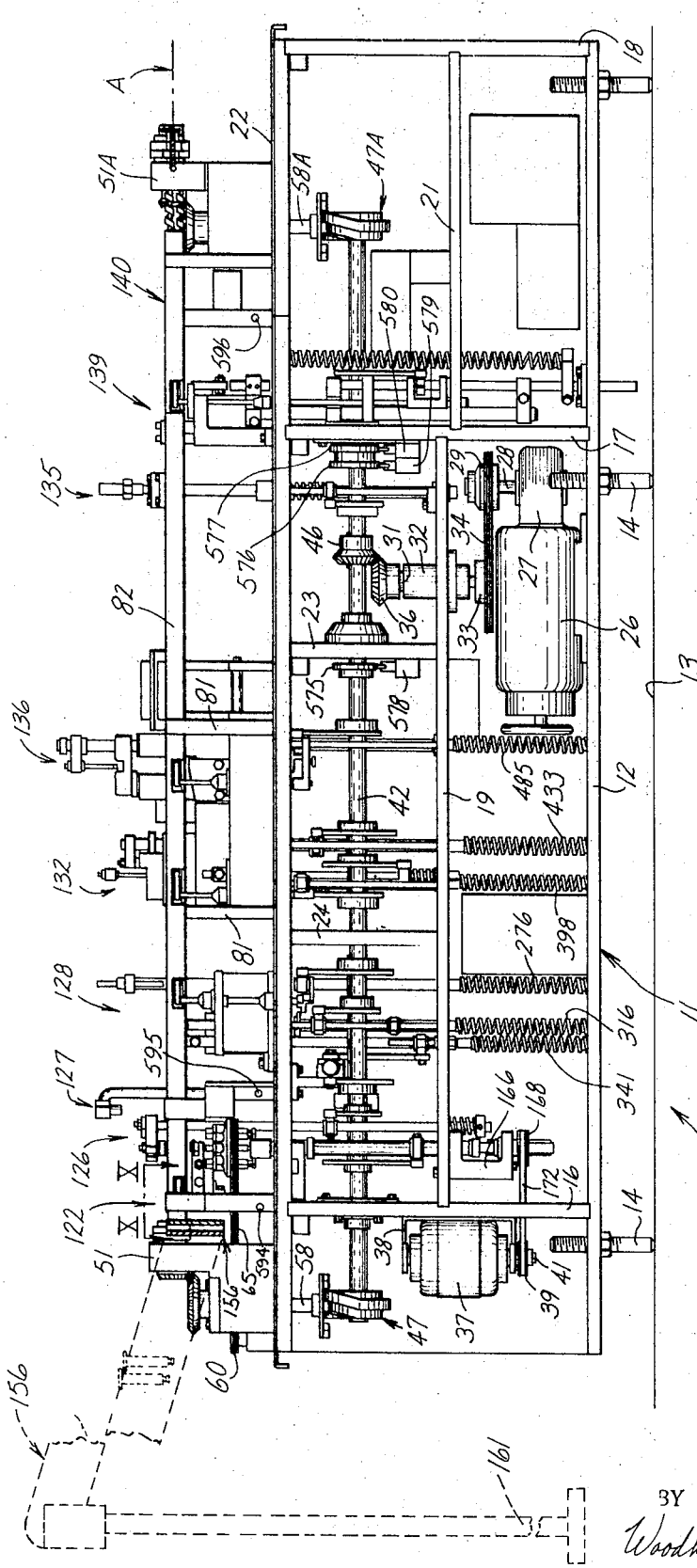
FIG. 1 is a front elevational view of a syringe assembling and filling machine embodying the invention. The barrel feed chute has been shown 90 degrees out of position and in broken lines.

For convenience in reference, the words "up," "down," "left," "right," "front" and "rear" will have reference to the machine in its normal position of operation, as appearing in FIG. 1, which shows the front of the machine. The words "inward" and "outward" will refer to the geometric center of the machine and designated parts thereof. Such terminology will include the words above mentioned, derivatives thereof and words of similar import.

SUMMARY OF THE INVENTION

The objects and purposes of the invention have been been met by providing an apparatus for assembling and filling a syringe, having barrel means open at one end and fluid blocking means and a needle receiving hub at the other end. Needle means and piston means are assembled to the barrel and hub at assembling stations while the barrel is filled with fluid. Automatic assembly check means are positioned adjacent the assembly stations for checking the assembly operations for completion. Further means are provided for removing the pressure from the fluid contained in the barrel means, which pressure may be developed during the assembling operation.

DETAILED DESCRIPTION

The syringe assembly machine 10 illustrated in FIG. 1 has a frame 11 which comprises a lower or base plate member 12 supported in an elevated position parallel to and spaced from the floor 13 by a plurality of vertically adjustable legs 14. A plurality of walls 16, 17 and 18 project upwardly from the lower plate 12 and are secured in any convenient manner thereto. An intermediate plate member 19 is located above and preferably parallel to the lower plate member 12 and is secured to the walls 16 and 17 by convenient means, such as welding. A second intermediate plate 21 is located above and preferably parallel to the lower plate member 12 and is secured between the walls 17 and 18 by convenient means such as welding rightwardly of plate member 19. A cover plate 22 is secured to the upper ends of the walls 16, 17 and 18 and constitutes a platform on which the syringe assembling elements discussed hereinafter are secured. A pair of walls 23 and 24 are secured between the intermediate plate 19 and the top wall 22.

A drive motor 26 is mounted on the lower base member 12 and has a gear type speed reducer 27 secured thereto with an output shaft 28. A sprocket 29 is secured to the shaft 28.

A bearing housing 32 extends through and is secured to the intermediate plate 19 in any convenient manner and rotatably supports a shaft 31. A sprocket 33 is secured to the lower end of the shaft 31 and is coplanar with the sprocket 29 secured to the shaft 28. An endless chain 34 interconnects the sprockets 29 and 33. A beveled gear 36 is secured to the upper end of the shaft 31 and is rotatable therewith.

A motor 37 is secured to a bracket 38 which in turn is mounted on the left side of the wall 16 and has a pulley 39 secured to the output shaft 41 thereof.

An elongated cam shaft 42 (FIGS. 1 and 3) is located between the top wall 22 and the intermediate plate members 19 and 21 and is rotatably supported by bearings 43 and 45 (FIG. 3) supported on the walls 16 and 17 by any convient means. A beveled gear 46 is secured to the shaft 42 and is in driving engagement with the beveled gear 36. In this particular embodiment, the gear 46 and shaft 42 are continuously driven by the gear 36 and motor 26. It is recognized, however, that other forms of this invention could utilize an intermittently driven shaft 42.

Figure 3:
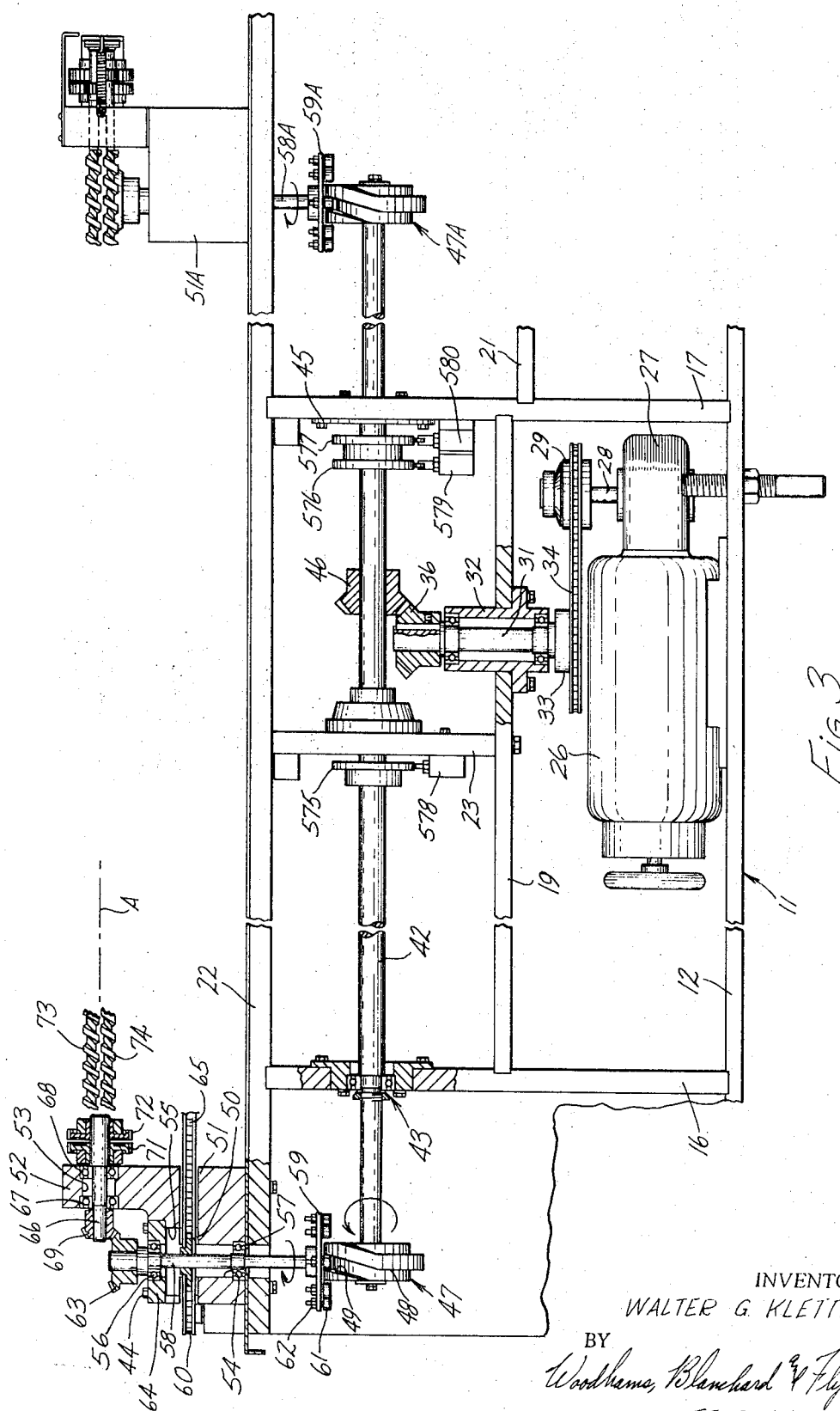
FIG. 3 is en enlarged, broken and partially sectional view of the drive mechanism from the side of the machine.

A cam member 47 is secured to the left end of the shaft 42 (FIG. 3). The cam 47 is preferably cylindrical in shape and has a pair of annular and axially spaced cam surfaces 48 and 49 facing each other.

A pillow-type block 51 is secured on the upper surface of the top wall 22 in any convenient manner and has a boss 52 projecting upwardly therefrom with a horizontal opening 53 therethrough. An opening 54 extends vertically through the block 51 and has an enlargement 55 at the upper end covered by a cap 64 secured to the block by a plurality of bolts 44. A pair of bearings 56 and 57 rotatably support a shaft 58 in opening 54. A sprocket 50 is secured to the shaft 58 in the recess 55 and is rotatable therewith. A plate 59 is secured to the lower end of the shaft 58 and a plurality of cam followers 61 are mounted on the underside thereof. The cam followers 61 are positioned so that they are engaged, one after another, between the cam surfaces 48 and 49 on the cam member 47 to cause the plate 59 to rotate intermittently a predetermined number of degrees with a selected, such as 360 degrees, rotation of the shaft 42 and cam member 47. In this particular embodiment, there are eight cam followers 61 and the plate 59 is rotated 45 degrees with 360 degrees rotation of the shaft 42. A beveled gear 63 is secured to the upper end of the shaft 58 (FIG. 4) and is rotatable therewith.

An idler sprocket 60 (FIGS. 1, 2 and 3) is rotatably supported coplanar with the sprocket 50, and an endless chain 65 is engaged with the sprockets 50 and 60.

A shaft 66 (FIG. 3) is rotatably supported in the opening 53 in the boss 52 by a pair of bearings 67 and 68. A beveled gear 69 is secured to the left end of the shaft 66 and is in driving engagement with the beveled gear 63. A pair of gears 71 and 72 are secured to the right end of the shaft 66 and are rotatable therewith.

A cam member 47A (FIG. 3), which is preferably identical to the cam member 47, is secured to the right end of the shaft 42 and is rotatable therewith. A pillow block 51A which may be similar to block 51, is secured to the top surface of the top wall 22 and rotatably supports a vertical shaft 58A having a plate 59A secured to the lower end thereof. The cam member 47A causes intermittent rotation of the plate 59A synchronized with similar rotation of the plate 59. Thus, the shaft 58A is rotated the same predetermined number of degrees as shaft 58 for every complete revolution of the cam member 47A, hence, of shaft 42.

A shaft 66A (FIG. 4) is rotatably supported in the boss 52A of the pillow block 51A. A beveled gear 69A is secured to the left end of the shaft 66a on the left side of the boss 52A and is drivingly engaged with the gear 63A.

Gears 71A and 72A are secured to the right end of the shaft 66A on the opposite side of the boss 52A and are rotatable therewith.

A pair of upper and lower screw members 73 and 74, respectively (FIGS. 4 and 5), are each rotatably journaled in and extend between the bosses 52 and 52A. A gear 76 is secured to the left end 77 on the screw 73 and is drivingly engaged with the gear 71. A gear 78 is secured to the left end 79 of the screw 74 and drivingly engaged with the gear 72. The gears 76 and 78 are preferably of the same size and are driven at the same speed by the gears 71 and 72, which are also of the same size.

A gear 76A is secured to the right end 77A of the screw 73. A gear 78A is secured to the right end 79A of the screw 74. The gear 76A is drivingly engaged with the gear 71A and the gear 78A is drivingly engaged with the gear 72A.

An L-shaped support bracket 83 is secured to the boss 52A by screws 84 and a pair of spaced, upper and lower balls 86 and 87, respectively, are mounted on the bracket 83 for engagement with the axially facing right ends of the screws 73 and 74, respectively, to act as thrust bearings. A spring 88, connected between the boss 52A and the bracket 83, resiliently biases the ball elements 86 and 87 against the right ends of the screws 73 and 74. The ball elements also serve to stabilize the ends of the screws and to keep the ends from moving in orbital path when a radial load is applied to the screws.

A plurality of braces 81 are supported on the upper surface of the top wall 22 (FIG. 1) and extend vertically upwardly therefrom. A guide member 82 (FIG. 2) is secured to the upper ends of the braces 81 and extends generally parallel to the screws 73 and 74 and spaced slightly frontwardly therefrom as illustrated in FIG. 4.

The pitch of the screws 73 and 74 is identical and they are rotated by the gears 76, 76A and 78, 78A at exactly the same speed and in the same rotational direction. The screws 73 and 74 are synchronized so that the crest 162 and root 163 of the screw 73 are vertically aligned with corresponding portions of the crest and root on the screw 74. The purpose for this construction will become apparent later in the discussion.

COMPONENTS OF SYRINGE

FIGS. 7 and 8 illustrate the component parts of an unassembled and assembled syringe 89, respectively. The syringe comprises a hollow, cylindrical barrel 91 having a radially outwardly projecting flange 92 at the upper end thereof. A neck 93 is located on the lower end and has a diameter less than that of the barrel 91. A radially outwardly projecting and annular ridge 94 is located on the free end of the neck 93 but has a diameter greater than the neck portion 93 but less than the diameter of the barrel 91.

The syringe 89 includes a hub 96 preferably made of aluminum and having a cylindrical sleeve 97 into which the neck 93 is slideably and snugly received after which said sleeve is spun on the rib 94. A hollow neck 98, having a diameter less than that of the cylindrical sleeve 97, is formed on the lower end of the hub 96 and has a plurality here three, of radially outwardly projecting and annular ridges 99, 100 and 101 formed thereon. Said ridges have a diameter greater than the neck portion 98 but less than the cylindrical sleeve portion 97. A seal 102 is provided within the cylindrical sleeve 97 and is sealingly held between the neck 93 and the shoulder in the hub 96 to prevent the flow of fluid through the hub 96.

The number 103 represents the fluid which is inserted into the barrel.

A resilient piston 104, which is generally cylindrical and has a plurality of radially outwardly extending and circular ridges 110, is adapted to be slideably and snugly received into the barrel 91 for urging the fluid 103 through needle 118 after the needle penetrates the seal 102. A coaxial recess 109 is located in the upper end of the piston 104 to receive the lower end 112 of a plunger or piston rod 107.

The piston rod 107 may be cylindrical in shape and has a radially outwardly projecting flange 108 located at the upper end thereof. A neck 111 at the lower end of the plunger 107 has a downwardly tapered head 112 which is forced into the somewhat smaller opening 109 in the resilient piston 104 so that same cannot be accidentally pulled away from the plunger in use.

The syringe 89 also includes a needle or cannula assembly 113 and a needle sheath 114. An elongated needle 118 projects coaxially through an opening in the bottom wall 116 of a cup-shaped shell 117 and is secured in said opening by a hub member 120. The upper portion of needle 118 is spaced radially from and projects axially beyond the open end of the cup-shaped shell 117. The shell 117 has an annular ridge 115 (FIG. 9) projecting radially inwardly from the shell, said ridge 115 having a smaller inside diameter than the outside diameters of the ridges 99, 100 and 101 on neck 98.

The needle sheath or casing 114 is generally tubular-shaped and tapers slightly toward its lower, closed end, said sheath being open at the upper end. The open end in sheath 114 has an enlarged upper portion 119 in which the flange 125 at the top of the shell 117 is snugly disposed, thereby limiting downward movement of the shell 117 relative to the sheath 114. A radially outwardly projecting flange 121 is integral with the upper end of the needle casing 114. The upper end of the the needle 118 is at least flush with, and preferably spaced downwardly of, the plane defined by the upper surface of the flange 121 for reasons of safety in handling and sanitation. The sleeve 97 on the hub 96 is slideably receivable into the enlarged upper end portion 119 of the sheath 114.

GENERAL ASSEMBLY

Figure 2:
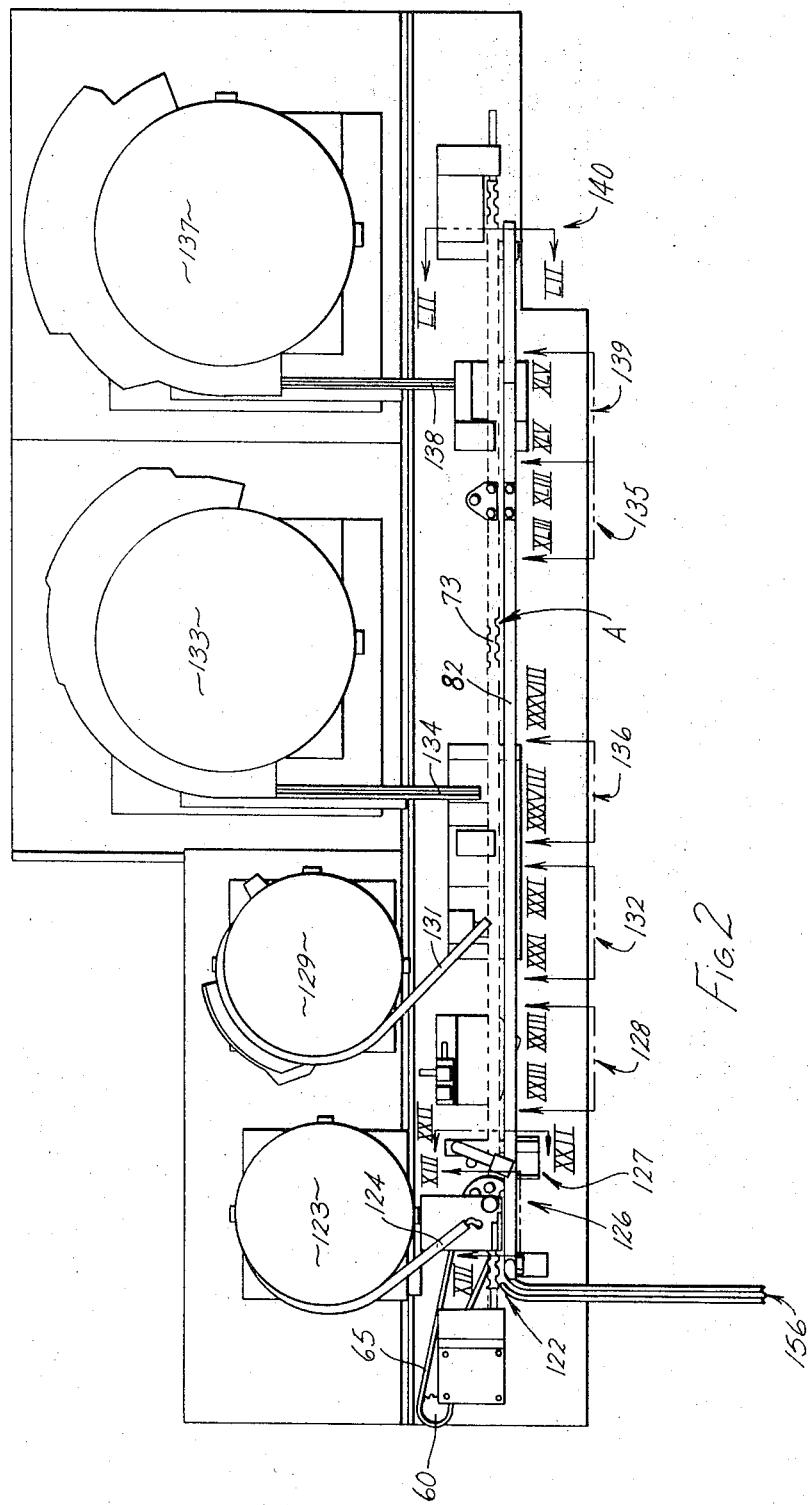
FIG. 2 is a top plan view of the machine.

Referring now to FIGS. 1 and 2, the components of the syringe 89 are fed to the assembly line A of the machine 10 at the following stations. The barrel 91 of the syringe is fed into the machine at barrel feed station 122. The hubs 96 are placed in the supply basin 123 of a conventional vibratory feed mechanism and are automatically fed therefrom and properly oriented on a feed track 124 which delivers the hubs to the hub assembly station 126. Once the hub has been assembled with the barrel 91, the two assembled parts are then inspected at the check station 127 to verify that the hub has been placed on the barrel 91 and that the dam 102 (FIG. 9) is in place. At the completion of the barrel and hub inspection, the resultant assembly is then moved to the filling station 128 (FIG. 1) and filled with fluid 103 (FIG. 8).

A plurality of stoppers or pistons 104 are placed in the supply basin 129 of a conventional vibratory feed mechanism and automatically fed therefrom and properly oriented on a feed track 131 which delivers them to the stopper assembly station 132.

A plurality of plunger rods 107 are placed in the supply basin 133 of a conventional vibratory feed mechanism and automatically removed therefrom and properly oriented on a feed track 134 which delivers them to the plunger rod assembling station 136.

The assembled barrel 91, hub 96, fluid 103, pistons 104 and plunger rods 107 are moved to the lift station 135 where the plunger rods 107 and attached pistons are lifted to remove the pressure from the fluid 103.

A plurality of needle assemblies 113 and needle sheaths 114, which are preassembled, are placed into a vibratory feed mechanism 137 and are automatically fed therefrom and properly oriented on a feed track 138 which delivers them to an assembly station 139.

After the needle assembly 113 and needle sheath 114 are mounted on hub 96, the presence of a needle assembly is detected at the needle check station 140 so as to verify that the needle assembly has been mounted satisfactorily.

Having thus outlined the various assembling stations of the machine 10 in general terms, the details of the various components and stations will now be set forth specifically.

BARREL FEED STATION 122 (FIGS. 1, 2, 10–12)

Figure 10:
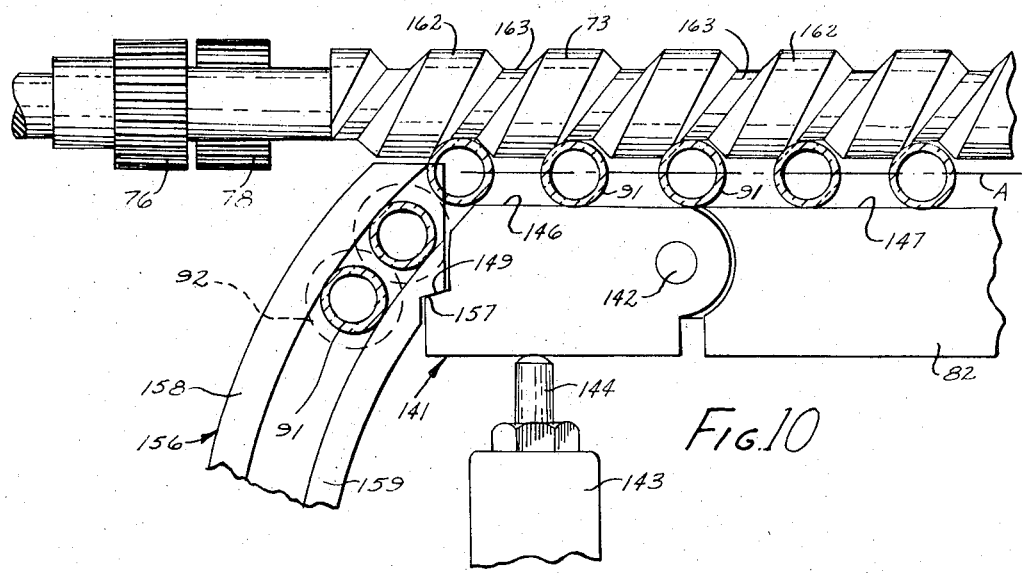
FIG. 10 is a sectional view taken along the line X—X in FIG. 1 and illustrating the gate mechanism.
Figure 12:
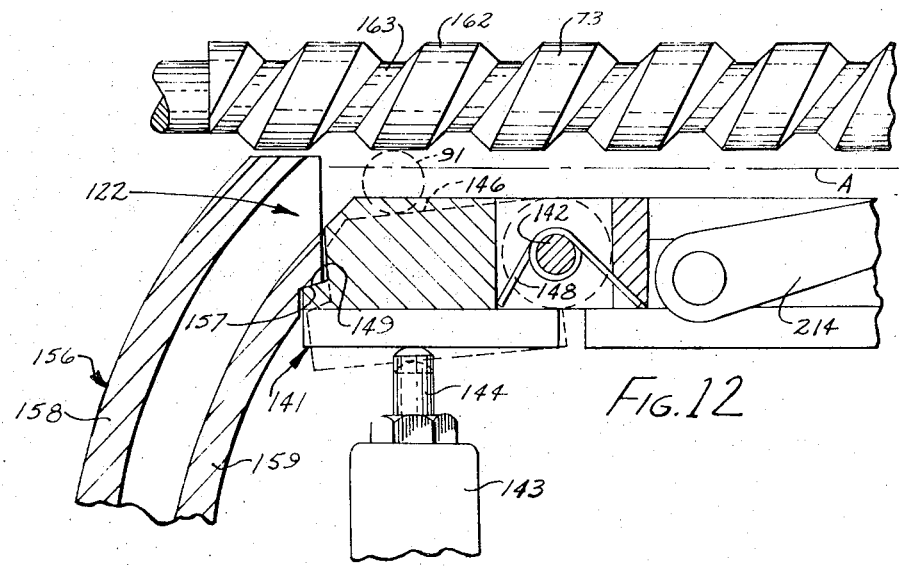
FIG. 12 is a sectional view taken along the line XII—XII in FIG. 11.

A gate member 141 (FIG. 10) is pivotally secured to the left end of the guide member 82 by a pin 142. A switching mechanism 143 is positioned adjacent the gate member 141 so that the switch plunger 144 is resting against the front surface of the gate member. The gate 141 has a rear edge 146 preferably aligned with the rear edge 147 on the guide member 82 when the gate member is closed. The edges 146 and 147 are spaced frontwardly from, and are parallel with, the plane defined by the axes of the screws 73 and 74. A spring 148 (FIG. 12) serves to bias the gate member 141 toward the solid line, closed position illustrated in FIGS. 10 and 12. A notch 149 is located in the left end of the gate member 141.

Figure 11:
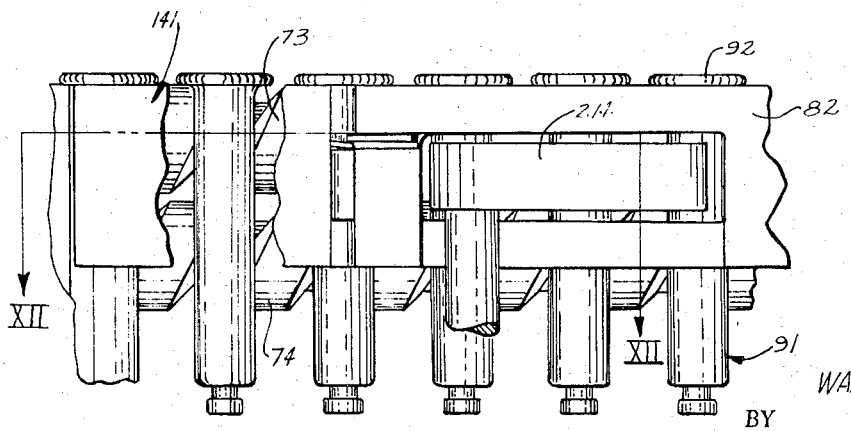
FIG. 11 is a broken side view of the gate mechanism.

A track 156 (FIG. 12) extends to the barrel feed station 122 (FIGS. 1 and 2) located adjacent the left ends of the gate member 141 and the screws 73 and 74, as illustrated in FIG. 11. The track 156 in FIG. 1 is shown 90 degrees out of position (see FIG. 2) to illustrate the inclination thereof. The track 156 comprises two parallel rails 158 and 159 which are spaced apart a distance slightly greater than the diameter of the barrel 91 but less than the diameter of the flange 92 thereon. A notch 157 (FIG. 12), located in the right end of the rail 159, cooperates with the notch 149 on the gate 141 to limit the pivoting moment of the gate 141 toward the screw 73 under the urging of the spring 148.

The front or supply end of the track 156 (FIG. 1) is maintained at a higher elevation than the end thereof adjacent station 122 by a support member 161. Nevertheless, by selecting the correct slope for the track 156, the barrels remain vertical due to the overlapping of the flanges 92, as best illustrated in dotted lines in FIG. 1.

The spacing between the line defined by the edges 146 and 147 of the gate 141 and the guide member 82, and the line defined by the adjacent edges of the crests 162 on the screws 73 and 74 is preferably substantially less than the diameter of the barrel 91. The spacing between the line defined by edges 146 and 147, and the line defined by the roots 163 of the screws 73 and 74 is preferably slightly greater than the diameter of the barrel 91. Thus, a barrel 91 can be disposed in the roots 163 between the crests 162 on the screws 73 and 74, and moved in a rightward direction (FIG. 10) upon a proper simultaneous rotation of the screws 73 and 74. The flange 92 of the barrel 91 rests on the upper surface of the guide member 82 (FIG. 11) and prevents the barrel 91 from dropping out of engagement with the screws.

HUB ASSEMBLY STATION 126 (FIGURES 13–21)

Figure 13:
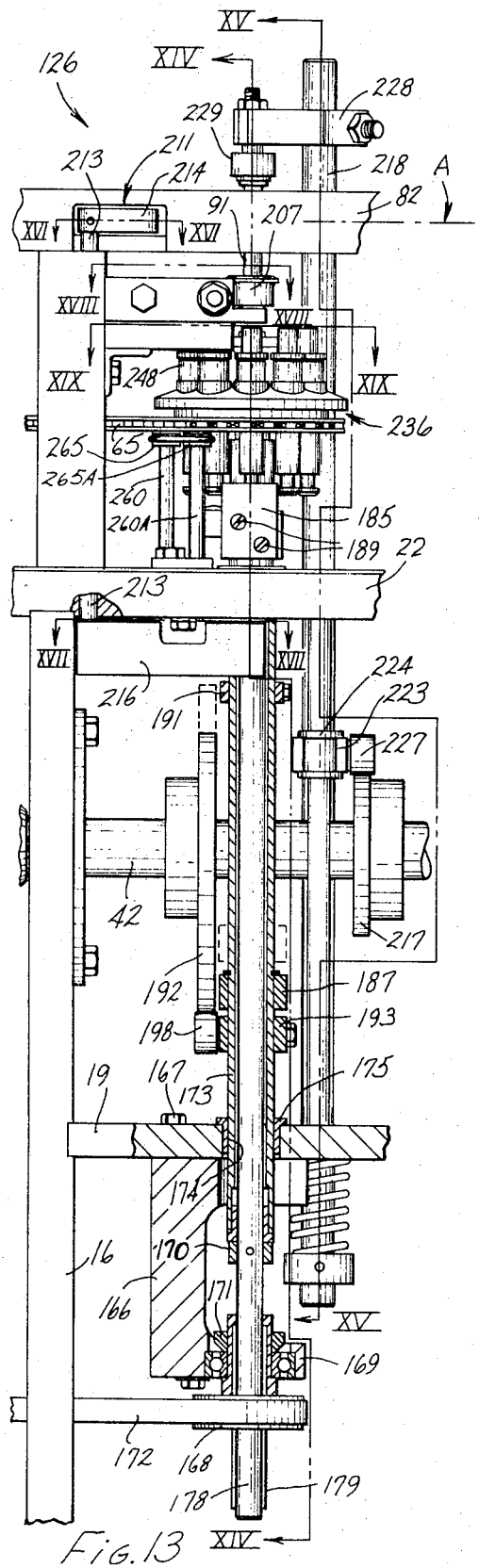
FIG. 13 is a fragmentary and partially sectional front view as seen from the line XIII—XIII in FIG. 2.

A C-shaped support member 166 (FIG. 13) is secured to the underside of the frame plate 19 by a plurality of bolts 167. The hub of a pulley 168 is mounted on the leg 169 of the support member 166 by a nut 171 and is rotatable with respect therto. The pulley 168 is driven for rotation by an endless belt 172 which is connected to the pulley 39 (FIG. 1) on the output shaft 41 of the motor 37.

Figure 14:
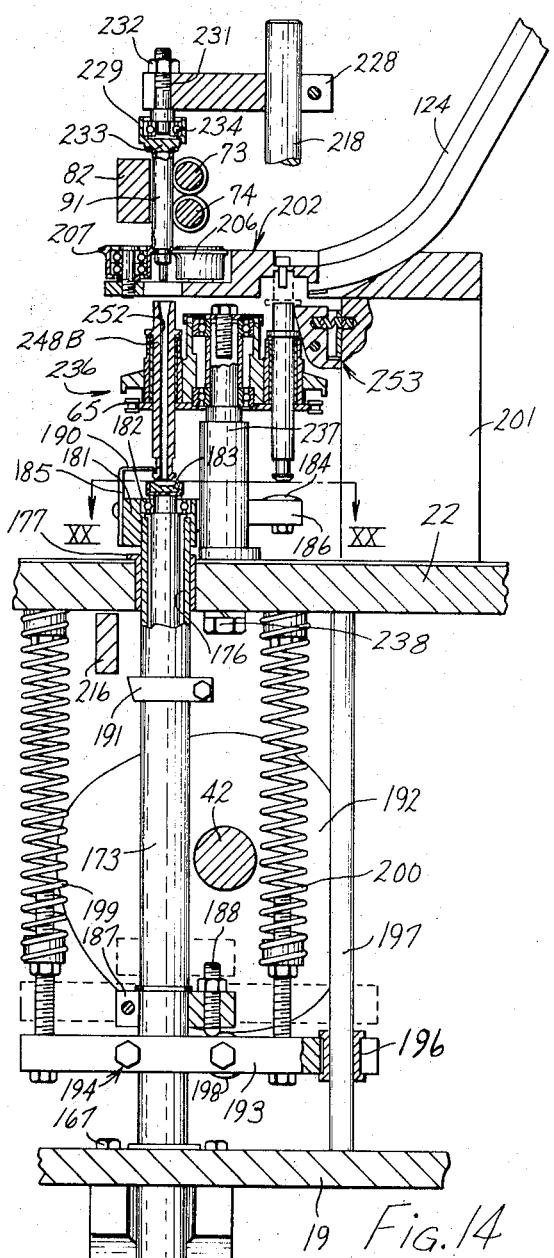
FIG. 14 is a sectional view taken along the line XIV—XIV in FIG. 13.

An elongated tubular member 173 (FIG. 13) is located above and coaxial with the pulley 168 and is slideably vertically disposed in the opening 174 in the bushing 175 held by the frame plate 19. The tubular member 173 also extends through the opening 176 (FIG. 14) in the bushing 177 in the top plate 22.

A shaft 178 is slideably secured to the pulley 168 and held against rotation by an elongated key 179. The shaft 178 is permitted to slide axially of the pulley 168 for purposes which will become apparent hereinbelow.

The shaft 178 extends upwardly through the tubular member 173 and is rotatable with respect thereto, but held against relative axial movement with respect thereto by any convenient means including the collar 170.

A collar 191 (FIGS. 13 and 17) is secured to the elongated tubular member 173 and is, in this embodiment, spaced below the top plate 22.

An L-shaped arm 181 (FIGS. 14, 20 and 21) is secured to the upper end of the tubular member 173 and houses a bearing 182 which rotatably supports the upper end of the shaft 178. A socket member 183 is secured to the upper end of the shaft 178 and is rotatable therewith. A cushion 184 is secured on top of the rearward end of the leg 186. An L-shaped bracket 185 is secured to the arm 181 by screws 189 and has a leg 190 extending rearwardly therefrom.

A disk cam 192 (FIGS. 13 and 14) is secured to the shaft 42 adjacent the left side of the tubular member 173 and is rotatable therewith. An arm 193 (FIG. 14) is held on the tubular member 173 by a bolt and clamp arrangement 194. A bushing 196 is secured in one end of the arm and slideably receives a guide rod 197 which is secured to and extends between the middle plate 19 and the top plate 22, and is parallel to the elongated tubular member 173. A cam follower 198 is rotatably supported on the side of the arm 193 between the ends thereof and is radially aligned with the disk cam 192. In this particular embodiment, a pair of springs 199 and 200 are secured to and extend between the underside of the top plate 22 and the arm 193 to resiliently urge the cam follower 198 upwardly against the radially lower surface of the cam 192.

An arm 187 is secured to the tubular member 173 above the arm 193 and has an adjustment screw 188 threadedly engaging the arm 187 and abutting against the upper surface of the arm 193. Thus, by moving the adjustment screw 188 relative to the arm 187, the spacing between the arm 187 and the arm 193 can be changed, thereby adjusting the limit of the upward movement of the tubular member 173.

A turret 236 (FIGS. 13, 14 and 21) is rotatably supported on a spindle 237 secured to the top plate 22 by a bolt 238. The turret 236 comprises a wheel 239 (FIG. 21) having a plurality of openings 241 uniformly spaced circumferentially around the perimeter. The wheel 239 is rotatably supported on the spindle 237 by a pair of vertically spaced bearings 242 and 243 separated by a spacer sleeve 244. A bearing retainer cap 245 is secured to the upper end of the spindle 237 by a bolt 246. The turret assembly 236 also includes a sprocket 247 which is secured to the lower side of the wheel 239 and is engaged by the endless chain 65.

A plurality of arbors 248 are slideably disposed in the openings 241. Each arbor is cylindrically shaped and has a flange 249 projecting radially outwardly therefrom adjacent but spaced downwardly from the upper end thereof. Bushing elements 250 are provided in the opening 241 and engage the underside of the flange 249 to support the arbors 248.

A flange 251 is secured to the lower end of each arbor 248 and is axially aligned with the socket 183 on the shaft 178. The diameter of the flange 251 is no greater than the diameter of the opening in the bushing elements 250 so that the arbors 248 can be removed from the wheel 239 for sterilization purposes. The arbor 248 has an annular groove 260 just above the flange 251 into which the leg 190 of the bracket 185 is received when the arbor is axially aligned with the socket 183. An opening 252 extends through the center of the arbor 248 and diverges upwardly at the upper end for receiving the neck 98 on the hub 96.

A latch mechanism 253 (FIGS. 19 and 21) comprises a frame 235 secured to the block 201 supported on plate 22 and has a latch member 254 pivotally supported on frame 235 by a pin 255. The latch member 254 has a cam surface 208 which is engageable with, and is biased into the path of, the flange 249 on the arbor 248 by a spring 209.

A pair of rod members 260 and 260A (FIGS. 13 and 20) are secured in any convenient manner to the upper surface of the top plate 22 and extend upwardly therefrom adjacent a theoretical circle defined by the radially outer most edges of the arbors 248 in the turret assembly 236. A pair of circular flanges 265 and 265A are secured to the upper ends of the rods 260 and 260A, as best illustrated in FIG. 19. The flanges 265 and 265A support a rubber ring 270 which engages the arbors 248 along the radially outermost surfaces thereof.

A horizontally oriented mounting plate 202 (FIG. 14) is secured to the upper surface of the mounting block 201 and projects frontwardly beyond the turret 236. The mounting plate 202 rotatably supports a pair of spaced and axially parallel rollers 206 and 207. The peripheries of the rollers 206 and 207 are spaced a distance slightly greater than the diameter of the neck portion 93 on the barrel 91 and said rollers are located so that a line connecting the centers thereof intersects the extended axis of the shaft 178. The roller 207 is urged by the spring 203 (FIG. 18) into a resilient contact with a neck 93 of a barrel 91 as it passes thereby to accommodate variations in the diameter of the necks.

The barrel detecting device 211 (FIG. 16) has a rod 213 rotatably journaled in the top plate 22 and extending upwardly into a notch 204 in the guide 82 adjacent the row of barrels 91 supported in the assembly line A by the screws 73 and 74. An arm 214 is secured to the upper end of the rod 213 and is movable into the path of the barrels 91 in the assembly line A as illustrated in broken lines in FIG. 16. The arm 214 is disposed in the notch 204 and is preferably positioned to engage the barrel 91A located in the third root 163 of said screws 73 and 74 behind (or leftwardly of) the axis of shaft 178 where it intersects said assembly line A. For convenience, each pair of vertically aligned roots on the screws 73 and 74 may be referred to hereinafter as an index position along the assembly line A.

An arm 216 (FIGS. 13, 14 and 17) is secured to the lower end of the rod 213, is rotatable therewith, and is movable into and out of engagement with the collar 191 fixed to the tubular member 173. That is, when a barrel 91 is in position 91A (FIG. 16) in the assembly line A, the arm 214 will be held thereby in the solid line position, thereby holding the arm 216 in the solid line position illustrated in FIG. 17, contrary to the urging of resilient means not shown.

A disk cam 217 (FIGS. 13 and 15) is secured to the shaft 42 rightwardly of the cam 192 and is rotatable therewith. A vertically oriented rod 218 is slideable axially through a bushing 219 in the middle plate 19 and an opening 221 in the top plate 22. A spring 222 is held under compression between the underside of the middle plate 19 and a collar 215 fixed to the lower end of the rod 218 to urge the rod 218 in a downward direction. An arm 223 is secured to the rod 218 intermediate the ends in any convenient manner and extends transversely above the axis of the shaft 42. A bushing 224 is located in the outer end of the arm 223 to slideably receive a guide rod 226 which is secured to and extends between the middle plate 19 and the top plate 22. A cam follower 227 is rotatably supported on the arm 223 by convenient means between the rods 218 and 226 and is radially aligned with the cam 217. Thus, the spring 222 resiliently urges the cam follower 227 against the periphery of the cam 217.

An arm 228 (FIGS. 13 and 14) is secured to the upper end of the rod 218 and extends transversely therefrom. A barrel holddown device 229 is secured to the free end of the arm 228 by means of a stud 231 and a nut 232. A pressure pad 233 is rotatably supported on the lower end of the stud 231 by a bearing 234, and said pad 233 engages the flange 92 on the barrel 91 to prevent upward movement of the barrel when the hub is attached thereto.

The track 124 (FIGS. 14 and 18), for delivering hubs 96 to the hub assembly station 126, is supported on the plate 202 secured to the mounting block 201. The lower end of the track 124 (FIG. 18) terminates in a right angle turn 210 which communicates with an opening 212 in plate 202. A keeper mechanism 220 comprises a base member 225 which is secured to the plate 202 and has an arm 230 pivotally connected thereto. The outermost end of the arm 230 projects into the opening 212 to block the end of the track 124. The keeper mechanism 220 serves to limit the flow of hubs 96 into opening 212.

The center of the opening 212 is vertically aligned with the circle defined by the axes of the arbors 248 on the turret assembly 236. Also, the center line of the turn 210 in the track 124 is also vertically aligned with the circle of the axes of the arbors 248.

PHOTOCELL CHECK STATION 127 (FIG. 22)

The photocell check station 127 comprises a mounting block 256 which is secured to the top plate 22. A conduit 257 projects upwardly and frontwardly from the mounting block 256 so that the upper end 258 thereof is located over the assembly line A of barrels 91 and hubs 96. A light source 259 is secured to the upper end 258 of the conduit 257 and said light is directed downwardly in a beam which intersects the assembly line A. A photoelectric cathode 261 is mounted on the block 256 in line with the beam of the light source 259 but beneath the assembly line A. The light beam preferably intersects the assembly line A three index positions following the intersection line of the arbors 248 with the assembly line A.

A proximity switch 262 is located on the front side of the assembly line A at the aforesaid third index position so that barrels 91 moved along the assembly line A by the screws 73 and 74, as illustrated in FIG. 22, will engage the actuator 263 of the proximity switch 262. Said actuator 263 projects through an opening 264 in the guide member 82 so that it will engage the barrels 91 about midway between the screws 73 and 74.

FILL STATION 128 (FIGS. 23–30)

The fill station 128 comprises a mounting block 266 supported on the top plate 22 and supporting a flange 267 on the upper surface thereof.

An elongated rod 269 (FIG. 24) extends through a vertical opening 271 extending through the block 266 and top plate 22. Rod 269 also extends through bushing 272 in the plate 19, and is permitted to slide axially thereof. An arm 273 is secured to the upper end of the rod 269 and projects frontwardly therefrom. A nozzle 274 is supported by the front end of the arm 273 and is directed vertically downward so that the extended centerline thereof intersects the assembly line A. A spring 276 is secured at its upper end to the lower end of the rod 269 and at its lower end to the bottom plate 12 (FIG. 1), and held under tension therebetween.

A cam wheel 277 (FIG. 23) is mounted rightwardly of the rod 269 and is fixedly secured to the shaft 42 by a key 278.

An arm 279 is secured to the rod 269 and is movable therewith. The arm 279 extends frontwardly from the rod 269 and has a bushing 281 secured therein at the front end thereof for slideably receiving a guide rod 282 which is fixed to and extends between the middle plate 19 and the top plate 22 and which is parallel to the rod 269. A cam follower 283 is mounted on the arm 279 between the ends thereof and is radially aligned and engaged with the cam wheel 277. The spring 276 resiliently urges the cam follower 283 into engagement with the cam wheel 277.

A pump and valve housing block 286 (FIG. 28) is releasably secured to the top plate 22 between and by a pair of guides 285 having tongues 287 slideably disposed in the grooves 288 in the opposite sides of the housing 286. The housing block 286 has an elongated chamber 291 and a vertical opening 296 communicating therewith. A plunger 294 is slideable in the opening 296 and extends into the chamber 291.

The housing 286 also has an opening 297 extending parallel to the opening 296 and spaced from the chamber 291. A pair of openings 292 and 293 connect the chamber 291 with the opening 297. A valve member 298 having a transverse opening 299 therein is movable axially in the opening 297.

An opening 301 (FIG. 28) communicates with the opening 297 coaxially with the opening 292 and receives the nipple 302 which projects from the side of the housing 286. A flexible hose 303 connects the nipple 302 to the nozzle 274 (FIG. 23). An opening 304 communicates with the opening 297 coaxially with the opening 293 and receives the nipple 306 which projects from the side of the housing 286. A hose 307 connects the nipple 306 to a source of liquid (not shown). An opening 308 (FIG. 25) communicates between the lower portion of the opening 297 and atmosphere so that when the valve member 298 moves axially in the opening 297, air can enter the chamber 309 below the opening 297 to prevent a vacuum from occurring which could result in contamination of the valve structure. The opening 299 in the valve member 298 is movable between positions where it alternatively interconnects the openings 292 and 301 or 293 and 304.

A rod 312 (FIG. 25) is slideable axially in vertically aligned opening 313 in the block 266 and bushing 314 in the middle plate 19. A spring 316 is connected at its upper end to the lower end of the rod 312 and at its lower end to the bottom plate 12 (FIG. 1) and is under tension to bias the rod into a lowered position. The upper end of the valve member 298 is connected through an appropriate mechanism 311 to the upper end of the elongated rod 312.

An arm 317 is mounted on the rod 312 in any convenient manner and extends frontwardly therefrom. A bushing 318 is located on the outer end of the arm 317 and is sleeved on a rod 319 which is fixed to and extends between the middle plate 19 and the top plate 22 and is parallel to the rod 312.

A snap ring 321 is fixed to the rod 312 preferably above the arm 317. A collar 322 is sleeved on the rod 312 and is supported on the upper surface of the snap ring 321. A tubular bearing 324 is sleeved over the rod 312 and is supported by the collar 322.

An arm 326 (FIG. 25) is secured to the upper end of the tubular member 324 and extends frontwardly from the rod 312. A bushing 327 is secured to the front end of the arm 326 and is sleeved on the rod 319. A cam follower 328 is rotatably connected to the arm 326 between the rods 319 and 312, and engage a cam wheel 329 (FIG. 23) mounted on the shaft 42 forwardly of the rod 319 by a key 278 so that said wheel is rotatable with said shaft.

The cam wheel 329 (FIG. 25) is radially aligned with the cam follower 328 on the arm 326. A spring 332 resiliently interconnects the arms 317 and 326 and serves to resiliently resist movement of the cam follower 328 away from the cam wheel 329.

An arm 333 (FIG. 25) is mounted on the rod 312 above a snap ring 331 secured to the rod 312 and movable therewith. The arm 333 extends frontwardly from the rod 312 and has a notch 334 in the upper surface of the front end thereof.

A rod 337 (FIG. 26) is slideable axially in opening 338 in the mounting block 266 and bushing 339 in the middle plate 19. The upper end of the plunger rod 294 is connected through an appropriate mechanism 336 to the elongated rod 337. A spring 341 is connected at one end to the lower end of the rod 337 and at the other end to the bottom plate 12 (FIG. 1) and serves to bias the rod 337 in its lowered position.

An arm 342 is secured to the rod 337 and extends frontwardly therefrom. A bushing 343 is secured to the front end of the arm 342 and is sleeved on a rod 344 secured at its lower end to the middle plate 19.

A support member 346 (FIG. 26) is secured to the underside of the top plate 22 by bolts 347. An adjustable arm 348 (FIG. 27) is pivotally secured to the support member 346 by a stub shaft 349. The adjustable arm 348 has a lengthwise passageway 351 through the center thereof and a lengthwise slot 352 which communicates with the passageway 351. An elongated threaded member 353 having a knob 354 on one end thereof is rotatably journaled in the free end of the arm 348. A carriage 356 is threadedly engaged with the threaded member 353 and is movable axially along the passageway 351 by the threaded member in response to a rotation of the knob 354. A stub shaft 357 projects outwardly from the carriage 356 through the slot 352.

A C-shaped lever arm 358 (FIG. 26) is pivotally secured at its upper end to the stub shaft 357 and is maintained in position on said shaft 357 by the nut 359. The lower end of the lever arm 358 (FIGS. 23 and 26) is pivotally secured to the arm 342 by a bolt 361. A cam follower 362 (FIGS. 23 and 27) is rotatably secured to the arm 348 by a bolt 363.

A cam wheel 364 is secured to the shaft 42 by key 278 and is rotatable therewith. The cam wheel 364 is coplanar with the cam follower 362. The spring 341 serves to resiliently resist movement of the cam follower 362 away from engagement with the cam wheel 364.

A barrel detecting mechanism 371 (FIGS. 29 and 30) comprises a shaft 372 (FIG. 23) which is journaled in the top plate 22 and the flange 267. An arm 373 is connected to the upper end of the shaft 372 and is located within an opening 374 in the guide member 82.

An arm 376 (FIGS. 23 and 30) is secured to the lower end of the shaft 372 and is rotatable therewith. The arm 376 is urged by spring 378 to rotate the shaft 372 counterclockwise into the position illustrated in broken lines in FIG. 30 wherein the arm 376 abuts against a stop 377 fixed to the underside of the top plate 22. However, the outer end of the arm 376 is blocked from such movement by the arm 333 when it is held in its solid line, raised position of FIG. 25 by the cam wheel 329. The arm 376 can move into its broken line position of FIG. 30 within the notch 334 when the arm 333 is in the broken line position of FIG. 25. The spring 378 is fixed at one end to the arm 376 and at the other end to a pin 379 fixed to the underside of the top plate 22 to resiliently urge the arm 376 toward the dotted line position in FIG. 30 and the arm 373 into the dotted line position in FIG. 29, which said arm 373 assumes if a barrel is missing from the index station adjacent arm 373.

STOPPER ASSEMBLY STATION 132 (FIGS. 31–37)

The stopper assembly station 132 comprises a mounting block 381 mounted on the upper surface of the top plate 22. A flange 382 is secured to the upper surface of the mounting block 381 by a plurality of bolts 385 (FIG. 34) and projects frontwardly therefrom over the assembly line A. An opening 383 is provided through the flange 382 (FIG. 35) and the axis thereof intersects the assembly line A. A chamber 384 is spaced inwardly from the ends of the opening 383 and is in communication therewith. The diameter of the upper portion of the opening 383 is greater than the diameter of the lower portion. An annular rubber pad 386 surrounds the opening 383 at the lower end thereof.

A recess 387 is provided in the upper surface of the flange 382 and has an axis preferably parallel to the axis of the opening 383. The lower end of the recess 387 is connected to the chamber 384 by a passageway 388. A passageway 389 interconnects the recess 387 to a vacuum source (not shown).

Figure 35:
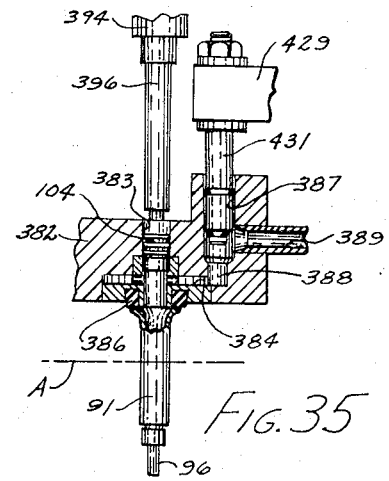
FIG. 35 is a sectional view taken along the line XXXV—XXXV in FIG. 34.

An elongated rod 391 (FIGS. 31 and 32) is slideable axially in the opening 392 in the mounting block 381 and bushing 393 in the middle plate 19. An arm 394 is secured to the upper end of the rod 391 and extends frontwardly therefrom. A plunger element 396 is secured to the front end of the arm 394 by a nut 397 and extends downwardly therefrom. The axis of plunger 396 is preferably coaxial with opening 383 (FIG. 35).

A spring 398 is secured at one end to the lower end of the rod 391 and at the other end to the bottom plate 12 (FIG. 1) and is held under tension to bias the rod in a lowered position.

An arm 401 (FIG. 33) is secured to the rod 391 and extends frontwardly therefrom. A bushing 402 is secured to the front end of the arm 401 and is sleeved on a rod 403 which is secured to and extends between the middle plate 19 and the top plate 22. A cam follower 404 is rotatably secured to the arm 401 between the ends thereof.

A cam wheel 406 (FIG. 33) is secured to the shaft 42 by a key 407 and is rotatable therewith. The cam wheel 406 is radially aligned with the cam follower 404, and the spring 398 serves to resiliently resist movement of the cam follower 404 away from engagement with the cam wheel 406.

A pair of axially aligned openings 411 and 412 (FIG. 32) are provided in the mounting block 381 and top plate 22 and in the middle plate 19, respectively, and an elongated rod 413 is slideably positioned therein. A notch 414 is provided in the upper removable end portion of the rod 413 having a width slightly greater than the neck 98 on the hub 96.

An arm 416 is mounted on the rod 413 below the shaft 42 and projects rearwardly therefrom. A bushing 417 is secured to the rear end of the arm 417 and is sleeved on a rod 418 fixed to and extending between the middle plate 19 and the top plate 22. A cam follower 419 is rotatably secured to the arm 416 preferably between the ends thereof.

A cam wheel 421 is fixed to the shaft 42 by a key 422 and is rotatable therewith. The cam wheel 421 is coplanar with the cam follower 419. A spring 423 is sleeved on the rod 413 and held under compression between the middle plate 19 and the arm 416 to resiliently urge the cam follower 419 into engagement with the cam wheel 421.

A pair of axially aligned openings 426 and 427 (FIG. 34) are provided in the mounting block 381 and top plate 22 and in the middle plate 19, respectively, and an elongated rod 428 is slideably positioned therein. An arm 429 is secured to the upper end of the rod 428 and extends frontwardly therefrom. A piston member 431 is secured to the front end of the arm 429 by a nut 432 and extends downwardly therefrom into the recess 387. When the piston element 431 is in its lowered position of FIG. 31 it blocks communication between the passageway 388 and the passageway 389. A spring 433, secured at one end to the lower end of the rod 428 and at the other end to the bottom plate 12 (FIG. 1), urges the piston element 431 into said lowered position.

An arm 434 (FIG. 34) is connected to the rod 428 and extends frontwardly therefrom. A bushing 436 is secured to the front end of the arm 434 and is sleeved on a rod 437 which is parallel to the rod 428 and is fixed to and extends between the middle plate 19 and the top plate 22. A cam follower 438 is rotatably mounted on the arm 434 preferably between the ends thereof.

A cam wheel 439 is fixed to the shaft 42 by a key 441 and is rotatable therewith. The cam wheel 439 is coplanar with the cam follower 438, and the spring 433 resiliently urges the cam follower 438 into engagement with the cam wheel 439.

A barrel detecting mechanism 442 (FIGS. 31, 32 and 36) comprises a shaft 443 rotatably journaled on the mounting block 381. An arm 444 is secured to the upper end of the shaft 443 and is rotatable therewith. An arm 446 is secured to the lower end of the shaft 443 and is rotatable therewith. A spring 447 (FIG. 37) is secured at one end to the outer end of the arm 446 and at the other end to a pin 448 projecting downwardly from the plate 22. The spring 447 urges the arm 446 toward its broken line position of FIG. 37 wherein the arm 446 is in engagement with a stop pin 449 also depending from the under-side of the top plate 22. In this position, the arm 446 extends under the front end of the arm 401 provided arm 401 is in the raised position shown in FIG. 33. The spring 447 acts through shaft 443 to urge the arm 444 toward the dotted line position of FIG. 36, which it occupies if a barrel is missing from the index station adjacent the end of arm 444.

The stopper feed track 131 is supported on the mounting plate 382. The passageway in the stopper feed track 131 (FIG. 2) connects the storage basin 129 with the opening 383 (FIG. 32) in the flange 382.

PLUNGER ASSEMBLY STATION 136 (FIGS. 38–42)

The plunger assembly station 136 utilizes, in this embodiment, the same mounting block 381 as is utilized with the stopper assembly station 132. A U-shaped track 456 is secured to the mounting block 381 by bolts 457. The flanges 458 and 459 of track 456 are spaced equidistant from a vertical plane containing the assembly line A, and are spaced apart a distance slightly greater than the diameter of the neck 98 of the hub 96 on a barrel 91. The upper edges of the flanges 458 and 459 are downwardly and leftwardly, as illustrated in FIG. 38 to form a ramp surface 461.

The upper portion of the mounting block 381 (FIG. 38) has a slot 462 opening upwardly and extending transversely of the assembly line A. A plate 463 is secured to the upper side of the mounting block 381 by bolts 464 (FIG. 39). The plate 463 extends frontwardly of the mounting block 381 and has a front portion 466 which extends rightwardly of the machine parallel to the assembly line A. A pair of flanges 467 and 468 (FIGS. 38 and 40) project upwardly from the plate 463 and pivotally support holding members 473 and 474.

The holding members 473 and 474 (FIG. 40) may be resiliently biased against stops 476 and 477, respectively. However, in this particular embodiment, the centers of gravity of the holding members are such that a clockwise moment is created by the holding member 473 about the stub shaft 471 and a counterclockwise moment is created by the holding member 474 about the stub shaft 472. Thus, the moments created about the respective stub shafts will cause the holding members 473 and 474 to be continually urged against the stops 476 and 477, respectively.

The holding member 473 has a projection 478 (FIG. 38) projecting toward the center line of the track 134. The holding member 474 has a projection 479 projecting toward the center line of the track 134 and preferably spaced from and aligned with the projection 478 on the holding member 473. Thus, the track 134 will feed the plunger rods 107 to a location between the holding members 473 and 474 so that the flange portion 108 of each rod will be supported, one after the other, on the shoulders created by the projections 478 and 479 during normal feeding of the rods 107.

A rod 481 (FIG. 39) is slideable axially in appropriately aligned openings in the mounting block 381 and top plate 22, and in the opening 482 in the middle plate 19. An arm 483 is secured to the upper end of the rod 481 and projects frontwardly therefrom. A pusher member 484 is secured to the front end of the arm 483 by a nut 486 and projects downwardly therefrom. The axis of the pusher member 484 is preferably in a vertical plane and intersects the assembly line A so that it is axially aligned with a plunger rod 107 supported on the projections 478 and 479.

A spring 485 is connected at one end to the lower end of the rod 481 and at the other end to the bottom plate 12 (FIG. 1) and is held under tension to urge the rod 481 into a lowered position.

An arm 487 is mounted on the rod 481 and extends frontwardly therefrom. A bushing 488 is secured to the front end of the arm 487 and is sleeved on a rod 489 which is fixed to and extends between the middle plate 19 and the upper plate 22. A cam follower 491 is rotatably secured to the arm 487 between the ends thereof.

A cam wheel 492 is secured to the shaft 42 by a key 493 and is radially aligned with the cam follower 491. The spring 485 resiliently urges the cam follower 491 into engagement with the cam wheel 492.

A barrel detecting mechanism 494 (FIGS. 38 and 41) comprises a shaft 496 rotatably journaled in the mounting block 381. An arm 497 is secured to the upper end of the shaft 496 in an opening 498 in the guide member 82. An arm 499 is secured to the lower end of the shaft 496 and is rotatable therewith. A spring 501 (FIG. 42) is secured at one end to the arm 499 and at the other end to a pin 502 which depends from the underside of the top plate 22. The spring 501 urges the arm 497 and arm 499 into the broken line positions of FIGS. 41 and 42, respectively. A stop pin 503, which depends from the underside of the top plate 22, is engaged by the arm 499 when it is in its broken line position, wherein the arm 499 projects over and above the arm 487 secured to the rod 481.

PLUNGER ROD LIFT STATION 135
(FIGS. 43 AND 44)

The plunger rod lift station 135 (FIG. 1) comprises a rod 621 (FIG. 44) slideable axially in appropriately aligned openings 622 in the middle plate 19 and 623 in the top plate 22. The rod 621 extends above the top plate 22 and has an arm 624 secured to it near the upper end thereof. The arm 624 extends frontwardly and has an inverted channel member 626 secured to the underside thereof by screws 627. The lower edges of the sides 628 and 629 of the member 626 have inwardly extending and integral flanges 631 and 632, respectively. The spacing between the innermost parallel edges of the flanges 631 and 632 is slightly greater than the diameter of the plunger rod 107 but less than the diameter of the flange 108. The vertical spacing of the flanges 631 and 632 from the underside of the arm 624 is preferably such that the flanges 631 and 632 will always be positioned below the flanges 108 on the plunger rods 107 as the barrels 91 are moved along the assembly line. The flanges 631 and 632 are equally spaced above the assembly line.

An arm 633 is secured to the rod 621 above the shaft 42 and extends frontwardly therefrom. A bushing 634 is secured in the front end of the arm 633 and is sleeved on a rod 636 which is secured to and extends between the middle plate 19 and top plate 22. A cam follower 637 is rotatably secured to the arm 633 between the ends thereof. A cam wheel 638 is secured to the shaft 42 by a key 639 and is coplanar with the cam follower 637. A compression spring 641 is sleeved on the rod 621 and held under compression between the upper surface of the arm 633 and the underside of the top plate 22. The spring 641 serves to bias the arm 633 so that the cam follower 637 is held in engagement with the radially outer surface of the cam wheel 638, and so that the rod 621 is urged toward a lowered position.

A sleeve 642 (FIG. 44) is telescoped over the rod 621 above the top plate 22 and is secured to the upper surface of the top plate 22. A flange 643 is secured to the upper end of the sleeve 642 and projects frontwardly therefrom over the screws 73 and 74. A notch 644 is located in the front lower edge of the flange 643 adjacent the assembly line and extends parallel thereto. The upper surface defining the notch 644 is spaced slightly above the upper surface of the flange 92 on each barrel 91 being moved by the screws 73 and 74.

A flange 646 may be secured to the upper surface of the guide rail 82 by bolts 647 to project over and above the upper surface of the flange 92 on each barrel 91. The flange 646 may be located on the opposite side of the assembly line from the flange 643 and spaced to simultaneously engage the flange 92 of each barrel 91.

NEEDLE AND NEEDLE CASING ASSEMBLY STATION 139 (FIGS. 45–51)

The needle and needle casing assembly station 139 (FIGS. 45 and 47) comprises a mounting block 506 which is secured to the upper surface of the top plate 22 by bolts 507. A plate 508 is secured to the upper surface of the mounting block 506 by bolts 509 on the front side of the assembly line A. A projection 511 extends rearwardly of the plate 508 toward the assembly line A.

A plate 512 is secured to the upper surface of the mounting block 506 by bolts 513 on the opposite side of the assembly line from the plate 508. A projection 514 extends frontwardly of the plate 512 toward the assembly line and is aligned with and spaced from the projection 511. The adjacent edges of the projections 511 and 514 are spaced apart a distance slightly greater than the diameter of the neck 93 (FIG. 7) on the barrel 91 but less than the diameters of both the barrel 91 and the sleeve 97 on hub 96. Furthermore, the projections 511 and 514 (FIG. 46) are equidistant from a vertical plane containing the assembly line A.

A rod 516 (FIGS. 45 and 46) is journaled in the bottom plate 12 and the middle plate 21 and is slideable axially thereof. An arm 517 is secured to the rod 516 below the shaft 42 and extends rearwardly therefrom. A bushing 518 is secured in the rear end of the arm 517 and is sleeved on a rod 519 secured to the middle plate 21 by a nut 521 and extending upwardly therefrom. A cam follower 522 is rotatably secured to the arm 517 between the ends thereof. A cam wheel 523 is secured to the shaft 42 by a key 524 and is coplanar with the cam follower 522.

An arm 526 is secured to the lower end of the rod 516 sligtly above the bottom plate 12 and extends in a frontward direction therefrom. A spring 527 is connected at one end to the outer end of the arm 526 and extends upwardly therefrom through a vertically aligned opening in the middle plate 21 and is secured to the underside of the top plate 22. The spring 527 is so long that a relatively light tension is created thereby. Thus, the spring 527 lightly biases the rod 516 into an elevated position thereby causing the cam follower 522 to be resilient but lightly urged into engagement with the cam wheel 523.

A rod 528 is secured to the rod 516 by a pair of arms 529 and 531 and extends in parallelism with the rod 516 upwardly and slideably through openings in the intermediate plate 21 and the top plate 22. An arm 532 is secured to the upper end of the rod 528 and extends sidewardly therefrom.

An elongated, channel-shaped holding member 533 (FIG. 45) is secured to the outer end of the arm 532. The sides 536 and 537 (FIG. 48) of the member 533 are aligned with the walls 538 and 539, respectively, which define the guide track 138. The web portion 541 interconnecting the sides 536 and 537 is rounded so that the center line of the web portion intersects the assembly line A.

A leaf spring 540 (FIGS. 46 and 47) is secured to the mounting block 506 and is aligned with the space between the sides 536 and 537 of the holding member 533. Thus, the spring 540 is engageable with a sheath 114 as it and a needle assembly 113 are moved toward engagement with a hub 96 on a barrel 91.

A barrel detecting mechanism 542 (FIGS. 45, 49 and 50) comprises a shaft 543 rotatably journaled in the top plate 22. An arm 544 is secured to the upper end of the shaft 543 and is rotatable therewith in a slot in the guide member 82.

A C-shaped bracket 546 (FIG. 45) is secured to the shaft 543 at a location slightly above the middle plate 21 and is rotatable therewith. The bracket 546 has an upper arm 547 (FIG. 51) thereon which extends to a position in front of the rod 516. The bracket 546 has a lower arm 548 (FIG. 50) which extends parallel with the upper arm in front of the rod 516.

A spring 549 (FIG. 50) is secured at one end to the outermost end of the arm 548 and at the other end to a bolt 551 projecting upwardly from the middle plate 21. The spring 549 urges the arms 547 and 548 into their dotted line positions of FIGS. 51 and 50. The arm 548 is urged into engagement with a stop member 552 on the plate 21.

NEEDLE CHECK STATION 140 (FIGS. 52 and 53)

The needle check station 140 comprises a mounting block 556 mounted on the upper surface of the top plate 22. The block 556 has a slot 557 through which the sheaths 114 move along the assembly. A metal sensing device 558 is secured to a wall of the slot 557 and is positioned so that it is horizontally aligned with the hub member 120 (FIGS. 7 and 8).

A feeler switch 561 is mounted on the upper surface of the mounting block 556 and its actuator 562 projects through an opening 563 in the guide member 82 so that the end thereof will be engaged by syringe barrels 91 passing thereby.

ELECTRICAL CIRCUITRY 566 (FIG. 54)

Cam wheels 575, 576 and 577 (FIGS. 1 and 3) are secured to the shaft 42 by any convenient means (not shown). A limit switch 578 is positioned for operation by the cam wheel 575, and limit switches 579 and 580 are positioned for operation by the cam wheels 576 and 577, respectively.

Figure 54:
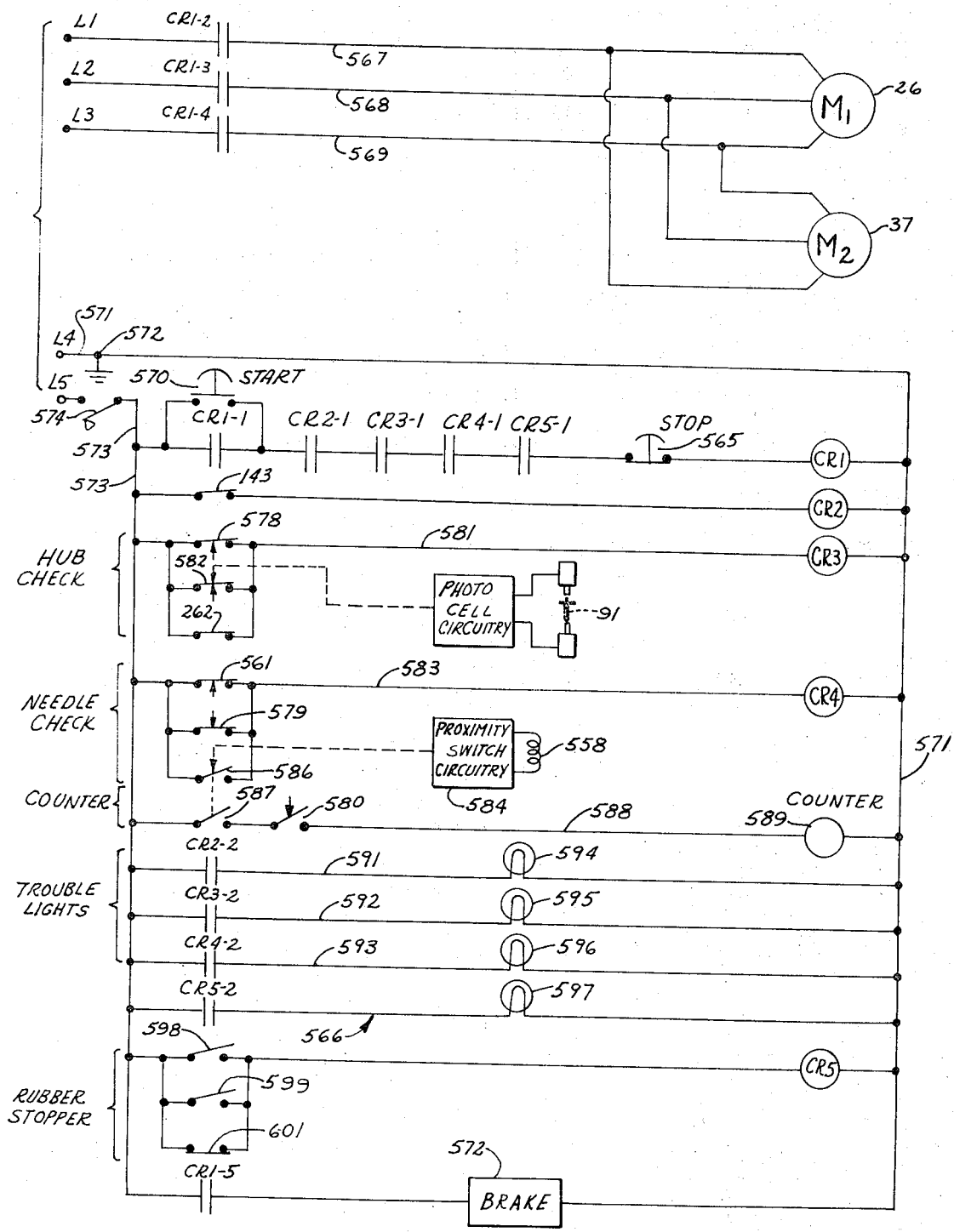
FIG. 54 is an electrical schematic of the circuitry utilized in the machine embodying the invention.

The electrical circuitry 566 is illustrated in FIG. 54 and has a plurality of input terminals L1, L2, L3, L4 and L5. Terminals L1, L2 and L3 are connected to a suitable source of three phase electrical power. Terminals L4 and L5 are connected to a suitable source of single phase electrical power. The terminals L1, L2 and L3 are connected through normally open relay contacts CR1-2, CR-3 and CR1-4, respectively, to conductors 567, 568 and 569, respectively, which in turn are connected to the electric motors 26 and 37. The terminal L4 is connected through a conductor 571 to ground and the terminal L5 is connected to a conductor 573 through a manually operable switch 574.

Relay contacts CR1-1, CR2-1, CR3-1 and CR4-1 and a stop switch 565 are series connected with a relay coil CR1 between the conductors 573 and 571. A start switch 570 is parallel connected across the contact CR1-1. The switch 143 is series connected with the relay coil CR2 between the conductors 573 and 571.

The limit switch 578 is series connected by a conductor 581 with a relay coil CR3 between the conductors 573 and 571. The relay contact 582 of the photocell circuitry and the feeler switch 262 are parallel connected to each other and to the limit switch 578.

The feeler switch 561 is series connected by a conductor 583 with the relay coil CR4 between the conductors 573 and 571. The limit switch 579 is connected in parallel with the feeler switch 561. The metal sensing coil 558 (FIGS. 52 and 53) is connected through the proximity switch circuitry 584 to simultaneously operate switches 586 and 587. Switch 586 is connected in parallel with the switches 561 and 579. The switch 587 and a limit switch 580 are series connected by a conductor 588 with a counting mechanism 589 between the conductors 573 and 571.

The conductor 573 is also connected by conductors 591, 592 and 593 through relay contacts CR2-2, CR3-2 and CR4-2, respectively, to the conductor 571. The trouble light 594, located in any convenient manner adjacent the feeding station (FIG. 1), is connected in series with CR2-2. The hub check trouble light 595, located in any convenient manner at the hub check station 127 (FIG. 1) is connected in series with CR3-2. The needle check trouble light 596, located at the needle check station 140 (FIG. 1), is connected in series with CR4-2.

The stopper check trouble light 597 (FIG. 54) located at the stopper assembling station 132, is connected in series with CR5-2. A manually operable switch 598 is connected in series with the relay coil CR5 between the lines 571 and 573. A switch 599, which closes in response to the presence of a proper vacuum pressure in the opening 383 after a stopper 104 has been moved into such opening, is connected in parallel with switch 598. A barrel feeler switch 601, which is closed by engagement with a barrel in the stopper station 132, is connected in parallel with the switches 598 and 599.

If any one of the switches 565, 143, 578 or 561 is opened during otherwise normal operation of the machine, the relay contacts of the coil in series with such switch will be opened, thereby de-energizing coil CR1 which permits the contacts CR1-5 to open and apply the brake 572 to the motor 26 which has been de-energized by the opening of relays CR1-2, CR1-3 and CR1-4.

If all of the switches 598, 599 and 601 are simultaneously open or opened during otherwise normal operation of the machine, the coil CR5 will be de-energized, thereby opening the contacts CR5-1 whereby the motors 26 and 37 are de-energized and the brake 572 is applied.

MODIFIED CONSTRUCTION OF FIG. 6

The embodiment in FIG. 6 illustrates a pair of screws 73A and 74A having a deeper root 163A permitting the assembly of syringes having a barrel of larger diameter. The drive mechanism associated with the screws 73A and 74A can be, and preferably is, the same as that discussed hereinabove with respect to the drive for screws 73 and 74.

OPERATION

The operation of the above-described machine embodying the invention will be apparent to skilled persons examining such description and the drawings. Thus, the operation will be summarized hereinafter primarily for convenience.

The syringe assembling machine 10 is started by energizing line 573 which closes relays CR2-1, CR3-1, CR4-1 and CR5-1. By closing the start switch 570, the relay coil CR1 is energized through closed switches CR2-1, CR3-1, CR4-1, CR5-1 and 565, thereby closing the contacts CR1-1, CR1-2, CR1-3 and CR1-4, and opening CR1-5, which releases the brake. Closing of the contact CR1-1 locks in the relay coil CR1. Closing of the contacts CR1-2, CR1-3 and CR1-4 results in the energization of the motors 26 and 37.

Upon the energization of the motor 26 the gear 36 (FIG. 3) is rotated to drive gear 46 and effect the continuous rotation of the shaft 42. The cams 47 and 47A are rotatably driven by the shaft 42 and cause a rotational movement of the plates 59 and 59A through engagement of the cam followers 61 with the cam surfaces 48 and 49 on the cams. Accordingly, the shafts 58 and 58A are intermittently rotated 45 degrees during each revolution of the cam members 47 and 47A.

The shafts 66 and 66A (FIG. 4) are intermittently driven by the interengagement of the gears 69 and 69A secured thereto and the gears 63 and 63A secured to the shafts 58 and 58A. Therefore, the gears 71, 72 on the shaft 66 and the gears 71A, 72A on the shaft 66A intermittently drive the gears 76, 78 and 76A, 78A, respectively, and the screws 73 and 74 connected thereto.

BARREL FEED STATION (FIGS. 10-12)

A plurality of barrels 91 of the type illustrated in FIG. 7 are placed on the track 156 (FIG. 1) at the barrel feeding station 122. The body portion of the barrel extends between the rails 158 and 159 (FIG. 10) so that the flange 92 supports the barrels 91 on the aforesaid rails. Since the left end of the track 156 (FIG. 1) is maintained in an elevated position by the support member 161, the barrels 91 are moved downwardly and rearwardly by gravity. The overlapping flanges 92, as best illustrated in dotted lines in FIG. 1, serve to keep the barrels in vertical positions. The forward end of the track 156 terminates adjacent the screws 73 and 74 in the manner illustrated in FIG. 10. Individual barrels 91 are moved one at a time into a pair of vertically aligned roots 163 in the screws 73 and 74. The flanges 92 on the barrels 91 then become supported on the upper surface of the gate member 141, as is illustrated in FIG. 11, and thereby aligned in the assembly line A. The intermittent rotation of the screws 73 and 74 will cause a rightward movement of the barrels 91 and, in this particular embodiment, will cause a barrel to move one index station, which is equal to the pitch of the aforesaid screws or a whole number multiple thereof.

If one of the barrels 91 is not engaged properly by the screws 73 and 74 it may become wedged between a crest 162 and the adjacent surface 146 on the gate member 141. The gate will then pivot counterclockwise about the pivot axis 142 to the position illustrated in dotted lines in FIG. 12, whereby to open the normally closed limit switch 143 thereby de-energizing the relay coil CR2 (FIG. 54). De-energization of the relay coil CR2 results in an opening of the closed contacts CR2–1 to de-energize the relay coil CR1 and the motors 26 and 37 through an opening of the contacts CR1–2, CR1–3 and CR1–4. The contact CR2–2 is also closed by de-energization of coil CR2 and causes the trouble light 594 to become energized to indicate to the operator where the problem lies in the machine. The stoppage can be corrected by the operator by removing the improperly aligned barrel, whereby the limit switch 143 will close to energize the relay coil CR2 and extinguish the trouble light 594. The machine is started by closing the start switch 570 to again energize the relay coil CR1 to close the contacts CR1–2, CR1–3 and CR1–4, thereby energizing the motors 26 and 37.

HUB ASSEMBLY STATION (FIGS. 13–21)

The barrels 91 are advanced rightwardly (FIG. 5) one index station at a time along the assembly line A by the intermittent rotation of the screws 73 and 74. When a barrel 91 (FIG. 16) moves into the position adjacent the arm 214 of the barrel detecting mechanism 211, the arm 214 will move from the dotted line position to the solid line position illustrated in FIG. 16. Thus, the arm 216 (FIG. 17) is moved from the dotted line position to the solid line position wherein the arm 216 is out of position for blocking engagement with the collar 191.

Figure 21:
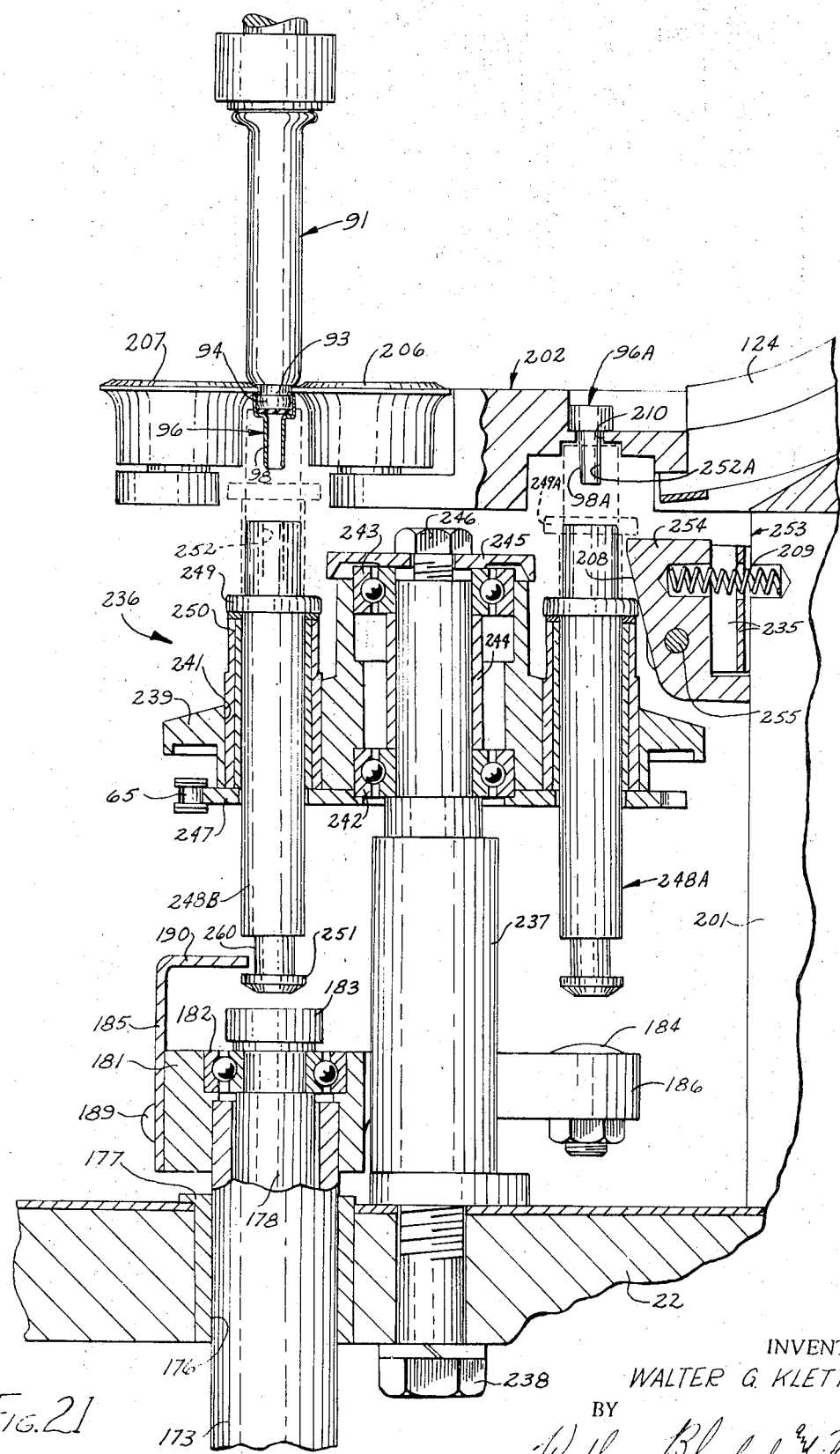
FIG. 21 is a sectional view taken along the line XXI—XXI in FIG. 19.

Simultaneously with the movement of a barrel into engagement with the arm 214 of the barrel detecting mechanism 211, a hub 96 is moved into the right angled turn 210 (FIGS. 18 and 21) and in vertical alignment with an arbor 248A (FIGS. 19, 19A, and 21). Furthermore, the center line of another arbor 248B will move into vertical alignment with the assembly line A as, illustrated in FIGS. 19A and 21.

Rotation of the cam wheel 217 (FIG. 15) will result in a downward movement of the arm 223 and shaft 218 under the urgence of the spring 222 to cause the holding device 229 (FIG. 14) to come into engagement with and guide the upper end of a barrel 91. The wheels 206 and 207 prevent the barrel from being moved upwardly.

The shaft 178 (FIG. 14) is driven by a belt 172 interconnecting the pulleys 39 and 168 (FIG. 1). Rotation of the shaft 178 (FIG. 14) also causes a rotation of the socket 183 (FIG. 21) secured to the upper end thereof.

Cam wheel 192 is continuously driven by the shaft 42. As a result, the cam follower 198, resiliently biased into engagement with wheel 192, by the springs 199 and 200, follows the cam wheel and results in an up and down movement of the tubular member 173 and the shaft 178. A sliding engagement between the shaft 178 and the pulley 168 permits an upward movement of the shaft 178. When the tubular member 173 is caused to move upwardly, the collar member 191 moves upwardly therewith. Since a barrel 91 in the position of the barrel detecting mechanism 211 has moved the arm 214 to the solid line position in FIG. 16, the arm 216 (FIG. 17) has been moved out of the path of the collar member 191. If no barrel had been in place at the position indicated in FIGS. 13, 14 and 16, the arm 216 would have blocked the upward movement of the collar 191 as well as the upward movement of the tubular member 173 and shaft 178. The cam wheel 192 would continue to rotate with the shaft 42 and would result in no structural damage to the machine components.

As the tubular member 173 and the shaft 178 are moved upwardly, two things happen simultaneously. Referring to FIG. 21, the arbor 248A will come into engagement with the pad 184 on the arm 186 of the L-shaped arm 181. Further upward movement of the arm 181 will cause the arbor 248A to move upwardly therewith so that the flange 249A thereon will come into engagement with the surface 208 on the latch member 254. The latch member 254 will pivot about the axis of the pin 255 against the urgence of the spring 209 until the flange 249A reaches the position illustrated by the dotted lines of FIG. 21. In this position, the latch member 254 will snap into the position illustrated below the flange 249A to hold the arbor 248A in the position illustrated in dotted lines. In this position, the opening 252A will receive the neck 98A of the hub 96A.

Secondly, the flange 251 will come into engagement with the rotating socket member 183 and due to engagement therebetween, the arbor 248B will be rotatably driven thereby. Further upward movement of the shaft 178 and tubular member 173 will cause the arbor 248B carrying a hub member 96 to move to the dotted line position illustrated in FIG. 21. Since the arbor 248B is rotating, the hub 96 will be spun into engagement with the rollers 206 and 207 causing same to be curled over the ridge 94 as illustrated in FIG. 21 for a rigid securement.

Further rotation of the cam wheel 192 will cause the arm 193, tubular member 173 and shaft 178 to be moved downwardly away from the barrel 91 and the assembled hub 96. As a result, the arbor 248B will move downwardly with the socket member 183 under the influence of its own weight. However, should the arbor 248B remain in the position shown in dotted lines in FIG. 21, the leg 191 of the bracket 185 will engage the upper surface of the flange 251 and pull same downwardly therewith. On the other hand, the arbor 248A will not move downwardly with the pad 184 and arm 186. Instead, the arbor 248A will remain supported on the upper surface of the latch member 254.

At the completion of the downward movement of the arm 181, the screws 73 and 74 will be intermittently driven again to advance the barrels along the assembly line A to the next index station. Simultaneously therewith, the turret assembly 236 will be driven one index station counterclockwise as viewed in FIGS. 19 and 19A. As a result of this movement, the flange 249A on the arbor 248A will move off from the upper surface of the latch member 254 carrying therewith a hub 96A. Simultaneously with the releasement of the flange 249A on the arbor 248A from the upper surface of the latch member 254, the radially outermost surface of the arbor 248A will come into frictional engagement with the rubber ring 270 which resists the downward movement of the arbor 248A. The arbor 248A is urged downwardly until the flange 249A thereof engages the upper surface of the bushing elements 250. The downward movement of the arbor 248A is slowed by the ring 270 so that the hub 96 will not bounce out of the opening 252A due to a sudden engagement of the flange 249A with the upper surface of the bushing elements 250. At the completion of an indexing movement of the turret assembly 236, the hub assembling operation is repeated as set forth above.

HUB CHECK STATION (FIG. 22)

At the completion of the hub assembly operation, the sequenced intermittent rotation of the screws 73 and 74 is again initiated by the cam members 47 and 47A to advance the assembled barrel 91 and hub 96 along the assembly line A until this subassembly arrives at the hub check station 127 located in this embodiment three index stations rightwardly of the hub assembly station 126 as illustrated in FIG. 19A. At this particular location, the barrel 91 and hub 96 are positioned in axial alignment between the light source 259 and photoelectric cathode 261 so that the light will attempt to travel through the opening now occupied by the barrel 91 fitted with a hub 96 and bearing seal 102 therein.

If no barrel 91 is present at the check station, or if there is no seal in the hub 96 attached to such barrel, the photocell circuitry will cause an opening of the switch 582 (FIG. 54). However, the relay coil CR3 would remain energized through the normally closed limit switches 262 and 578. At a predetermined point in the cycle, the cam member 576 (FIG. 3) causes the normally closed switch 578 (FIG. 54) to open for a short period of time. However, the relay coil CR3 will still remain energized through the normally closed switch 262. Thus, only the presence of a barrel 91 will open the switch 262 and CR3 is not de-energized unless the hub is missing or is present without the seal therein.

It sometimes will happen that a barrel will be missing from the series of index stations in the assembly line A. As a result, the barrel detecting mechanism 211 in the hub assembly station 126 will, when it detects the missing barrel, prevent the arbor 248A from picking up a hub. Specifically, the arm 216 of the barrel detecting mechanism will engage the upper surface of the collar 191 to prevent the collar from moving upwardly. As a result, the hub in the arbor 248B (above the assembly line A) will not be joined to a barrel in the assembly line. If the hub is not removed from the arbor 248B, continued advancement of the turret assembly 236 would subsequently result in the placement of another hub on top of the first one which was not used, unless some provision is made to avoid this problem. However, the machine will automatically stop to avoid such joining when the barrel without a hub assembled thereto reaches the check station 127, which is located to stop the machine before the arbor with the hub reaches the position 248A in FIG. 19.

Specifically, the switch 262 will be opened due to the presence of a barrel during the check procedure, and the photocell circuitry will open the switch 582 due to the absence of a hub at the check station. At a predetermined point in the cycle, the cam 576 will open the limit switch 578. Thus, the relay coil CR3 is de-energized thereby causing an opening of the normally closed contact CR3–1 resulting in the de-energization of the relay coil CR1 and motors 26 and 37. De-energization of the relay CR3 will also cause a closing of the contacts CR3–2 resulting in the energization of the trouble light 595 thereby informing the operator where the trouble lies in the machine.

The operator then removes the unassembled barrel which is in the assembly line A above arbor 248B, and he also may remove the hub from the arbor which is about to move into position 248A, if necessary. It will be recognized that these two removal actions can be effected automatically, as by vacuum, by air blast or by mechanical means. Removal of the unassembled barrel will close the switch 262 to again energize the relay coil CR3 and extinguish the trouble light 595. A closing of the start switch 570 will cause the motors 26 and 37 to become energized again.

If it is assumed that a correctly assembled barrel 91 and hub 96 enter the hub check station 127, the light from the light source 259 would be blocked by the seal 102 in the hub 96. Thus, the photocell circuitry would not open the switch 582 and, as a result, the relay coil CR3 would remain energized throughout the hub check even though the switches 262 and 578 were caused to open during the check cycle.

FILL STATION (FIGS. 23–30)

Further intermittent rotation of the screws 73 and 74 will cause an intermittent movement of the assembled barrel 91 and hub 96 rightwardly into the filling station 128 resulting in a movement of the arm 373 (FIG. 29) of the barrel detecting mechanism 371 from the dotted line position to the solid line position. Furthermore, arm 376 (FIG. 30) is also caused to move from the dotted line position to the solid line position.

While an assembled barrel and hub move toward the filling station 128, the cam wheel 358 is rotated so that the cam follower 362 moves the arm 342 upwardly. This results in the filling of the chamber 291 (FIG. 28) with liquid which is supplied to said chamber through the valve gate 298 which is in the downward position.

Rotation of the cam wheel 277 to the dotted line position (FIG. 24) will cause a downward movement of the arm 279 and rod 269 under the urgence of the spring 276 which will result in a downward movement of the nozzle 274 so that the lowermost end thereof will be inserted into the opening of the barrel 91.

Simultaneously with the rotation of the cam wheel 277, the cam wheel 329 is rotated to cause an upward movement of the arm 326. Since the arm 376 (FIG. 30) has been rotated to the solid line position, the arm 333 is permitted to move upwardly to the solid line position illustrated in FIG. 25. As a result, the valve member 298 is also permitted to move from the dotted line position (FIG. 28) upwardly to the solid line position wherein the opening 299 interconnects the opening 301 with the opening 292.

At the completion of the movement of the valve member 298, the cam wheel 364 will cause a downward movement of the cam follower 362 resulting in a downward movement of the rod 337 and plunger rod 294 (FIG. 28) to the solid line position. Thus, fluid 103 will be urged through the hose 303 and the openings 292, 299 and 301 to the nozzle 274 and thence into the syringe barrel.

Figure 29:
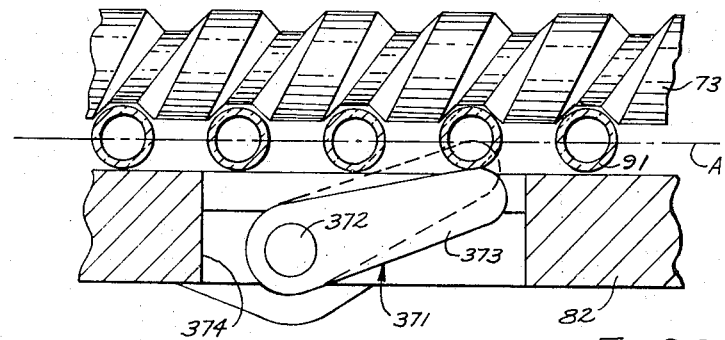
FIG. 29 is a sectional view taken along the line XXIX—XXIX in FIG. 23.
Figure 30:
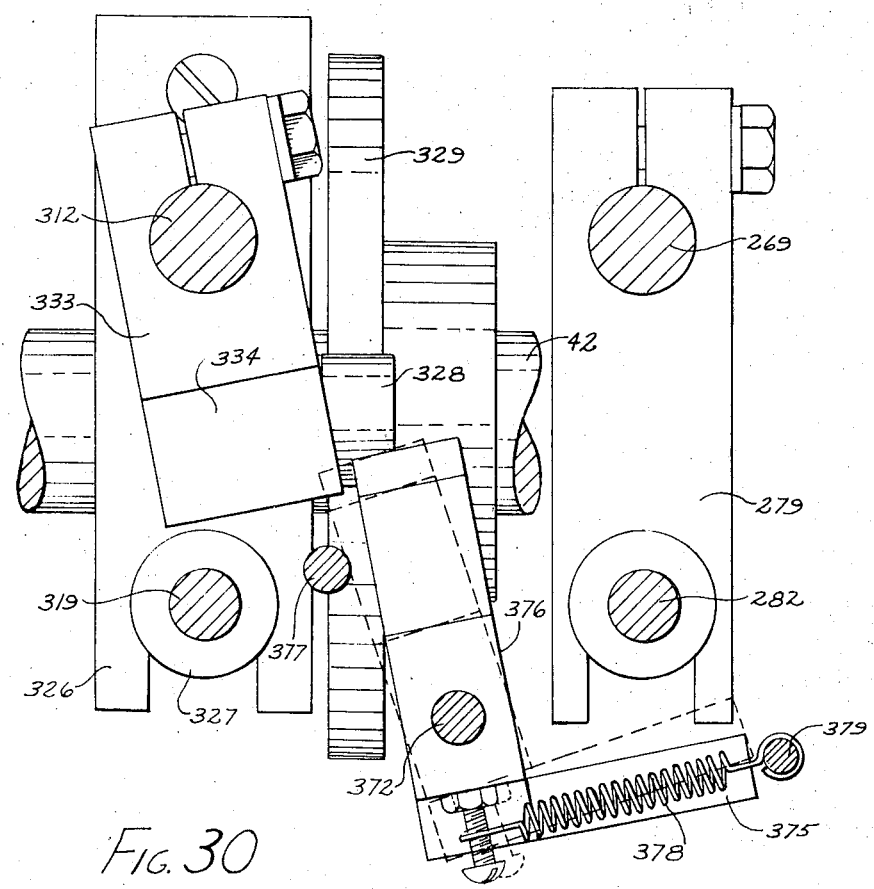
FIG. 30 is a sectional view taken along the line XXX—XXX in FIG. 23.

If there is no barrel 91 in the filling position of FIG. 29, the arm 376 is then in the position illustrated in dotted lines in FIG. 30. As a result, an upward movement of the arm 326 would not result in an upward movement of the arm 317 and rod 312 due to the engagement of the upper surface 334 on the arm 333 with the undersurface of the arm 376. Thus, the valve member 298 would not be permitted to move upwardly, and a downward movement of the plunger rod 294 would result in a pushing of the fluid 103 in the chamber 291 back toward the source (not shown). This construction, therefore, prevents the discharge of fluid in the absence of a barrel 91.

Moreover, at the time that arm 373 moves into the assembly line, because there is no barrel in the filling station, an extension 375 (FIG. 30) on arm 376 engages arm 279 on rod 269 so as to hold same in its raised position.

However, and assuming that a properly assembled barrel 91 and hub 96 are in the filling position in FIG. 29, a further rotation of the cam wheel 329 will result in an upward movement of the cam follower 328 and arm 326 to cause the spring 332 to pull the arm 317 and rod 312 upwardly so that the valve member 298 is moved from the dotted line position to the solid line position in FIG. 28. Thus, the opening 299 therein interconnects the openings 292 and 301. At the completion of the upward movement of the valve member 298, the cam wheel 364 allows the cam follower 362 to be moved downwardly under the urgence of the spring 341 to cause a downward movement of the plunger rod 294. The plunger rod 294 displaces a predesignated amount of fluid 103 from the chamber 291 and through the openings 292, 299 and 301, and through the hose 303 to the nozzle 274 which discharges same into the barrel 91.

The knob 354 (FIG. 27) on the end of the arm 348 serves to regulate the stroke of the rod 337 and plunger rod 294 within the chamber 291 to thereby regulate the amount of fluid 103 displaced by the vertical movement thereof. A movement of the carriage 356 rightwardly will reduce the distance between the stub shaft 357 and pivot shaft 349 and reduce the stroke of the plunger rod. The position of the carriage 356 on the arm 348 shown in FIG. 27 will cause the plunger rod 294 to move through the greatest stroke.

STOPPER ASSEMBLY STATION (FIGS. 31–37)

Further intermittent rotation of the screws 73 and 74 will move the barrel 91, hub 96 and fluid 103 from the filling station 128 to the stopper assembly station 132.

A plurality of cylindrical stoppers 104 are fed by the track 131 to the cylindrical opening 383 in the flange 382. When a stopper 104 becomes aligned with the opening 383, it is urged downwardly until it comes to the zone wherein the opening becomes smaller in diameter so that it will become wedged therein.

Figure 36:
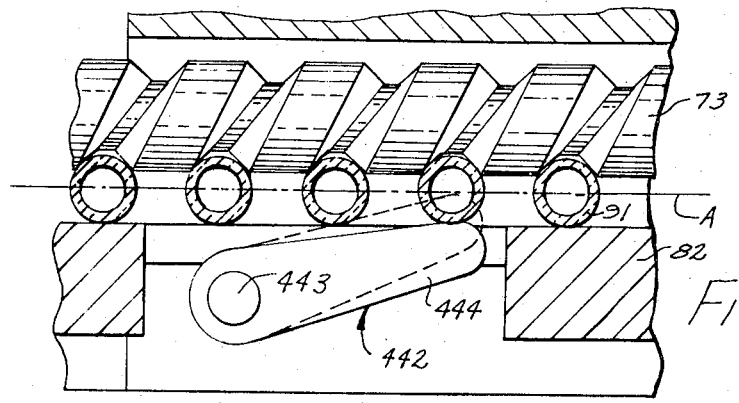
FIG. 36 is a sectional view taken along the line XXXVI—XXXVI in FIG. 31.
Figure 37:
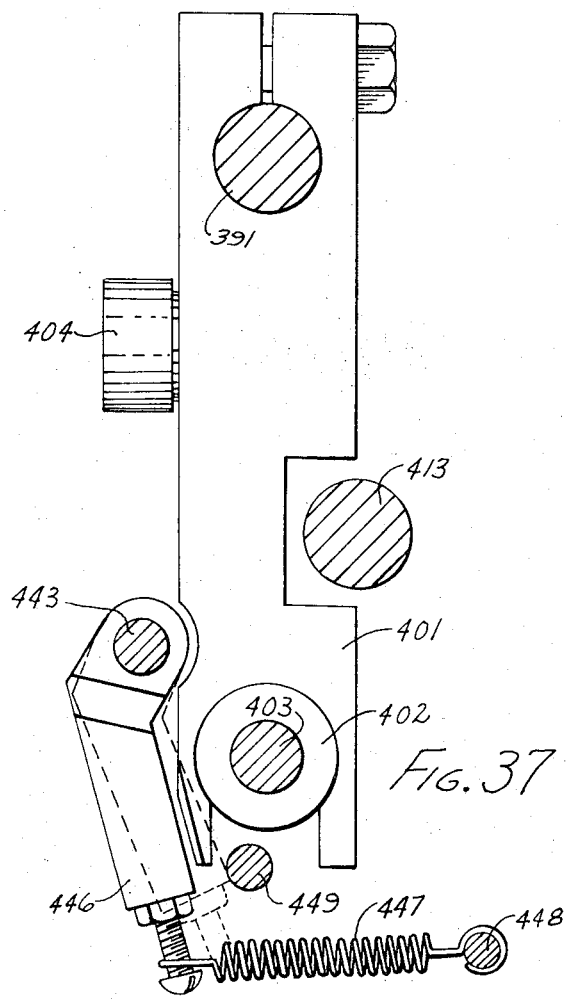
FIG. 37 is a sectional view taken along the line XXXVII—XXXVII in FIG. 31.

Movement of the barrel 91 into the stoppering position illustrated in FIG. 36 will result in a pivotal movement of the arm 444 of the barrel detecting mechanism 442 from the dotted line position to the solid line position. This movement in turn will cause the arm 446 (FIG. 37) to move from the dotted line position to the solid line position.

Rotation of the cam wheel 421 will cause the cam follower 419 to move upwardly under the urgence of the spring 423. Upward movement of the rod 413 will cause the upper end thereof, particularly the notch 414, to engage the neck 98 of the hub 96 assembled on the barrel. Further upward movement of the rod 413 will cause the barrel 91 to engage the annular rubber pad 386 (FIG. 35) on the underside of the flange 382 surrounding the lower portion of the opening 383. The engagement between the flange 92 on the barrel and the rubber pad 386 will be sufficient to cause a sealing therebetween.

At the completion of the sealing between the flange 92 on the barrel 91 and the rubber pad 386, rotation of the cam wheel 439 will cause an upward movement of the cam follower 438 and arm 434. This movement will in turn cause an upward movement of the rod 428 which will result in an upward movement of the piston element 431 (FIG. 35) in the opening 387 to interconnect the passageway 388 with a vacuum source (not shown) communicating with the passageway 389. The vacuum source will extract the air present in the barrel 91 above the fluid.

Simultaneously therewith, rotation of the cam wheel 406 will cause a downward movement of the cam follower 404, arm 401 and rod 391 due to the urgence of the spring 398 to continue downward movement of the rod 391 to urge the stopper 104 through the narrowed zone of the opening 383 and into the barrel 91 to a position adjacent the fluid 103 as illustrated in the fully assembled syringe shown in FIG. 8.

If a barrel 91 is not present in the location illustrated in FIG. 36, the arm 446 (FIG. 37) will remain in the dotted line position to prevent a downward movement of the arm 401 so that the apparatus will not dispense a stopper from the lower end of the opening 383.

At the completion of the stopper insertion movement, further rotation of the cam wheel 406 will result in an upward movement of the cam follower 404, arm 401 and rod 391 to retract the plunger rod 396 from the opening 383 to the position illustrated in solid lines in FIG. 33. Simultaneously therewith, further rotation of the cam wheel 439 will cause a downward movement of the cam follower 438, arm 434 and rod 428 under the urgence of the spring 433 to move the piston member 431 into a position where the passageways 388 and 389 are blocked from one another. Also simultaneously therewith, further rotation of the cam wheel 421 will result in a downward movement of the cam follower 419, arm 416 and rod 413 to retract the notch 414 from engagement with the neck 98 on the hub 96.

PLUNGER ROD ASSEMBLY STATION
(FIGS. 38–42)

Further intermittent rotation of the screws 73 and 74 will cause the assembly consisting of a barrel 91, hub 96, fluid 103 and stopper 104 to move from the stopper assembly station 132 to the plunger rod assembly station 136 in the position illustrated in FIG. 41.

As the barrel 91 approaches this location, the arm 497 of the barrel detecting mechanism 494 is rotated from the dotted line position to the solid line position. Furthermore, the arm 499 is also rotated from the dotted line position to the solid line position.

As the barrel 91 moves into the assembly station, the lower portion of the sleeve 97 of the hub 96 may be simultaneously guided upwardly by the surface 461 on the track 456 so that the flange 92 on the barrel 91 is raised off the upper surface of the guide member 82 as illustrated in FIG. 39.

A plurality of plunger rods 107 are fed to the plunger rod assembly station 136 by the track 134. The plunger rod 107 is supported on the upper surface of the projections 478 and 479 on the holding members 473 and 474, respectively. In this location, the axis of the plunger rod 107 intersects the assembly line A and is axially aligned with the axis of the barrel 91.

Rotation of the cam wheel 482 will cause the cam follower 491, arm 487 and rod 481 to move downwardly under the urgence of the spring 485. However, if no barrel 91 is in the location illustrated in FIG. 41, then the arm 499 will block the downward movement of the arms 487 and 483 and pusher member 484. Thus, the apparatus will not dispense a plunger rod 107 in the absence of a barrel 91.

However, assuming that a barrel 91 is present at the location illustrated in FIG. 41, a downward movement of the rod 481 and pusher member 484 will occur so that the lower end portion thereof will engage the upper portion of the plunger rod causing same to be moved downwardly past the pivotal holding members 473 and 474 into the upwardly opening portion of the barrel 91. Since the lower portion of the plunger rod 107 has a rib 112 thereon for engagement with the opening 109 in the stopper 104, a considerable amount of force is necessary in order to push the rib member 112 into the opening 109. Thus, by raising the flange 92 of the barrel 91 off the upper surface of the guide member 82, breakage of the barrel 91 is prevented. Further downward movement of the rod 481 will supply the necessary pressure to cause the rib 112 to enter the opening 109 in the stopper 104 thereby securing the plunger rod 107 thereto. This force on the stopper may also increase the pressure between the fluid 103 and stopper 104.

At the completion of the plunger rod assembly movement, further rotation of the cam wheel 492 will cause an upward movement of the cam follower 491, arm 487 and rod 481 to retract the pusher member 484 to the position illustrated in solid lines in FIG. 38.

PLUNGER ROD LIFT STATION 135
(FIGS. 43 and 44)

Further rotation of the screws 73 and 74 will cause the assembly consisting of the barrel 91, hub 96, fluid 103, stopper 104 and plunger rod 107 to move from the plunger rod assembly station 136 to the plunger rod lift station 135 and bring a barrel 91 to the position illustrated in FIGS. 43 and 44.

As the barrel 91 moves into the plunger rod lift station, the flange 92 thereon moves into the notch 644 and beneath the flange 646. Furthermore, the body portion of the plunger rod 107 is moved between the innermost ends of the flanges 631 and 632 of the inverted channel-shaped member 626. The flange 108 is positioned above the flanges 631 and 632.

Rotation of the cam wheel 638 will cause the cam follower 637, arm 633 and rod 621 to move upwardly under the urgence of the cam follower on the radially outer surface of the cam wheel 638, contrary to the urging of the spring 641. The upper surfaces of the flanges 631 and 632 will engage the undersurface of the flange 108 on the plunger rod 107 to move the plunger rod 107 and stopper 104 secured thereto upwardly to the position determined by the dimensions of the cam 638. This operation reduces the pressure between the fluid 103 and the stopper 104. Upward movement of the barrel 91 is prevented by engagement of the flange 92 with the undersurface of the notch 644 and the undersurface of the flange 646.

NEEDLE AND NEEDLE CASING ASSEMBLY STATION (FIGS. 45–51)

Further rotation of the screws 73 and 74 will move the assembled barrel 91, hub 96, fluid 103, stopper 104 and plunger rod 96 away from the plunger rod lift station 135 and into the needle and needle casing assembly station 139. When the barrel 91 of the subassembly reaches the location illustrated in FIG. 49, the arm 544 of the barrel detecting mechanism 542 will move from the dotted line position to the solid line position. Furthermore, the bracket 546 and arms 547 and 548 (FIGS. 50 and 51) will move from their dotted line positions to their solid line positions.

A needle assembly 113 within a needle sheath 114 is moved along the track 138 to the position illustrated in FIG. 46 wherein the lower surface of the flange 121 of the needle casing 114 is engaged with the upper edge of the holding member 533 and the body portion thereof is centered on the vertical center line of the holding member 533 which intersects the assembly line A.

Simultaneously as the screws 73 and 74 move a barrel 91 into the position illustrated in FIGS. 46 and 47, the neck 93 thereof becomes positioned between the projections 511 and 514 on the plates 508 and 512, respectively. Since the spacing between the projections 511 and 514 is greater than the diameter of the neck 93 but less than the outer diameter of the sleeve portion 97 of the hub 96, the barrel 91 is prevented from moving upwardly upon the application of an upwardly directed force thereto.

Rotation of the cam wheel 523 will cause an upward movement of the cam follower 522, arm 517 and rod 516. Furthermore, the rod 528 and the holding member 533 connected thereto are also moved upwardly due to the interconnection thereof with the rod 516 by the arms 529 and 531. The upward movement of these members is caused by a contraction of the spring 527.

Upward movement of the holding member 533 will move a needle casing 114 containing a needle assembly 113 upwardly and into engagement with a hub 96 as illustrated in dotted lines in FIG. 47. The upper portion of the needle assembly 113 will move into the interior of the neck 98 of the hub 96. The upward movement is limited by the engagement of the flange 121 on the needle casing 114 with the lower surfaces of the projections 511 and 514 on the plates 508 and 512, respectively. This limit will place the annular rib 115 (FIG. 9) between the annular ribs 99 and 100.

The leaf spring 540 serves to apply pressure against a needle casing 114 so that same is maintained between the legs 536 and 537 (FIG. 48) and against the base portion 541. The spring 540 also assures that the needle casing 114 will be aligned at all times on the aforesaid vertical center line of the holding member 533.

If, for example, a barrel 91 is not in the position illustrated in FIG. 49, the barrel detecting mechanism 542 would remain in the dotted line position as well as the projections 547 and 548 on the arm 546. Thus, upon a rotation of the cam wheel 523, the contraction of the spring 527 would permit an upward movement of the cam follower 522 and arm 517 a small distance until the upper surface of the arm 517 would come into contact with the lower surface of the projections 547 as illustrated in FIG. 51. Thus, the upward movement of the holding member 533 would be prevented until a barrel 91 arrived at the position illustrated in FIG. 46.

NEEDLE CHECK STATION (FIGS. 52 and 53)

Further rotation of the screws 73 and 74 will move the barrel 91, hub 96, fluid 103, stopper 104, plunger 107, needle assembly 113 and needle casing 114 along the assembly line A from the needle and needle casing assembly station 139 to the needle check station 140. When the barrel 91 moves into the position illustrated in FIG. 52, the feeler switch 561 will open due to the pressure applied to the actuator 562. However, the relay coil CR4 will remain energized through the normally closed switch 579.

If a needle assembly 113 is inside the needle casing 114, the metal sensing device 558 will detect the metal of the hub 120 and will energize the proximity switch circuitry 584 to close the switch 586. However, if a needle assembly 113 is not positioned within the needle casing 114, the metal detecting device 558 will detect the absence of the metal hub member 120 and will cause the proximity switch circuitry 584 to remain unenergized to leave the switch 586 open. Rotation of the cam 576 will cause the limit switch 579 to open momentarily at a certain point in the cycle. Since the switches 561, 579 and 586 are all open at this point in time, the relay coil CR4 will become de-energized. De-energization of the relay coil CR4 will result in an opening of the contacts CR4–1 which will de-energize the relay coil CR1 and result in the de-energization of the motors 26 and 37. Furthermore, the contacts CR4–2 will close upon the de-energization of the relay coil CR4 to ignite the trouble light 596 which will indicate to an operator where the trouble lies in the machine. Removal of the faulty assembly from the assembly line A by the operator will result in the closing of the feeler switch 561 to re-energize the relay coil CR4. Energization of the relay coil CR4 will result in an opening of the contacts CR4–2 to extinguish the trouble light 596. A closing of the start switch 570 will result in an energization of the relay coil CR1 and energization of the motors 26 and 37 in the above-described manner.

Simultaneously with the detection of a correctly assembled syringe, and simultaneously with the closing of the switch 586, the switch 587 will close. Rotation of the cam 577 will cause the limit switch 580 to close at a certain point in the cycle. If, at the desired point in time, the limit switch 580 and the switch 587 are both closed (indicating a correctly assembled syringe), the counting mechanism 589 will become energized to register the presence of one correctly assembled syringe at the needle check station.

Further rotation of the screws 73 and 74 will move the assembled and filled syringe 89 from the needle check station to the end of the assembly line A where it is discharged therefrom and put into a container for shipping.

MODIFIED CONSTRUCTION OF FIGS. 55–59

The modified drive system 651 (FIG. 55) utilizes some of the components of the drive system illustrated in FIG. 3. Thus, for purposes of discussion, the component parts of the modified drive system 651 will be referred to by the same reference numerals designating corresponding parts of the drive system of FIG. 3 but with the suffix B added thereto.

The shaft 31B and gear 36B are driven for rotation in the same manner as the shaft 31 and gear 36 illustrated in FIG. 3. The shaft 42B is rotatably supported by bearings located in the walls 16B and 17B. The beveled gear 46B is secured to the shaft 42B and is in driving engagement with the beveled gear 36B.

A cam member 47B is secured to the left end of the shaft 42B. In this particular embodiment, the cam 47B is identical to the cam 47 illustrated in FIG. 3.

The pillow block 51B is mounted on the upper surface of the top wall 22B and is secured thereto in any convenient manner. An opening 54B extends vertically through the block 51B and has a pair of bearings 56B and 57B rotatably supporting a shaft 58B therein. A sprocket 50B is secured to the shaft 58B and is rotatable therewith. A plate 59B is secured to the lower end of the shaft 58B by any convenient means and has a plurality of cam followers 61B secured to the underside thereof by stub shafts. The cam followers 61B are positioned so that they are guided in the same manner as the cam followers 61 illustrated in FIG. 3 and thereby cause the plate 59B to rotate a predetermined number of degrees with 360 degrees rotation of the shaft 42B and cam member 47B. Since there are eight cam followers 61B, the plate 59B is rotated 45 degrees with a 360 degree rotation of the shaft 42B.

An idler sprocket 60B is rotatably supported on the upper surface of the pillow block 51B and is coplanar with a sprocket 50B. An endless chain 65B is engaged with the sprockets 50B and 60B to drive a turret assembly identical to that illustrated in FIG. 21.

A plurality of braces 652 are secured to the upper surface of the top plate 22B and extend upwardly therefrom. An elongated bar 653 is secured to the upper end of the braces 652.

Figure 55:
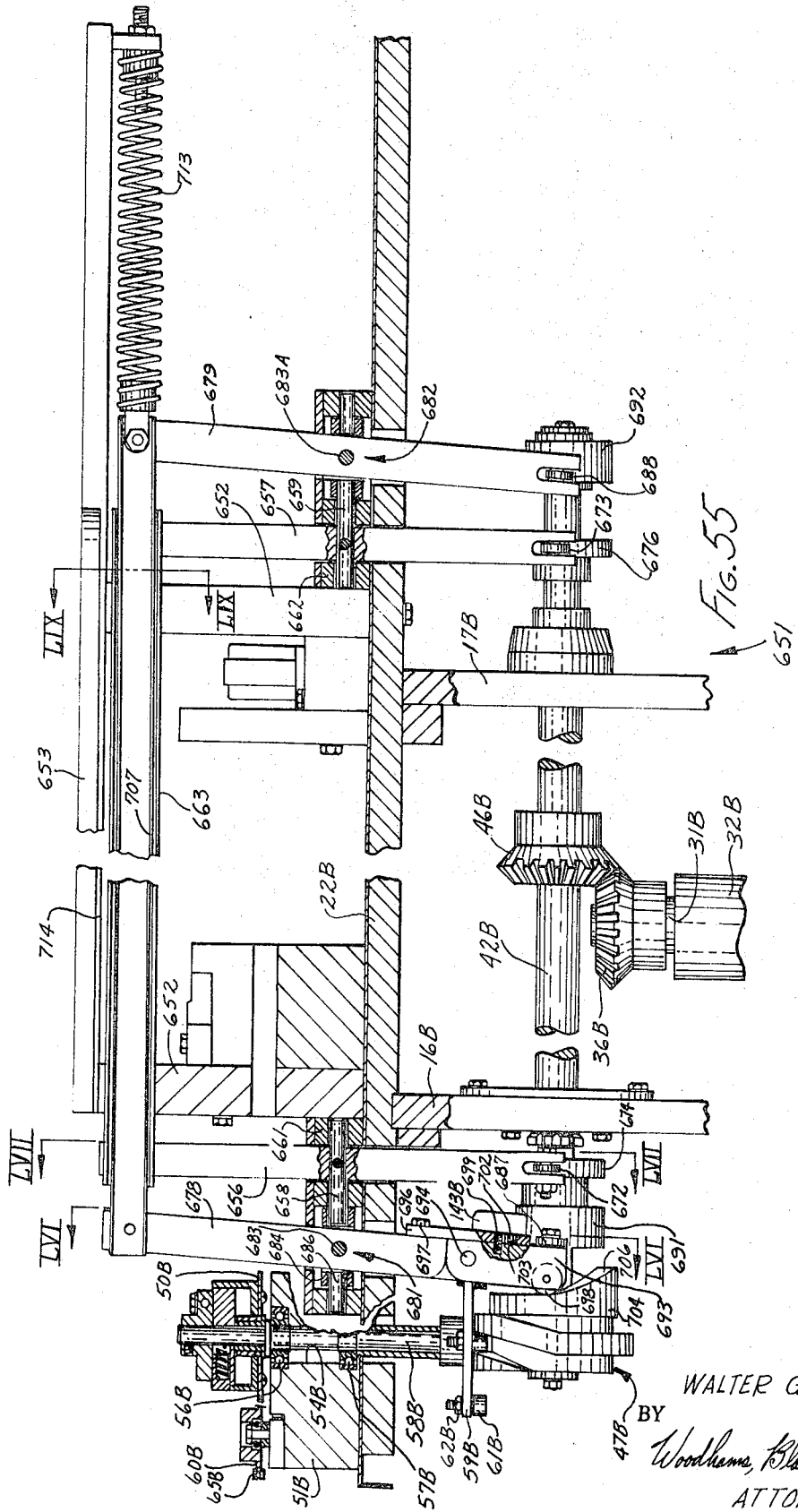
FIG. 55 is an enlarged, broken and partially sectional side view of a modified drive mechanism for the machine.
Figure 56:
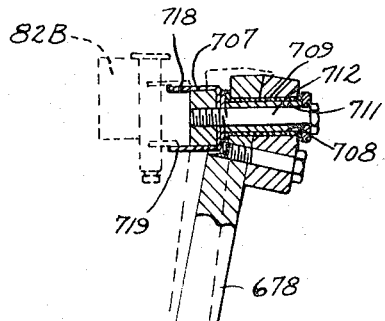
FIG. 56 is a sectional view taken along the line LVI—LVI in FIG. 55.

A plurality of levers (only two levers 656 and 657 are shown in FIG. 55) are pivotally journaled on the top plate 22B. In this particular embodiment, pins 658 and 659 extend through the levers 656 and 657 and are supported in blocks 661 and 662, respectively, which blocks are secured to the upper surface of the top plate 22B.

Figure 57:
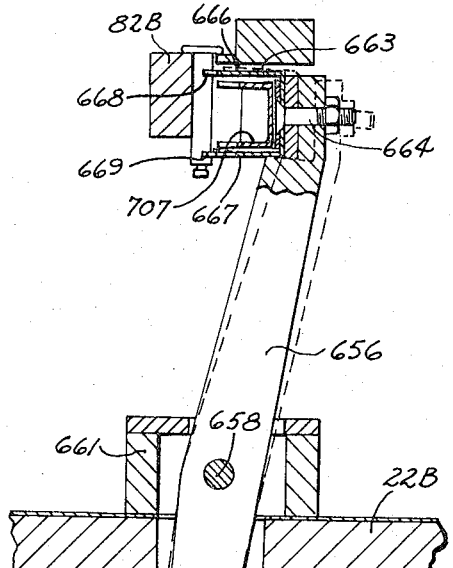
FIG. 57 is a sectional view taken along the line LVII—LVII in FIG. 55.
Figure 58:
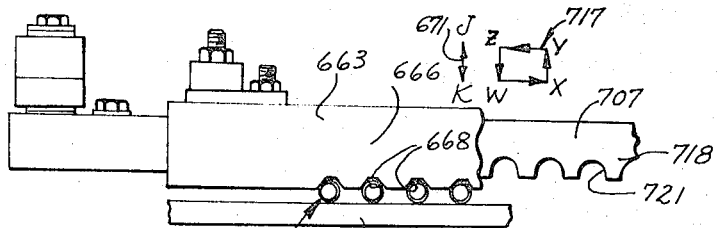
FIG. 58 is a fragmentary top view of the modified drive mechanism.

A channel-shaped clamp bar 663 is rigidly secured to the upper ends of the levers 656 and 657 by bolts 664 (FIG. 57). The flanges 666 and 667 of the clamp bar 663 have a plurality of vertically aligned notches 668 and 669, respectively, spaced along the longitudinal edges thereof, as illustrated in FIGS. 57 and 58. The clamp bar 663 is reciprocable in the direction of the arrows 671 (FIG. 58) when the levers 656 and 657 are pivoted about the axes of the pins 658 and 659.

Cam followers 672 and 673 are rotatably secured to the lower end of the levers 656 and 657, respectively. Cam wheels 674 and 676 are secured to the shaft 42B for rotation therewith and are coplanar with the cam followers 672 and 673, respectively.

Figure 59:
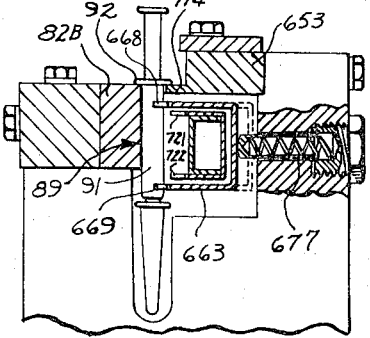
FIG. 59 is a sectional view taken along the LIX—LIX in FIG. 55.

A plurality of springs 677 (only one of which is shown in FIG. 59) are spaced longitudinally along the length of the clamp bar 663 and resiliently urge the clamp bar 663 to the position illustrated in solid lines in FIGS. 57 and 58, wherein the notches 668 and 669 engage and hold a barrel 91 against the guide member 82B. Thus, the cam followers 672 and 673 will be resiliently biased into engagement with the radially outer surface of the cam wheels 674 and 676, respectively.

A plurality of levers (two such levers 678 and 679 are illustrated in FIG. 55) are pivotally journaled to the top plate 22B. In this particular embodiment, the levers 678 and 679 are pivotally supported for compound motion by the universal joint structures 681 and 682. Since the universal joint structures 681 and 682 are preferably identical, only the universal joint structure 681 will be explained in detail. The lever 678 is pivotally supported by a pin 683 for movement in a direction leftwardly and rightwardly of the machine. The pin 683 is secured in a collar 684 which is pivotally supported by pins 658 and 686 for pivotal movement forwardly and rearwardly of the machine.

Cam followers 687 and 688 are rotatably secured to the lower ends of the levers 678 and 679, respectively. Cam wheels 691 and 692 are secured to the shaft 42B and are rotatable therewith. In this particular embodiment, the width of the cam wheels 691 and 692 is sufficient to permit the cam followers 687 and 688 to remain in continuous radial alignment with the outer surfaces thereof when the levers 678 and 679 are pivoted around pins 683 and 683A.

The lever 678 has an arm 693 pivotally connected to the lower end thereof by a pin 694. A plate 696 is secured to the lower end of the lever 678 by a bolt 697 on the rightward surface thereof and serves as a stop for the arm 693. In this particular embodiment, the cam follower 687 is secured to the rightward surface of the arm 693 below the lower end of the plate 696.

A second cam follower 698 is rotatably secured to the lower end of the arm 693 and is rotatable about an axis perpendicular to the axis of rotation of the cam follower 687. A spring 699 urges the arm 693 away from the plate 696 about the axis of the pivot pin 694. A switch 143B is secured to the rightward surface of the plate 696 and has an actuator 702 which projects through an opening 703 in the plate 696 for engagement by the rightward surface of the arm 693 when the arm abuts against the leftward surface of the plate 696. Switch 143B performs the same function as switch 143 shown in FIG. 10, i.e., stops the machine when a barrel 91 jams at the entry end of the assembly line A. Switch 143B also stops the machine if a barrel 91 jams at any other point along line A. Thus, switch 143B serves during movement of rake 707 from $w$ to $x$ in the arrow diagram in FIG. 58. For motion in the direction of $z$ to $w$, jamming can be detected by a second switch (not shown) in series with switch 143B.

A cam wheel 704 is secured to the shaft 42B and is rotatable therewith. The cam follower 698 engages the cam surface 706 on the rightward axial face of the cam wheel 704 whereby the lever 678 is pivoted around the pin 683.

A channel-shaped rake 707 is pivotally connected to the upper ends of the levers 678 and 679. In this particular embodiment, a lateral opening 708 extends through the upper end of the lever 678 and receives a bushing 709. A sleeve 711 is telescoped inside the bushing 709 and is secured to the rake 707 by a bolt 712. Thus, as the lever arm pivots in a direction leftwardly and rightwardly of the machine, the sleeve 711 will be permitted to rotate relative to both the bushing 709 and the upper end of the lever arm 678. Similar structure is provided on lever arm 679.

The front edges of flanges 718 and 719 of rake 707 have a plurality of vertically aligned notches 721 and 722, respectively, uniformly spaced lengthwise thereof, as illustrated in FIGS. 57, 58 and 59. The rake is movable in the direction of the arrows 717 (FIG. 58) about the multiple axes of the compound joint structures 681 and 682.

One end of a spring 713 (FIG. 55) is secured to the right end of the rake 707 and the other end thereof is secured under tension to the right end of the bar 653. Thus, the rake 707 is biased in a rightward direction so that the cam follower 698 on the arm 693 is resiliently biased into engagement with the cam surface 706 on the cam wheel 704.

In this particular embodiment, the bar 653 has a flange 714 (FIG. 59) which projects frontwardly toward the assembly line A and has an upper surface coplanar with the upper surface of the guide member 82B. The flange 92 of each barrel 91 engages the upper surfaces of the guide member 82B and the flange 714.

In operation, the shaft 42B is driven for continuous rotation by the gear 36B and shaft 31B. Rotation of the cam wheel 704 will cause the rake 707 to move in a direction leftwardly and rightwardly of the machine. Rotation of the cam wheels 691 and 692 will cause the rake 707 to move frontwardly and rearwardly. The combined action of the cam wheels 704, 691 and 692 causes the rake 707 to move in a rectangular path indicated generally by the arrows 717 in FIG. 58. Rotation of the cam wheels 674 and 676 will cause a simultaneous movement of the clamp bar 663 in the direction of the arrows 671. The movements of the rake and clamp bar are synchronized to advance a plurality of barrels in step-by-step movements rightwardly along the assembly line.

Starting, for example, with the clamp bar 663 in position K on the arrows 671, the rake 707 moves from position X through position Y and Z to position W. Then, the clamp bar 663 will move to position J, thereby releasing its grip on the barrels 91 to permit the rake 707 to move from position W to position X and advance the barrels one step. Thus, by appropriate manipulation of the clamp bar 663 and the rake 707, the barrels 91 are intermittently moved rightwardly along the guide bar 82B one index station at a time.

The assembled and filled syringes 89 (FIG. 7) are discharged at the rightward end of the machine having the alternate structure (FIG. 55) including the bar 663 and rake 707, for advancing the barrels along the assembly line.

Although particular preferred embodiments of the present invention have been disclosed above for illustrative purposes, it will be understood that variations or modifications thereof, which lie within the scope of the appended claims, are fully contemplated. For example, the conveyor mechanisms represented by the screws 73 and 74 or by the clamp bar 663 and rake 707 could be replaced by a turntable (not shown) having plural gripping means uniformly spaced along the periphery thereof for holding syringe barrels in upright positions as they are moved through the various assembly stations.

The embodiments of the invention in which an exclusive property or privilege is claimed are defined as follows:

1. In a method for automatically assembling and filling a plurality of syringes having tubular barrels open at both ends, the steps comprising:
   sequentially advancing a plurality of upright barrels in spaced relationship intermittently along a substantially horizontal assembly line through a plurality of stations;
   mounting a tubular hub on the lower end of each barrel and simultaneously covering the lower open end of said barrel with a liquid-tight sealing member capable of penetration by a cannula;
   discharging a liquid into each barrel;
   reducing the pressure within said barrel above the upper surface of said liquid;
   inserting a piston into each barrel while the pressure above said liquid is reduced;
   inserting a plunger into said barrel and attaching same to said piston;
   raising said plunger and said piston slightly;
   mounting a cannula and casing therefor on the lower end of said hub, the mounted cannula having a sharpened upper end adjacent to but spaced from the sealing member; and
   discharging the assembled syringes with liquid therein one at a time from said line.

2. A method according to claim 1, including the step of detecting the presence of a sealing member in each barrel.

3. In a machine for automatically assembling and filling a syringe having a flanged cylindrical barrel open at both ends thereof, a sealing member covering one end of said barrel, a cylindrical hub affixing the sealing member to said barrel, a piston within said barrel with a flanged plunger attached thereto, a cannula assembly attached to said hub, and a casing covering the cannula, the combination comprising:
   frame means;
   a plurality of elongated, parallel elements arranged for engaging simultaneously a plurality of spaced barrels disposed in upright positions along an assembly line;
   operating means supporting said elongated elements on said frame means for movement whereby a plurality of barrels are advanced simultaneously and intermittently through a plurality of spaced stations arranged along said assembly line;
   hub attaching mechanism mounted on said frame means for applying a sealing member and a hub to the lower end of each barrel at a hub station near one end of said assembly line;
   filling mechanism on said frame means at a filling station in said line for discharging a liquid into each barrel after the hub is attached;
   piston inserting mechanism on said frame means for urging a piston into each barrel in a piston station without materially increasing the pressure in the barrel;
   cannula mounting mechanism on said frame means at a cannula station in said line for affixing a cannula to the hub on each barrel;
   discharge mechanism on said frame means for removing a filled and assembled syringe from the other end of said line; and
   drive means mounted on said frame means for actuating and synchronizing said operating means and said mechanisms.

4. In a machine for assembling and filling a syringe having a cylindrical barrel open at both ends thereof, a sealing member covering one end of said barrel, a cylindrical hub affixing the sealing member to said barrel, a piston within said barrel with a plunger attached thereto, a cannula assembly attached to said hub, and a casing covering the cannula, the combination comprising:
   frame means;
   a plurality of elongated, parallel elements arranged for engaging simultaneously a plurality of spaced barrels disposed in upright positions along an assembly line;
   operating means supporting said elongtaed elements on said frame means for movement whereby a plurality of barrels are advanced simultaneously and intermittently through a plurality of spaced stations arranged along said assembly line;
   plural sensing mechanisms disposed along said line for detecting the presence of a barrel at selected stations;
   hub attaching mechanism mounted on said frame means for applying a sealing member and a hub to the lower end of each barrel at a hub station near one end of said assembly line;
   filling mechanism on said frame means at a filling station in said line for discharging a liquid into each barrel after the hub is attached;
   evacuating mechanism on said frame means for reducing the pressure within each barrel containing said liquid and disposed in a piston station along said line;
   piston inserting mechanism on said frame means for urging a piston into each barrel in said piston station while the pressure is reduced in the barrel;
   plunger applying mechanism on said frame means at a plunger station in said line for inserting a plunger into each barrel and attaching the plunger to the piston;
   plunger lifting mechanism on said frame means at a lift station in said line for raising the plunger and piston within each barrel;
   cannula mounting mechanism on said frame means at a cannular station in said line for affixing a cannula to the hub on each barrel;
   discharge mechanism on said frame means for removing a filled and assembled syringe from the other end of said line; and
   drive means mounted on said frame means for actuating and synchronizing said operating means and said mechanisms.

5. A machine according to claim 4, having an elongated chute comprising a pair of spaced and parallel members sloping downwardly to said one end of said assembly line for supporting a plurality of flanged barrels by their flanges and guiding them from a source to said line, the slope of said members being approximately in the ratio of the thickness divided by the diameter of the flanges on said barrels so that said barrels are suspended by and between said members in substantially upright positions when the flange on one barrel is overlapped by the flanges on the two adjacent barrels, said chute being arranged so that the barrels enter the assembly line from one side thereof.

6. A machine according to claim 4, wherein each barrel sensing mechanism comprises a pivotally supported, axially vertical shaft having spaced upper and lower arms thereon, and spring means urging the upper arm toward a position engageable by each barrel as it is moved along said line, said spring simultaneously urging the lower arm into a position for releasably preventing operation of one of said mechanisms.

7. A machine according to claim 4, wherein said elongated elements comprise an elongated, substantially horizontal guide member disposed upon one lateral side of said assembly line and elongated screw means disposed upon the other lateral side of said line and having uniform thread means, said guide and each adjacent root in said screw means being arranged to receive a barrel therebetween, each barrel having a flange engaged with the upper edge of said guide member when said barrel is within a said root.

8. A machine according to claim 7, in which said screw means comprises a pair of spaced upper and lower screws, and said operating means rotates said screws so that the roots thereof are vertically aligned on the sides thereof in juxtaposition to said guide member.

9. A machine according to claim 4, wherein said elongated elements comprise an elongated, substantially horizontal guide member disposed on one lateral side of said assembly line and a pair of nested, channel-shaped members juxtaposed therewith on the other side of said assembly line;

the flanges of said channel-shaped members extending toward said guide member and having uniformly-spaced, vertically-alignable notches in the extended edges thereof;

the outermost channel-shaped member being mounted on a first support means and adapted for substantially horizontal movement toward and away from said guide member so as to periodically hold said barrels against said guide member; and the innermost channel-shaped member being mounted on a second support means and adapted for substantially rectilinear movement in a substantially horizontal plane normal to the longitudinal axes of the barrels and so as to engage and advance the barrels on said assembly line and along said guide member during periods when the outermost channel-shaped member is away from the guide member.

10. A machine according to claim 4, wherein said elongated elements comprise an elongated, substantially horizontal guide member disposed on one lateral side of said assembly line and elongated, plural positioning means juxtaposed therewith on the other side of sad assembly line, said positioning means having edge means extending toward said guide member, and said edge means having uniformly-spaced, vertically-alignable notches therein;

at least one of said positioning means being mounted on a first support means and adapted for substantially horizontal movement toward and away from said guide member so as to periodically hold said barrels against said guide member; and at least one other of said positioning means mounted on a second support means and adapted for substantially rectilinear movement in a substantially horizontal plane normal to the longitudinal axes of the barrels and so as to engage and advance the barrels on said assembly line and along said guide member during periods when the positioning means mounted on the first support means is away from the guide member.

11. A machine according to claim 10, wherein the first support means comprises at least one elongated member attached at one end to the outermost channel-shaped member, pivotally mounted on said frame means, and provided with a cam follower on the other end thereof, the cam follower being in contact with a cam surface mounted on said drive means; and wherein the second support means comprises at least one elongated member attached at one end to the innermost channel-shaped member, universally pivoted on said frame means and provided with a pair of cam followers in contact, respectively, with two cam surfaces substantially normal to each other and mounted on said drive means.

12. A machine according to claim 4, wherein said hub attaching mechanism comprises turret means supported upon said frame means for rotation around a substantially vertical axis adjacent said hub station, said turret having a plurality of hub supporting arbors rotatably supported thereon at uniform intervals therearound and equally spaced from the rotational axis thereof so that each arbor is moved one at a time into and out of a position directly below said hub station;

chute means extending between a supply of hubs and a point above an arbor spaced from said position, whereby hubs are fed to said arbors and deposited thereon;

vertically reciprocable actuating means engageable with an arbor having a hub supported thereon for urging said arbor upwardly so that the hub engages the lower end of a barrel in said hub station; and rotary means engageable with a portion of said hub when it is engaged with the lower end of a barrel for securing same to said barrel.

13. A machine according to claim 4, wherein said filling mechanism comprises an elongated discharge tube and support means vertically reciprocably mounted upon said frame means and attached to said discharge tube for effecting movement thereof into and out of a barrel disposed in said filling station;

a source of liquid under pressure and conduit means connecting said discharge tube to said source; and valve means responsive to the movement of said reciprocable means and the presence of a hub on said barrel for discharging the liquid from said source into said discharge tube and thence into said barrel.

14. A machine according to claim 4, wherein said piston inserting mechanism comprises piston guide means mounted upon said frame means and extending across said assembly line above said elongated elements and having a substantially vertical guide passageway therein;

annular seal means on said guide means around the lower end of said passageway for sealing engagement with a flange on a barrel in the piston station;

means for effecting relative movement between said seal means and said flange on a barrel in the piston station whereby said flange engages said seal means;

evacuating means including an evacuation source and conduit means communicating between said source and said guide passageway between the upper and lower ends thereof;

chute means connected between a supply of said pistons and said guide passageway above said conduit means; and a piston inserting ram reciprocably supported upon said frame means for substantially vertical movement into and out of said guide passageway for engaging a piston therein and driving same into said barrel.

15. A machine according to claim 4, wherein said piston inserting mechanism comprises piston guide means mounted upon said frame means and extending across said assembly line above said elongated elements and having a substantially vertical guide passageway therein;

annular seal means on said guide means around the lower end of said passageway for sealing engagement with a flange on a barrel in the piston station;

hub-engaging means below said assembly line vertically reciprocably supported upon said frame means for engaging said hub and moving the hub, barrel and liquid upwardly into engagement with said annular seal means;

evacuating means including an evacuation source and conduit means communicating between said source and said guide passageway between the upper and lower ends thereof;

chute means connected between a supply of said pistons and said guide passageway above said conduit means;

a piston inserting ram reciprocably supported upon said frame means for substantially vertical movement into and out of said guide passageway for engaging a piston therein and driving same into said barrel;

valve means in said conduit means for connecting said guide passageway to said evacuating means when said piston is in said guide passageway above said conduit means and said barrel flange is against said seal means, whereby the pressure within said barrel above said liquid is reduced before said piston means is inserted into said barrel.

16. A machine according to claim 4, wherein said plunger inserting mechanism comprises pivotal support means disposed on opposite lateral sides of and above said line for engaging a flange on a plunger and releasably supporting said plunger in a position above said piston inserting station in the assembly line;

chute means connected to a supply of plungers and arranged to guide said plungers one at a time into said position above said plunger station;

a vertically reciprocable ram supported upon said frame means for engagement with the upper end of a plunger disposed in said position whereby said plunger is urged downwardly into a barrel in said plunger station and into engagement with the piston therein.

17. A machine according to claim 4, wherein said plunger lift mechanism comprises flange means on said frame means for engaging the upper surface of a flange on each barrel when it is in the plunger lift station; and plunger flange engaging means vertically reciprocably supported upon said frame structure above said plunger lift station and engageable with a flange on said plunger when said barrel and plunger are in said plunger lift station for effecting upward movement of said plunger and the attached piston relative to said barrel.

18. A machine according to claim 4, wherein said cannular mounting mechanism comprises spaced, horizontally disposed flange means supported upon said frame means on opposite sides of said assembly line for simultaneous engagement with the upper edge of a said hub attached to a barrel in the cannula station;

chute means extending from a supply of cannula supporting and containing casings to said cannula station and including means for advancing said casings into said cannula station; and vertically reciprocable casing support means disposed below said cannula station adjacent the discharge end of the casing chute means for receiving one at a time said casings having a cannular assembly therein and moving them upwardly so as to mount a cannular assembly on said hub.

19. A machine according to claim 4, wherein said drive means comprises a line shaft connected to an adjustable speed motor and a plurality of cams on said line shaft connected to said mechanisms for effecting intermittent, synchronized movement thereof.

20. In a method for automatically assembling and filling a plurality of syringes having tubular barrels open at both ends, the steps comprising:

sequentially advancing a plurality of upright barrels in spaced relationship intermittently along a substantially horizontal assembly line through a plurality of stations;

mounting a tubular hub on one end of each barrel and covering the one end of said barrel with a liquid-tight sealing member capable of penetration by a cannula;

then discharging a quantity of liquid into each barrel;

reducing the pressure within each barrel above the upper surface of the liquid;

then inserting a piston into each barrel while the pressure above said liquid is reduced;

mounting a cannula and casing therefor on the exposed end of said hub, the mounted cannula having a sharpened end adjacent to but spaced from the sealing member; and discharging the assembled syringes with liquid therein one at a time from said line.

21. In a machine for automatically assembling and filling a syringe having a cylindrical barrel open at both ends, a sealing member closing one end of said barrel, a cylindrical hub affixed to said one end of said barrel, a piston within said barrel with a plunger attached thereto, a cannula assembly attached to said hub, the combination comprising:

frame means;

barrel advancing means including elongated means movably supported on said frame means for engaging simultaneously a plurality of spaced barrels disposed in upright positions along an assembly line and for simultaneously and intermittently advancing said plurality of barrels through a plurality of spaced stations arranged along said assembly line;

a hub attaching mechanism mounted on said frame means for applying a sealing member and a hub to said one end of each barrel at a hub station near one end of said assembly line;

a filling mechanism on said frame means at a filling station in said line for discharging a liquid into each barrel after the hub is attached;

a piston inserting mechanism on said frame means for urging a piston into each barrel in a piston station without materially increasing the pressure of the liquid in the barrel;

a cannula mounting mechanism on said frame means at a cannula station in said line for affixing a cannula to the hub of each barrel;

a discharge mechanism on said frame means for removing an assembled syringe with liquid therein from the other end of said line; and drive means actuating and synchronizing said elongated means and said mechanism.

22. A machine according to claim 21, wherein said barrel advancing means includes a plurality of elongated parallel elements supported on said frame means and operating means operatively interconnected to at least one of said elongated elements for moving same whereby said plurality of barrels are advanced simultaneously and intermittently through a plurality of spaced stations along said assembly line.

23. A machine according to claim 22, further includin an evacuation mechanism mounted on said frame means for reducing the pressure within each barrel containing said liquid while each said piston is inserted into a said barrel.

24. A machine according to claim 21, further including an evacuation mechanism on said frame means for reducing the pressure within each barrel containing said liquid while each said piston is inserted into a said barrel, and a lifting mechanism on said frame means at a lift station in said line for raising said piston within each barrel.

References Cited

UNITED STATES PATENTS

| | | | |
|---|---|---|---|
| 2,765,606 | 10/1956 | Brown | 53—264X |
| 3,245,194 | 4/1966 | Carski | 53—22 |
| 3,270,483 | 9/1966 | Smoyer et al. | 53—43 |
| 3,391,518 | 7/1968 | Gettig et al. | 53—43 |

THERON E. CONDON, Primary Examiner

R. L. SPRUILL, Assistant Examiner

U.S. Cl. X.R.

53—37, 67, 122, 282